(12) United States Patent
Kawakita et al.

(10) Patent No.: US 11,584,853 B2
(45) Date of Patent: Feb. 21, 2023

(54) DICHROIC DYE AND LIQUID CRYSTAL COMPOSITION

(71) Applicant: DIC Corporation, Tokyo (JP)

(72) Inventors: Kento Kawakita, Kita-adachi-gun (JP); Kenta Tojo, Kita-adachi-gun (JP); Ayaki Hosono, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 17/469,034

(22) Filed: Sep. 8, 2021

(65) Prior Publication Data

US 2022/0073750 A1 Mar. 10, 2022

(30) Foreign Application Priority Data

Sep. 10, 2020 (JP) .............. JP2020-151943

(51) Int. Cl.
*C09B 67/22* (2006.01)
*G02F 1/137* (2006.01)
*C09K 19/60* (2006.01)

(52) U.S. Cl.
CPC ........ *C09B 67/0055* (2013.01); *C09K 19/601* (2013.01); *G02F 1/13725* (2013.01); *G02F 2202/043* (2013.01)

(58) Field of Classification Search
CPC .. C09K 19/068; C09K 19/0414; C09K 19/60; C09K 19/601; C09K 19/44; C09K 2019/0444; G02F 1/1333; G02F 1/1334
See application file for complete search history.

(56) References Cited

U.S. PATENT DOCUMENTS

2013/0092874 A1 4/2013 Bacher et al.
2022/0073750 A1* 3/2022 Kawakita ............. C09K 19/601

FOREIGN PATENT DOCUMENTS

CN 109369684 A 2/2019
JP 2013-534945 A 9/2013

OTHER PUBLICATIONS

Nakazumi, "Display Materials and Functional Dyes", Puplished by CMC Press Co., Ltd., Sep. 30, 2004, pp. 64-73, cited in Specification, w/English machine translation (10 pages).
Nakazumi, "Functional Dyes in Technologies", Puplished by CMC Press Co., Ltd , Mar. 31, 2003, pp. 3-5, cited in Specification, w/English machine translation (6 pages).
Vashchenko, "Dichroic Dyes for Liquid Crystal Displays", Puplished by CRC Press, Inc., 1994, pp. 114-129, cited in Specification (11 pages).

* cited by examiner

*Primary Examiner* — Geraldina Visconti
(74) *Attorney, Agent, or Firm* — Shuji Yoshizaki

(57) ABSTRACT

Provided are a compound represented by the following general formula (1)

[Chem. 1]

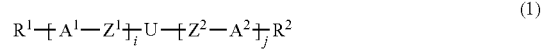

(1)

and a liquid crystal composition containing the compound, and a liquid crystal display device or a light control device having the liquid crystal composition. The compound represented by general formula (1) has both a large dichroic ratio and high solubility in the host liquid crystal. In addition, it has excellent chemical stability at a level usable as a device. Therefore, by using the compound represented by general formula (1) as a component of a GH-type liquid crystal composition, it is possible to provide a liquid crystal display device or a light control device with high contrast.

7 Claims, No Drawings

DICHROIC DYE AND LIQUID CRYSTAL COMPOSITION

BACKGROUND OF THE INVENTION

1. Field of the Invention

The present invention relates to novel dichroic dyes useful as organic electronic materials, medical and agricultural chemicals, and especially as materials for liquid crystal display devices, and liquid crystal compositions using these dyes.

2. Description of the Related Art

Liquid crystal materials are not only used in various display devices that display text, images, and video, as typified by TVs and smartphones, but are also being put to practical use for light control devices that control transmission of light.

In particular, the use of a guest-host (GH) type liquid crystal composition, in which a dichroic dye is added to a host liquid crystal composition, eliminates the need for a polarizer and is expected to make low-cost light control devices with high transmittance.

GH-type liquid crystal compositions have been studied for a long time, and attempts have been made to develop liquid crystal display devices and light control devices having useful device performance (e.g., large dichroic ratio, high contrast, high solubility in a liquid crystal composition, excellent light resistance, and excellent heat resistance) (see Japanese Unexamined Patent Application Publication (Translation of PCT Application) No. 2013-534945).

However, some liquid crystal compositions containing dichroic dyes are not suitable for use in liquid crystal display devices or light control devices, depending on their components, and there is a need for further improvement of their performance. For example, in order to obtain a large dichroic ratio, a large amount of dichroic dye needs to be contained in the liquid crystal composition, which leads to a problem of composition solubility where the dichroic dye or liquid crystal compounds precipitate. In particular, in order to be used in a light control device, the GH-type liquid crystal composition needs to exhibit a nematic liquid crystal phase over a wide temperature range, but since the molecular weight of the dye is larger than those of the liquid crystal compounds, the solubility at low temperatures needs to be improved.

In order to solve the problems as described above, it is necessary to improve the liquid crystal composition that serves as the host. In addition, the dichroic dye itself needs to be improved. In particular, in order to achieve high contrast, the dichroic dye needs to exhibit a large dichroic ratio as well as high solubility in the host liquid crystal. Many dichroic dyes have been studied, but most of the compounds that exhibit a large dichroic ratio generally have large mesogens and poor solubility in the host liquid crystal, and further improvements are required (see Hiroyuki Nakazumi, "Display Materials and Functional Dyes", Hiroyuki Nakazumi, "Functional Dyes in Technologies", and Aleksandr V. Ivashchenko, "Dichroic Dyes for Liquid Crystal Displays").

On the other hand, the following compounds have been reported as dye compounds (Chinese Patent Application Publication No. 109369684), but these compounds also do not have all of a large dichroic ratio, high solubility, and high light resistance.

[Chem. 1]

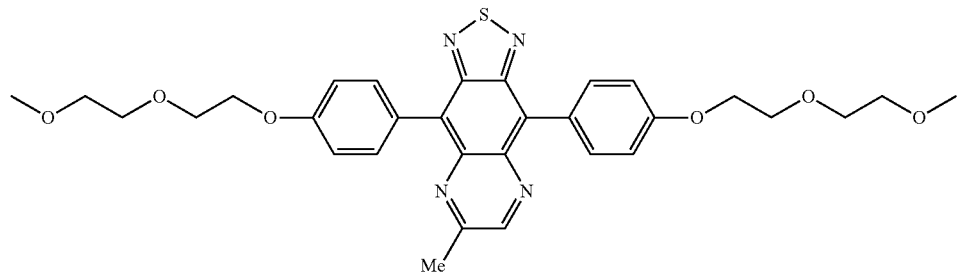

SUMMARY OF THE INVENTION

An object of the present invention is to provide a compound having high light resistance, a large dichroic ratio, and high solubility in a host liquid crystal, and also to provide a liquid crystal composition including the compound as a component, and a liquid crystal display device or a light control device.

In order to achieve the aforementioned object, the inventors of the present invention have examined various compounds and provided a liquid crystal composition containing a compound represented by general formula (1)

[Chem. 2]

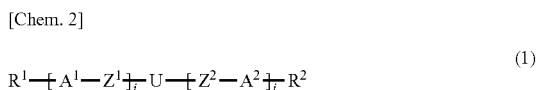

(1)

(wherein U is a group selected from groups represented by general formula (2) or (3)

[Chem. 3]

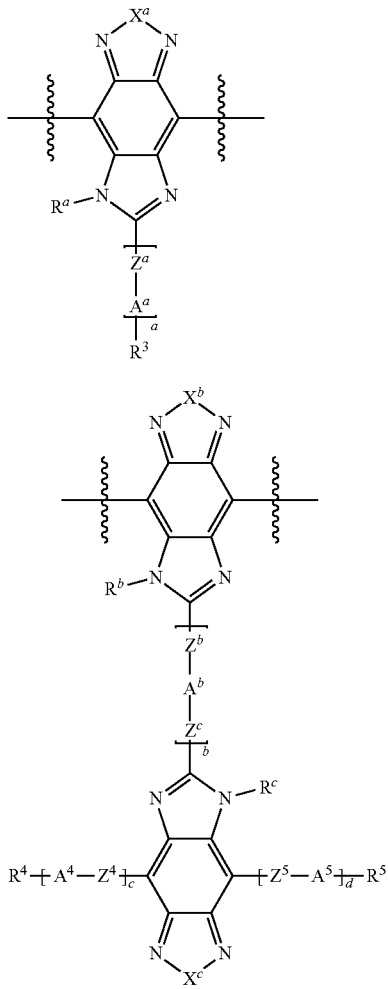

wherein $R^1$, $R^2$, $R^3$, $R^4$ and $R^5$ each independently represent a fluorine atom, a cyano group, an alkyl group having 1 to 20 carbon atoms or an alkenyl group having 2 to 30 carbon atoms, one —$CH_2$— or two or more nonadjacent —$CH_2$—'s present in these groups are optionally substituted with —$NR^6$—, —O—, —S—, —CO—, —CS—, —COO—, —OCO—, —CO—S—, —S—CO—, —SO—, —$SO_2$—, —O—CO—O—, —CO—NH—, —NH—CO—, —CH=CH—, —CF=CF—, or —C≡C—, and a hydrogen atom present in these groups is optionally substituted with a fluorine atom, wherein $R^6$ represents a hydrogen atom, an alkyl group having 1 to 20 carbon atoms, or an alkenyl group having 2 to 30 carbon atoms, one —$CH_2$— or two or more nonadjacent —$CH_2$—'s present in these groups are optionally substituted with —O—, —S—, —COO—, —OCO—, or —CO—, and a hydrogen atom present in these groups is optionally substituted with a fluorine atom, $R^a$, $R^b$ and $R^c$ each independently represent a hydrogen atom, an alkyl group having 1 to 20 carbon atoms, or an alkenyl group having 2 to 30 carbon atoms, one —$CH_2$— or two or more nonadjacent —$CH_2$—'s present in these groups are optionally substituted with —$NR^7$—, —O—, —S—, —CO—, —CS—, —COO—, —OCO—, —CO—S—, —S—CO—, —SO—, —$SO_2$—, —O—CO—O—, —CO—NH—, —NH—CO—, —CH=CH—, —CF=CF—, or —C≡C—, and a hydrogen atom present in these groups is optionally substituted with a fluorine atom, wherein $R^7$ represents a hydrogen atom, an alkyl group having 1 to 20 carbon atoms, or an alkenyl group having 2 to 30 carbon atoms, one —$CH_2$— or two or more nonadjacent —$CH_2$—'s present in these groups are optionally substituted with —O—, —S—, —COO—, —OCO—, or —CO—, and a hydrogen atom present in these groups is optionally substituted with a fluorine atom, $X^a$, $X^b$, and $X^c$ each independently represent —S— or —O—, $A^1$, $A^2$, $A^4$, $A^5$, $A^a$, and $A^b$ each independently represent an optionally substituted hydrocarbon ring or heterocyclic ring having 3 to 16 carbon atoms, $Z^1$, $Z^2$, $Z^4$, $Z^5$, $Z^a$, $Z^b$, and $Z^c$ each independently represent —$CH_2O$—, —$OCH_2$—, —$CF_2O$—, —$OCF_2$—, —COO—, —OCO—, —$CH_2CH_2$—, —$CF_2CF_2$—, —CH=CH—, —CF=CF—, —N=CH—, —CH=N—, —N=N—, —C≡C—, or a single bond, i, j, a, b, c, and d each independently represent an integer of 0 to 4, pluralities of $A^1$s, $A^2$s, $A^4$s, $A^5$s, $A^a$s, and $A^b$s, if present, may be the same or different $A^1$s, $A^2$s, $A^4$s, $A^5$s, $A^a$s, and $A^b$s, pluralities of $Z^1$s, $Z^2$s, $Z^4$s, $Z^5$s, $Z^a$s, $Z^b$s, and $Z^c$s, if present, may be the same or different $Z^1$s, $Z^2$s, $Z^4$s, $Z^5$s, $Z^a$s, $Z^b$s, and $Z^c$s, and a plurality of $R^6$s, if present, may be the same or different $R^6$s).

In addition, a liquid crystal composition containing the compound and a liquid crystal display device or a light control device using the liquid crystal composition are provided.

The compound represented by general formula (1) provided by the present invention has both a large dichroic ratio and high solubility in the host liquid crystal. In addition, it has excellent chemical stability at a level usable as a device. Therefore, by using the compound represented by general formula (1) as a component of the GH-type liquid crystal composition, it is possible to provide a liquid crystal display device or a light control device with high contrast.

DETAILED DESCRIPTION OF EMBODIMENTS

In general formula (1), U is preferably the structure represented by general formula (3) in order to increase the dichroic ratio, while the structure represented by general formula (2) is preferred when light resistance and solubility in the host liquid crystal are important.

In general formula (1), $R^1$, $R^2$, $R^3$, $R^4$, and $R^5$ preferably each independently represent a fluorine atom, a cyano group, an alkyl group having 2 to 20 carbon atoms or an alkenyl group having 2 to 20 carbon atoms, and one —$CH_2$— or two or more nonadjacent —$CH_2$—'s present in these groups are preferably substituted with —O—, —S—, —CO—, —CS—, —COO—, —OCO—, —CO—S—, —S—CO—, —SO—, or —$SO_2$—. In order to increase the solubility in the host liquid crystal, an alkyl group or an alkenyl group having 1 to 20 carbon atoms is preferred, an unsubstituted linear or branched alkyl group having 1 to 20 carbon atoms is more preferred, a non-substituted linear or branched alkyl group having 4 to 20 carbon atoms is even more preferred, and a non-substituted branched alkyl group having 4 to 20 carbon atoms is particularly preferred. In order to exhibit a high dichroic ratio, $R^3$ is preferably a linear alkyl or fluorinated alkyl group having 1 to 5 carbon atoms, and a methyl group or a trifluoromethyl group is particularly preferred. For longer absorption wavelengths, $R^3$ is preferably a fluorine atom, a cyano group, a thioether group, an alkylsulfonyl group, a N,N-dialkylsulfonamide group, or an alkylacyl group.

In general formula (1), $R^a$, $R^b$, and $R^c$ preferably each independently represent a hydrogen atom, an alkyl group having 2 to 20 carbon atoms, or an alkenyl group having 2 to 20 carbon atoms, and one —$CH_2$— or two or more nonadjacent —$CH_2$—'s present in these groups are preferably substituted with —O—, —S—, —CO—, —CS—, —COO—, —OCO—, —CO—S—, —S—CO—, —SO—, or —$SO_2$—. In order to increase the solubility in the host liquid crystal, an alkyl group or an alkenyl group having 1 to 20 carbon atoms is preferred, an unsubstituted linear or branched alkyl group having 1 to 20 carbon atoms is more preferred, a non-substituted linear or branched alkyl group having 4 to 20 carbon atoms is even more preferred, and a non-substituted branched alkyl group having 4 to 20 carbon atoms is particularly preferred. On the other hand, a hydrogen atom is preferred for a high dichroic ratio and ease of production. For longer absorption wavelengths, an alkylsulfonyl group, a N,N-dialkylsulfonamide group, or an alkylacyl group is preferred.

In general formula (1), $X^a$, $X^b$, and $X^c$ preferably each independently represent —S— or —O—, but —S— is preferable in terms of solubility and longer absorption wavelengths, and —O— is preferable in terms of a dichroic ratio, light resistance, and ease of production.

In general formula (1), $A^1$, $A^2$, $A^4$, $A^5$, $A^a$, and $A^b$ are preferably each independently an optionally substituted hydrocarbon ring or heterocyclic ring having 3 to 16 carbon atoms. Here, the hydrocarbon ring may be aliphatic or aromatic, and may have a substituent on the ring. The heterocyclic ring may be aliphatic or aromatic, contains at least one heteroelement in the elements that make up the ring structure, and may have a substituent on the ring. Here, $A^1$, $A^2$, $A^4$, $A^5$, $A^a$, and $A^b$ preferably each independently represent a group selected from the group consisting of (a) a 1,4-cyclohexylene group (in which one —$CH_2$— or two or more nonadjacent —$CH_2$—'s are optionally substituted with —O— or —S—, and one CH or two or more nonadjacent CHs are optionally substituted with N), (b) a 1,4-phenylene group (in which one —CH= or two or more nonadjacent —CH='s are optionally substituted with —N=), (c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group (in which a hydrogen atom is optionally substituted with a fluorine or chlorine atom, and one —CH= or two or more —CH='s in the naphthalene-2,6-diyl group, the naphthalene-1,4-diyl group, the 1,2,3,4-tetrahydronaphthalene-2,6-diyl group, the 5,6,7,8-tetrahydronaphthalene-1,4-diyl group, the anthracene-2,6-diyl group, the anthracene-1,4-diyl group, the anthracene-9,10-diyl group, or the phenanthrene-2,7-diyl group are optionally substituted with —N=), and (d) a thiophene-2,5-diyl group, a thiophene-2,4-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group (in which one —CH= or two or more nonadjacent —CH='s are optionally substituted with —N=).

It is also preferable that these groups are unsubstituted or substituted with one or more substituents $L^2$.

$L^2$s are preferably each independently a hydrogen atom, a fluorine atom, a chlorine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear alkyl group having 1 to 20 carbon atoms or a branched or cyclic alkyl group having 3 to 20 carbon atoms, in which one —$CH_2$— or two or more —$CH_2$—'s are each independently optionally substituted with —O—, —S—, —CO—, —CS—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—. $L^2$ are further preferably each independently a hydrogen atom, a fluorine atom, a chlorine atom, a pentafluorosulfanyl group, a nitro group, a cyano group, an isocyano group, a dimethylamino group, a diethylamino group, a diisopropylamino group, a thioisocyano group, a methyl group, an ethyl group, a propyl group, a methoxy group, an ethoxy group, or an acetyl group.

The preferred structures of $A^1$, $A^2$, $A^4$, $A^5$, $A^a$, and $A^b$ preferably represent groups selected from below.

[Chem. 4]

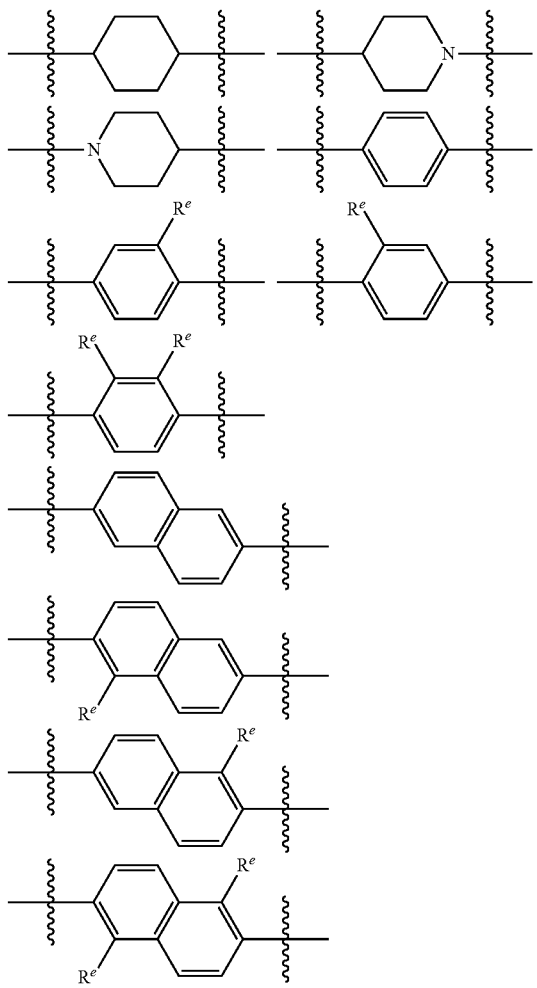

-continued

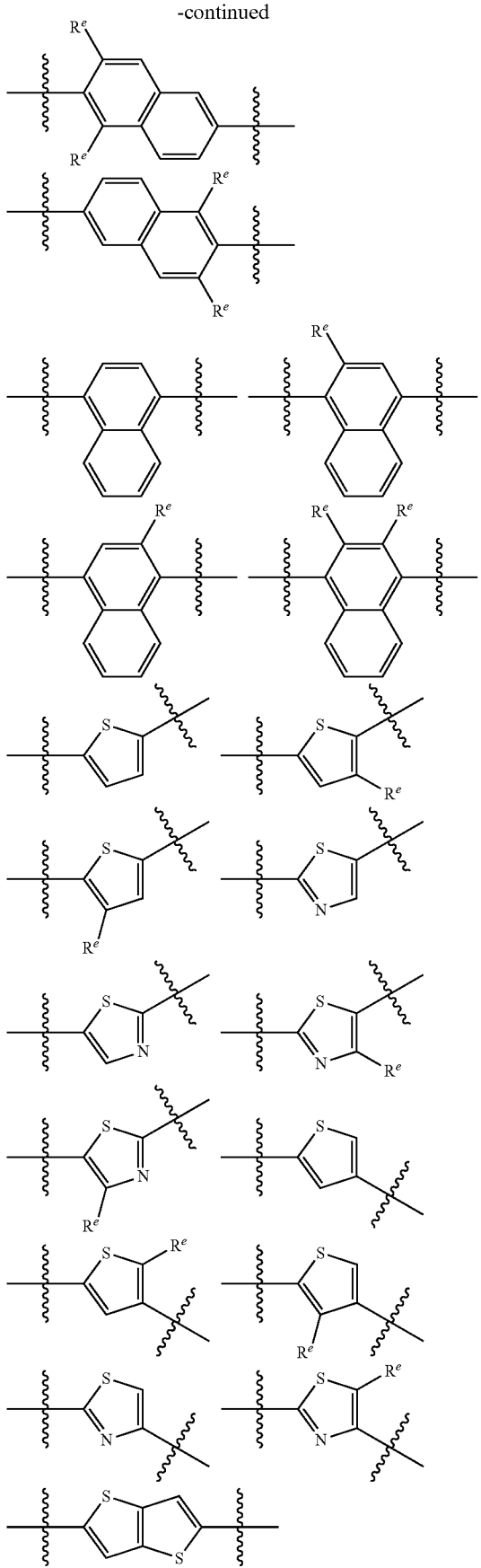

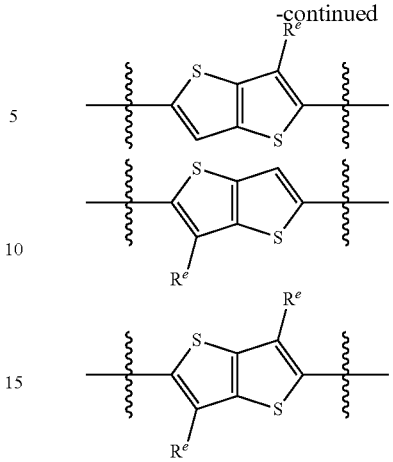

$R^e$s preferably each independently represent a methyl group, an ethyl group, a propyl group, a 2-propyl group, a butyl group, a 2-butyl group, a methoxy group, an ethoxy group, a methylthio group, an ethylthio group, a dimethylamino group, a diethylamino group, a cyano group, a nitro group, a fluorine atom, or a chlorine atom. Specifically, in order to increase the solubility in the host liquid crystal, a trans-1,4-cyclohexylene group, an unsubstituted 1,4-phenylene group, a 2-fluoro-1,4-phenylene group, a 3-fluoro-1,4-phenylene group, a 2-alkyl-1,4-phenylene group, a 3-alkyl-1,4-phenylene group, an unsubstituted thiophene-2,5-diyl group, an unsubstituted thiophene-2,4-diyl group, a 4-alkyl-thiophene-2,5-diyl group, or a 5-alkyl-thiophene-2,4-diyl group is preferred. Pluralities of $A^1$s and $A^2$s, if present, are preferably $A^1$s and $A^2$s of different structures. In order to increase the dichroic ratio, an unsubstituted 1,4-phenylene group, a 2-fluoro-1,4-phenylene group, a 3-fluoro-1,4-phenylene group, an unsubstituted thiophene-2,5-diyl group, an unsubstituted thiophene-2,4-diyl group, an unsubstituted naphthalene-2,6-diyl group, an unsubstituted naphthalene-1,4-diyl group, or an unsubstituted thieno[3,2-b]thiophene-2,5-diyl group is preferred. For longer absorption wavelengths, an electron-donating ring is preferred, and particularly a thiophene-2,5-diyl group, a thiophene-2,4-diyl group, a thieno[3,2-b]thiophene-2,5-diyl group, or a piperidine-1,4-diyl group is preferred. In order to increase the solubility in the host liquid crystal, $R^5$s preferably represent a methyl group, an ethyl group, a propyl group, a fluorine atom, or a chlorine atom, and more preferably represent a methyl group, an ethyl group, or a fluorine atom. For longer absorption wavelengths, $R^e$s are preferably electron-donating substituents, more preferably a methoxy group, an ethoxy group, a dimethylamino group, or a diethylamino group, and particularly preferably a methoxy group, an ethoxy group, or a dimethylamino group.

In general formula (1), $Z^1$, $Z^2$, $Z^4$, $Z^5$, $Z^a$, $Z^b$, and $Z^c$ preferably each independently represent —CH$_2$CH$_2$—, —CH=CH—, —CF=CF—, —N=N—, —C≡C—, or a single bond. In order to increase the solubility in the host liquid crystal, —CH$_2$O—, —OCH$_2$—, —CH$_2$CH$_2$—, or a single bond is preferred, and —CH$_2$CH$_2$— or a single bond is even more preferred. In order to increase the dichroic ratio, —CH=CH—, —CF=CF—, —N=CH—, —CH=N—, —N=N—, —C≡C—, or a single bond is preferred, and —CH=CH—, —N=N—, —C≡C—, or a single bond is even more preferred. A single bond is preferred for high light resistance.

In general formula (1), i, j, a, b, c, and d preferably each independently represent an integer of 0 to 3, and more preferably represent an integer of 1 to 2 in terms of solubility. Furthermore, i, j, c, and d preferably each independently represent an integer of 1 to 3 in terms of a high dichroic ratio and longer absorption wavelengths. In order to increase the dichroic ratio, a and b are preferably each independently 0 or 1, particularly preferably 0.

In general formula (1), it is preferable that there is no direct bonding between oxygen atoms and/or between an oxygen atom and a sulfur atom in terms of stability of the compound.

The compound represented by general formula (1) has a skeleton represented by U in its structure and also has alkyl groups and the like represented by $R^1$, $R^2$, $R^3$, $R^4$, and $R^5$ on its structure, thereby exhibiting high solubility in the liquid crystal composition. In particular, when the structure has a ring structure represented by $A^1$, $A^2$, $A^4$, $A^5$, $A^a$, and $A^b$, the entire compound approaches a rod-like structure, which improves the solubility in the liquid crystal composition and enhances dichroism when used as a dye. In particular, when these rings are aromatic, the π-electron conjugated system spreads throughout the molecule, which is effective for longer absorption wavelengths.

The compound represented by general formula (1) is preferably represented by the following formulae (1-A) to (1-D)

[Chem. 5]

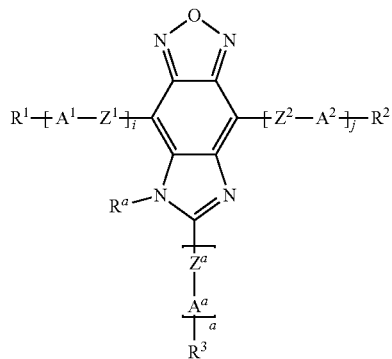

(1-A)

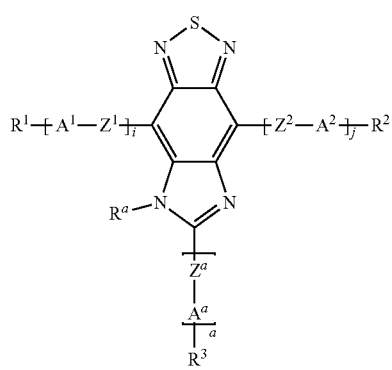

(1-B)

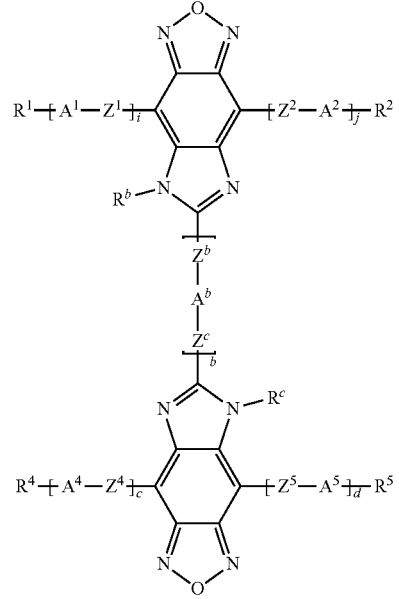

(1-C)

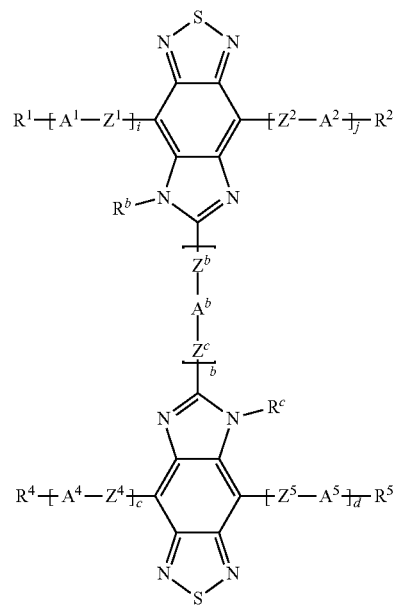

(1-D)

(wherein $R^1$, $R^2$, $R^3$, $R^4$, $R^5$, $R^a$, $R^b$, $R^c$, $A^1$, $A^2$, $A^4$, $A^5$, $A^a$, $A^b$, $Z^1$, $Z^2$, $Z^4$, $Z^5$, $Z^a$, $Z^b$, $Z^c$, i, j, a, b, c, and d have the same meaning as $R^1$, $R^2$, $R^3$, $R^4$, $R^5$, $R^a$, $R^b$, $R^c$, $A^1$, $A^2$, $A^4$, $A^5$, $A^a$, $A^b$, $Z^1$, $Z^2$, $Z^4$, $Z^5$, $Z^a$, $Z^b$, Z, i, j, a, b, c, and d, respectively, in general formula (1)).

Furthermore, among the compounds represented by general formula (1-A) to general formula (1-D), a structure represented by general formula (1-E) is preferred

[Chem. 6]

(1-E)

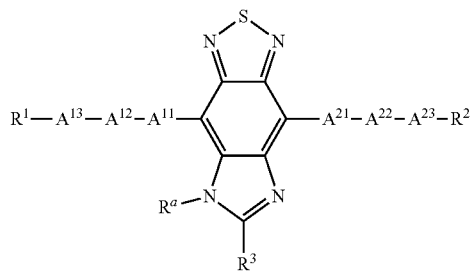

(wherein $R^1$, $R^2$, $R^3$, and $R^a$ have the same meaning as $R^1$, $R^2$, $R^3$, and $R^4$, respectively, in general formula (1), $A^{11}$, $A^{12}$, and $A^{13}$ each have the same meaning as $A^1$ in general formula (1) or a single bond, which may be the same or different, and $A^{21}$, $A^{22}$, and $A^{23}$ each have the same meaning as $A^2$ in general formula (1) or a single bond, which may be the same or different).

In general formula (1), the compounds represented by the following general formula (1-1) to general formula (1-80) are particularly preferred.

[Chem. 7]

(1-1)

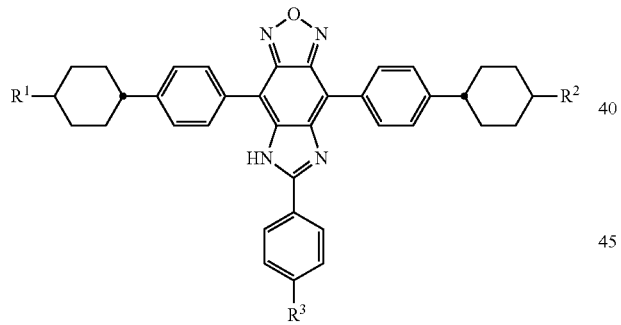

(1-2)

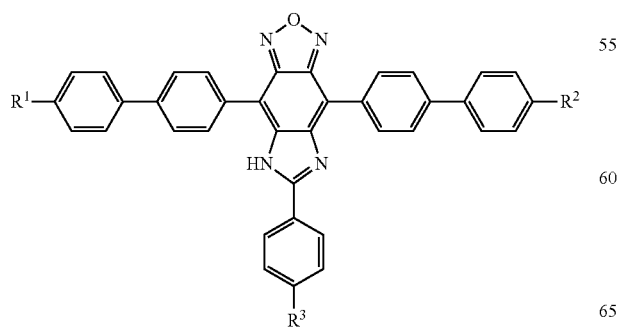

(1-3)

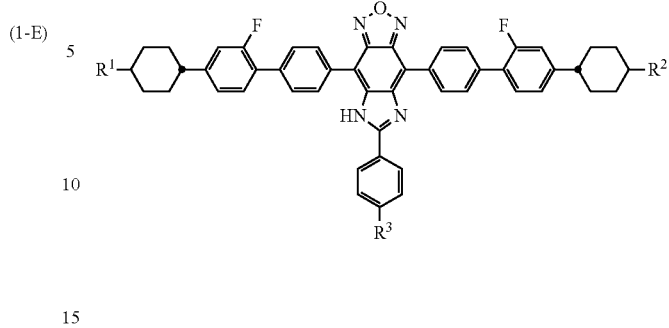

(1-4)

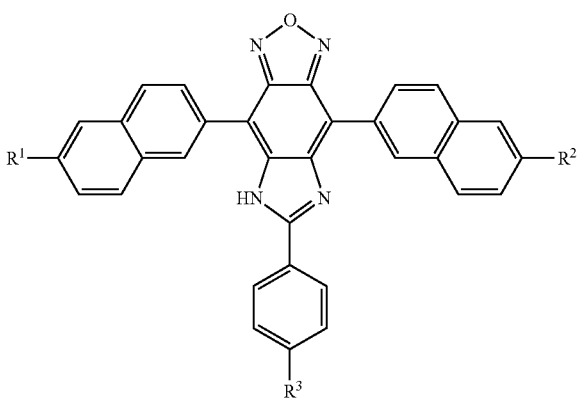

(1-5)

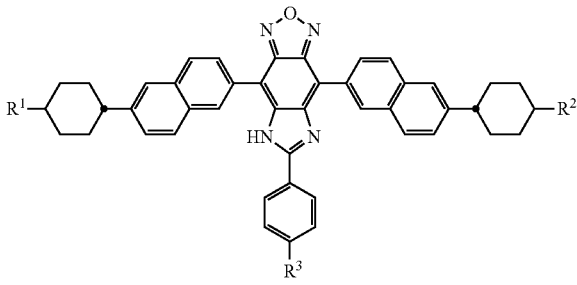

(1-6)

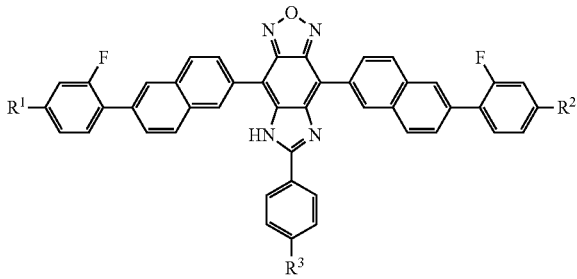

(In the formulae, $R^1$, $R^2$, and $R^3$ have the same meaning as $R^1$, $R^2$, and $R^3$ in general formula (1).)

[Chem. 8]
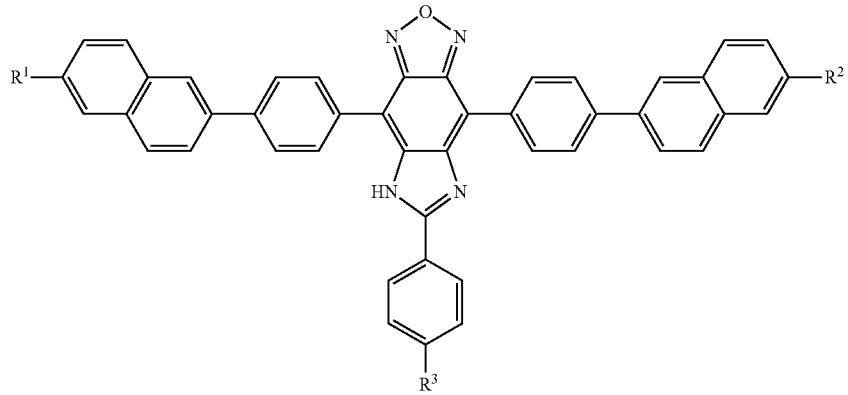
(1-7)
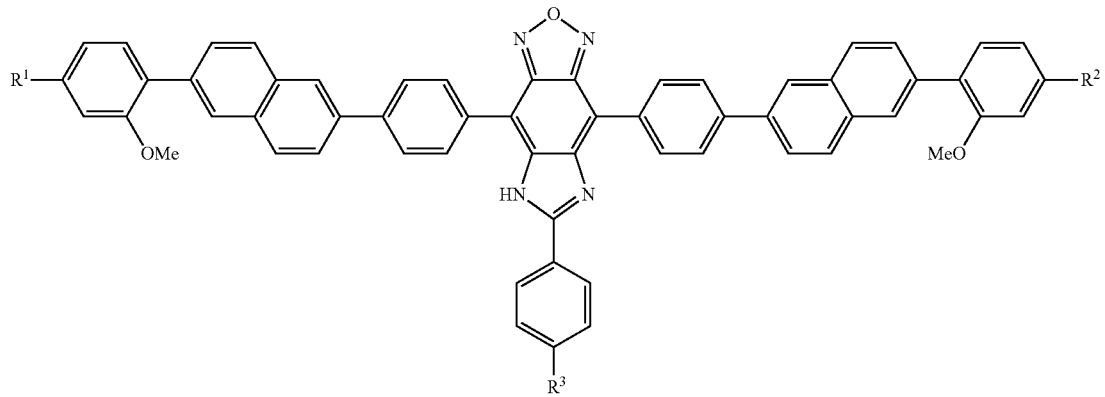
(1-8)
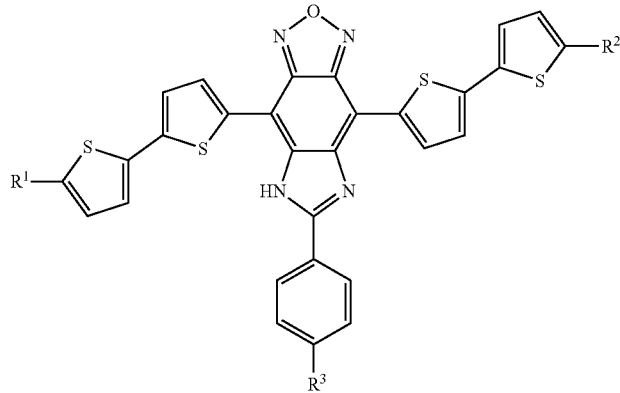
(1-9)
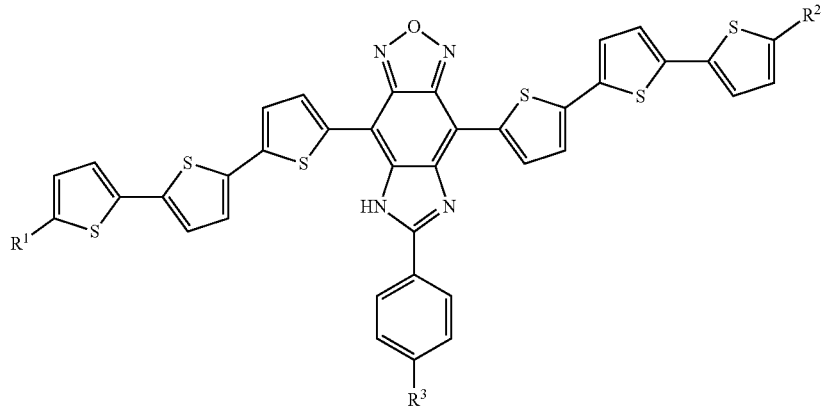
(1-10)

(In the formulae, R¹, R², and R³ have the same meaning as R¹, R², and R³ in general formula (1).)
[Chem. 9]
(1-11)
(1-12)
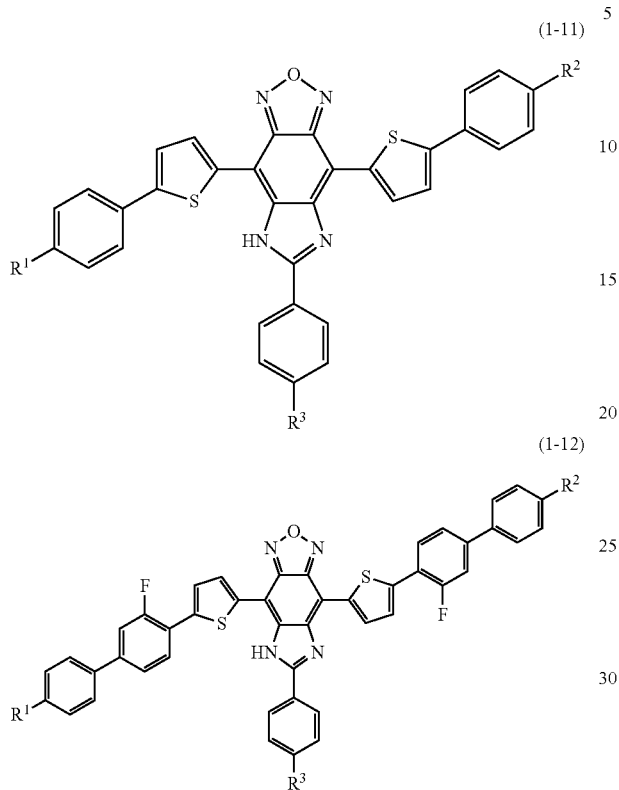
(1-13)
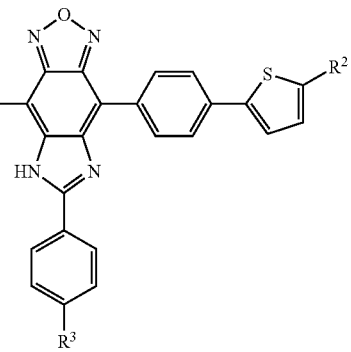
(1-14)
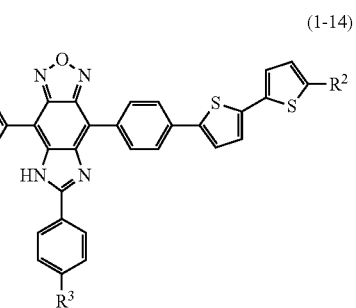
(In the formulae, R¹, R², and R³ have the same meaning as R¹, R², and R³ in general formula (1).)
[Chem. 10]
(1-15) (1-16)
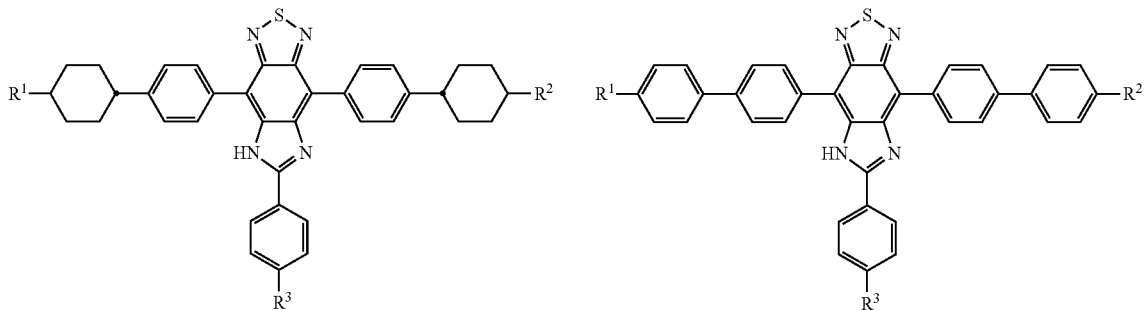
(1-17)
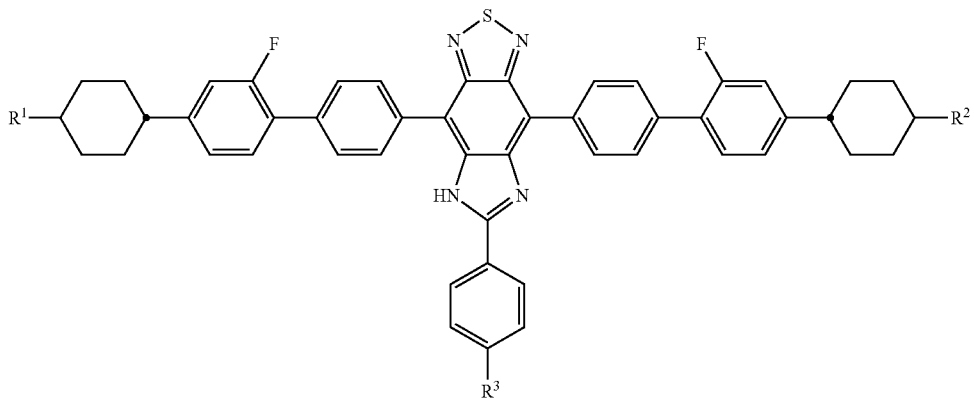

(1-18)
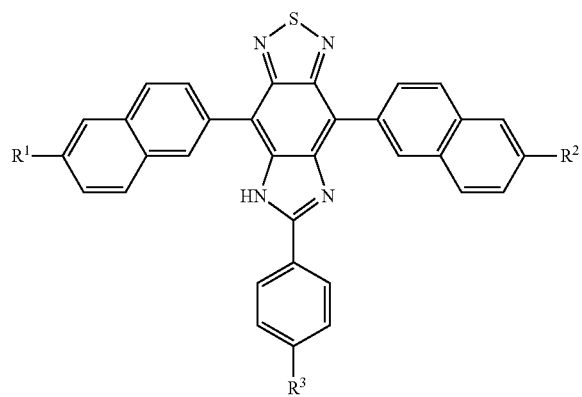
(1-19)
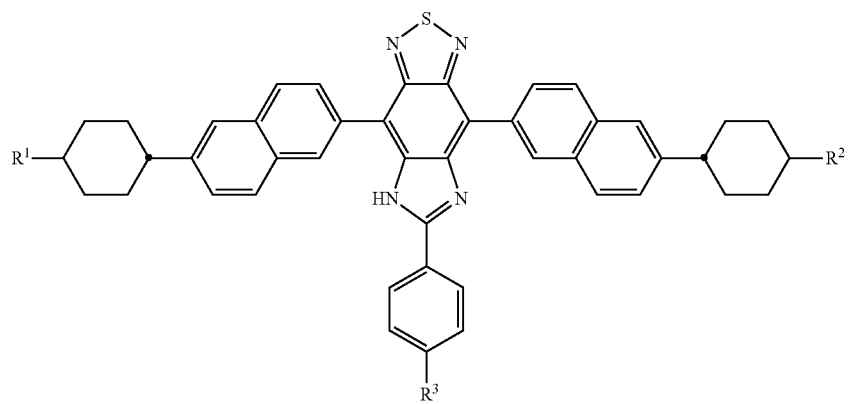
(1-20)
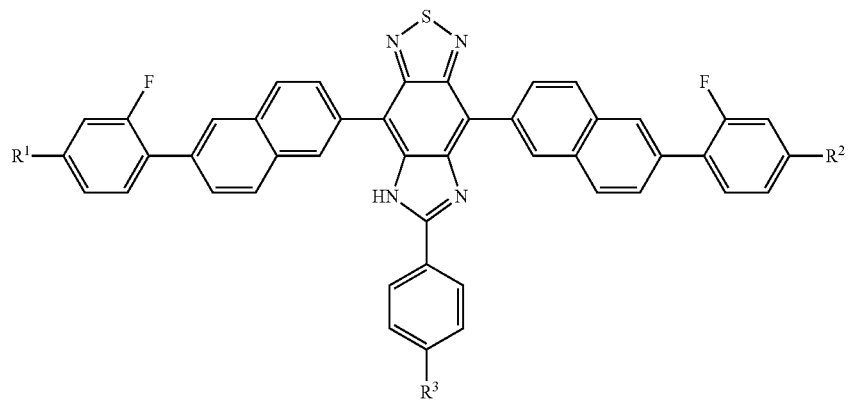

(In the formulae, $R^1$, $R^2$, and $R^3$ have the same meaning as $R^1$, $R^2$, and $R^3$ in general formula (1).)
[Chem. 11]
(1-21)
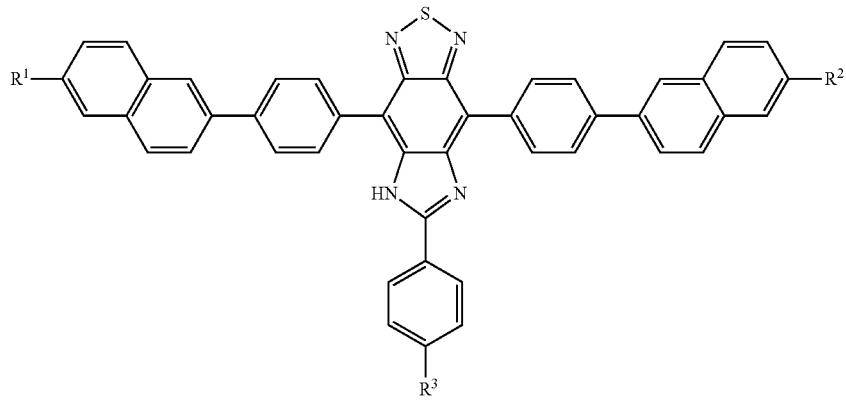
(1-22)
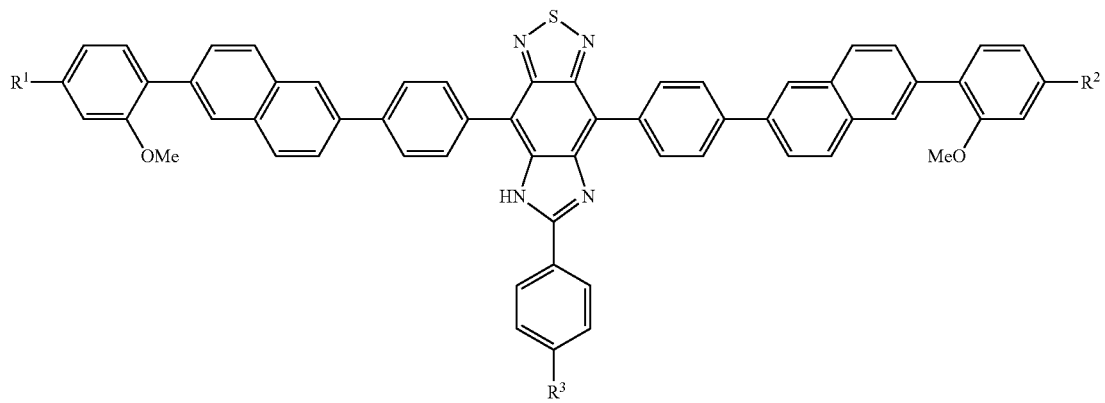
(1-23)
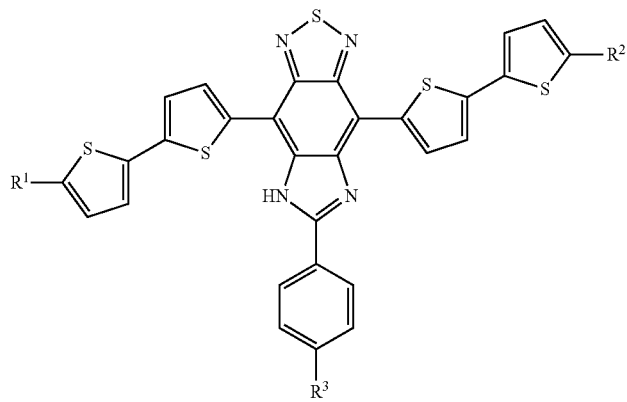
(1-24)
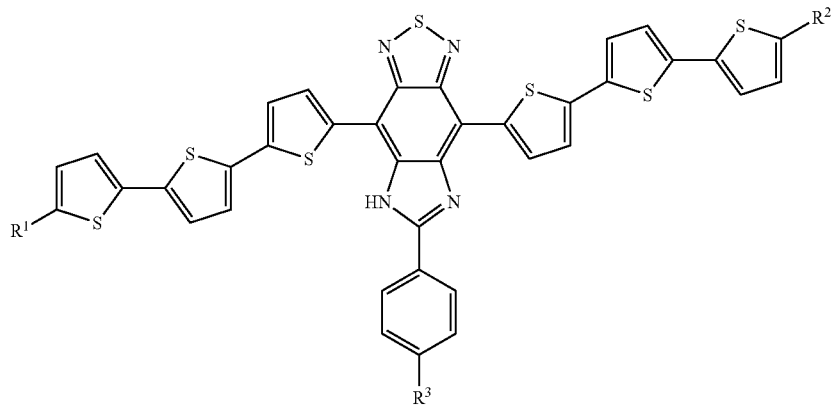

(In the formulae, R¹, R², and R³ have the same meaning as R¹, R², and R³ in general formula (1).)
[Chem. 12]
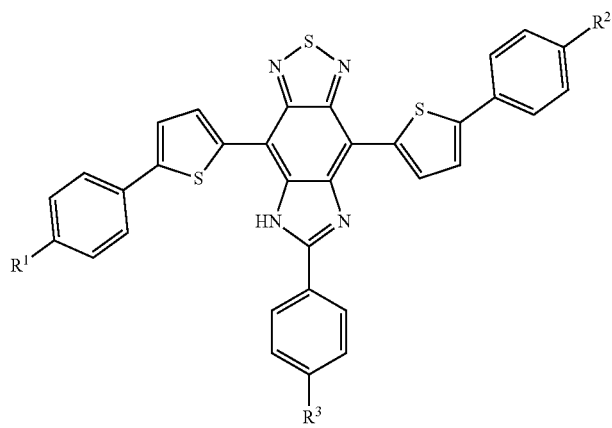
(1-25)
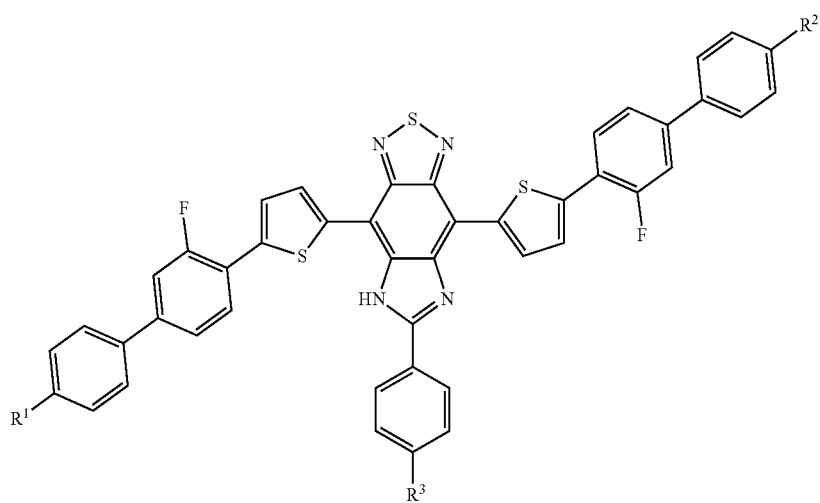
(1-26)
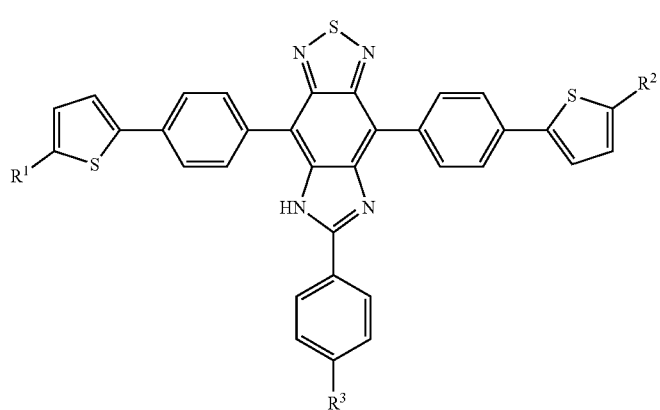
(1-27)

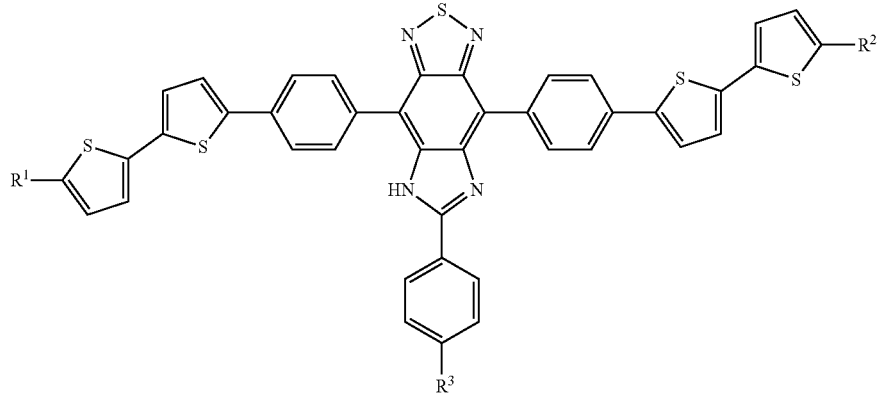
(1-28)
(In the formulae, $R^1$, $R^2$, and $R^3$ have the same meaning as $R^1$, $R^2$, and $R^3$ in general formula (1).)
[Chem. 13]
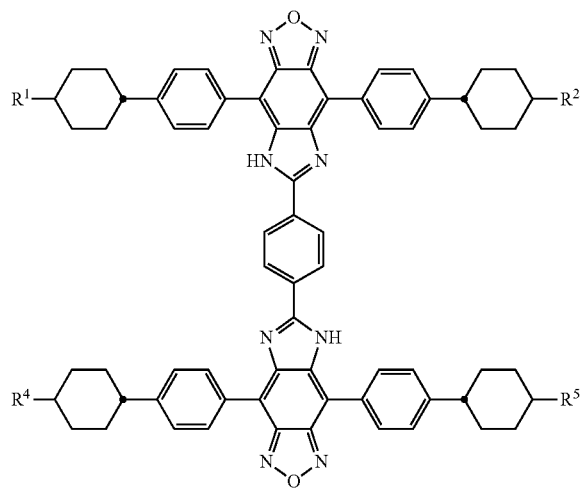
(1-29)
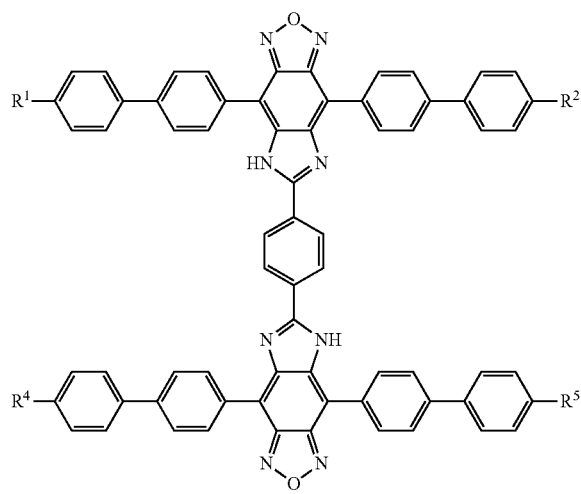
(1-30)
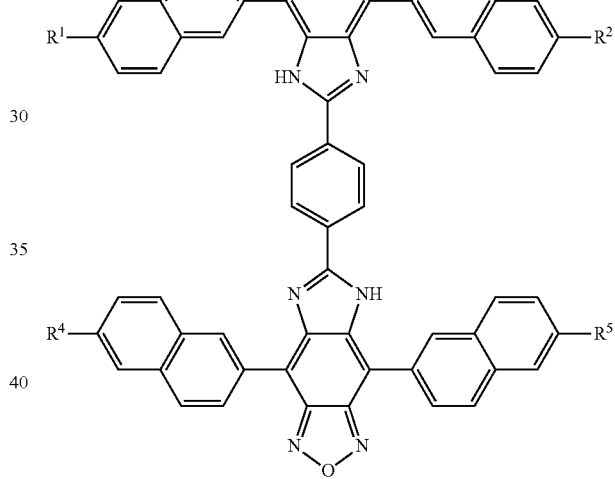
(1-31)
(1-32)
(In the formulae, $R^1$, $R^2$, $R^4$, and $R^5$ have the same meaning as $R^1$, $R^2$, $R^4$, and $R^5$ in general formula (1).)

(1-33)
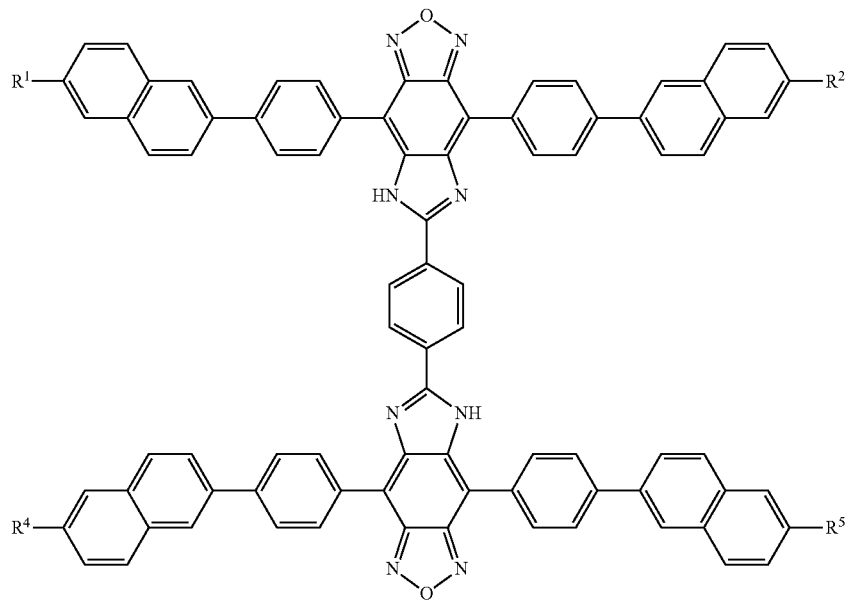
(1-34)
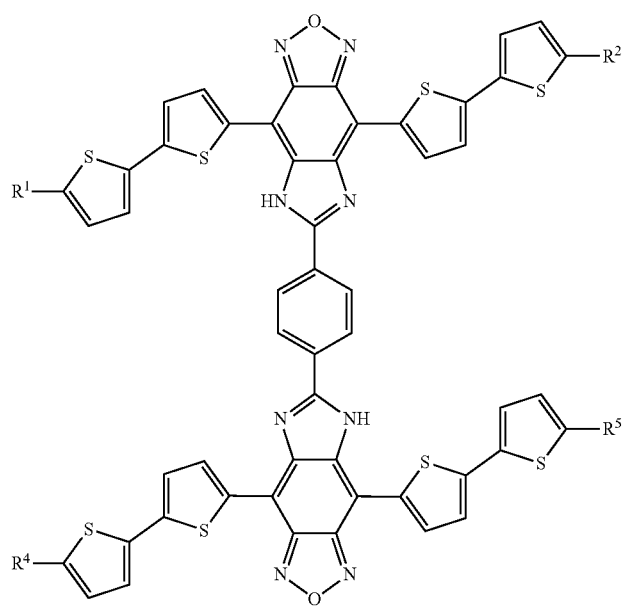

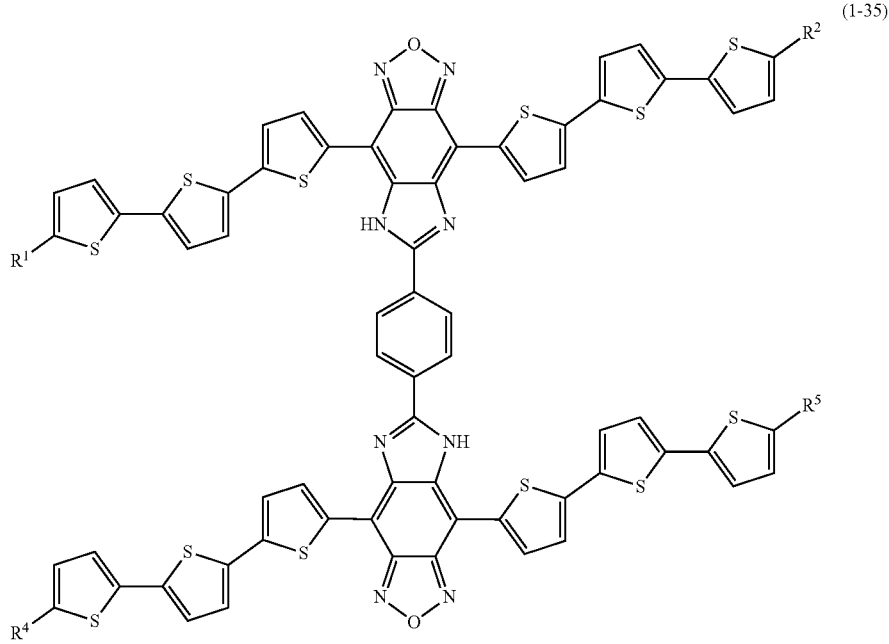
(1-35)
(In the formulae, $R^1$, $R^2$, $R^4$, and $R^5$ have the same meaning as $R^1$, $R^2$, $R^4$, and $R^5$ in general formula (1).)
[Chem. 15]
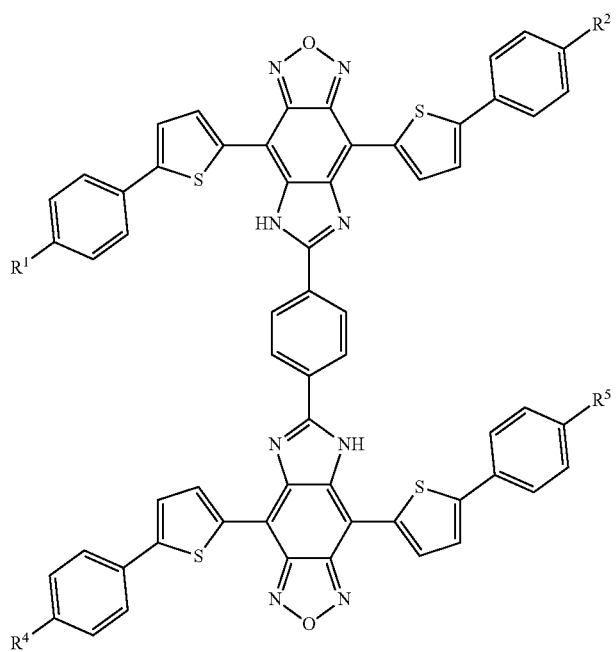
(1-36)

(1-37)
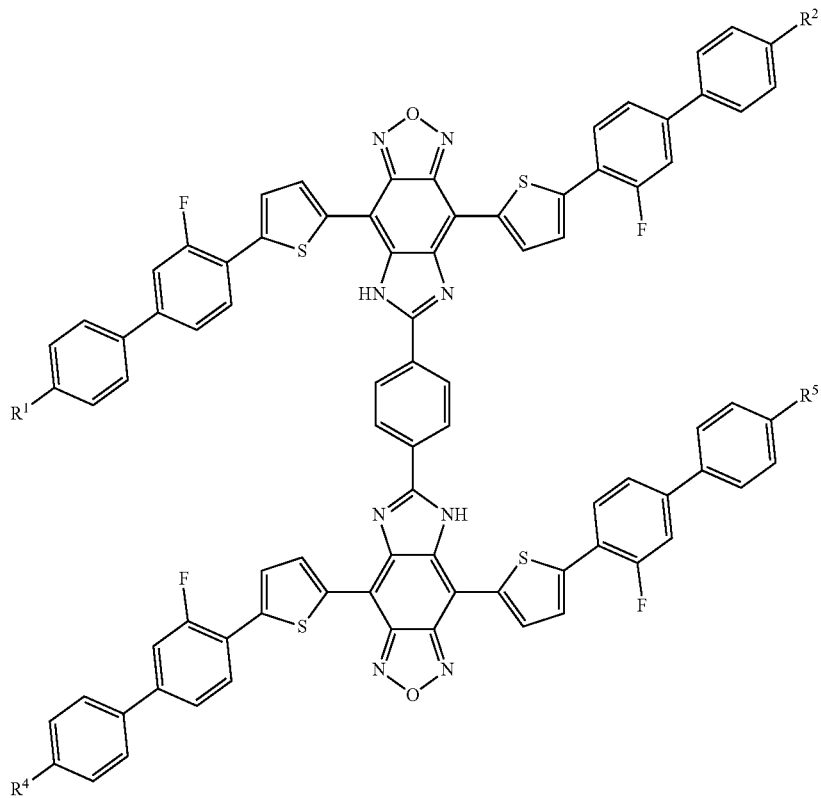
(1-38)
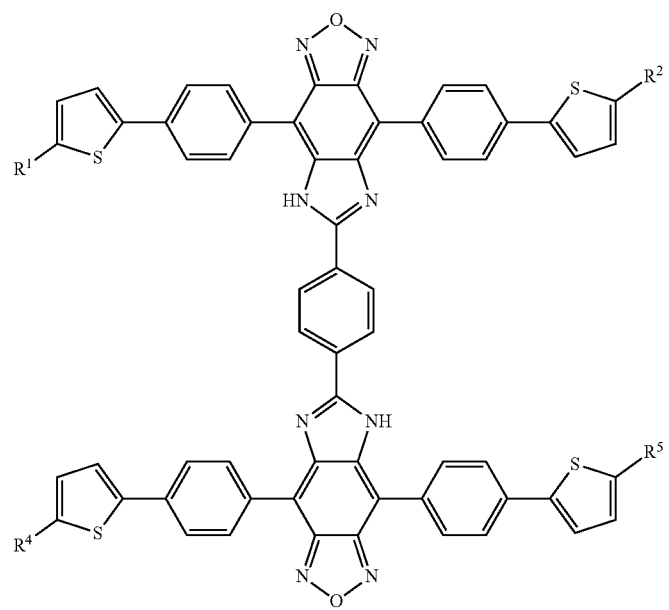

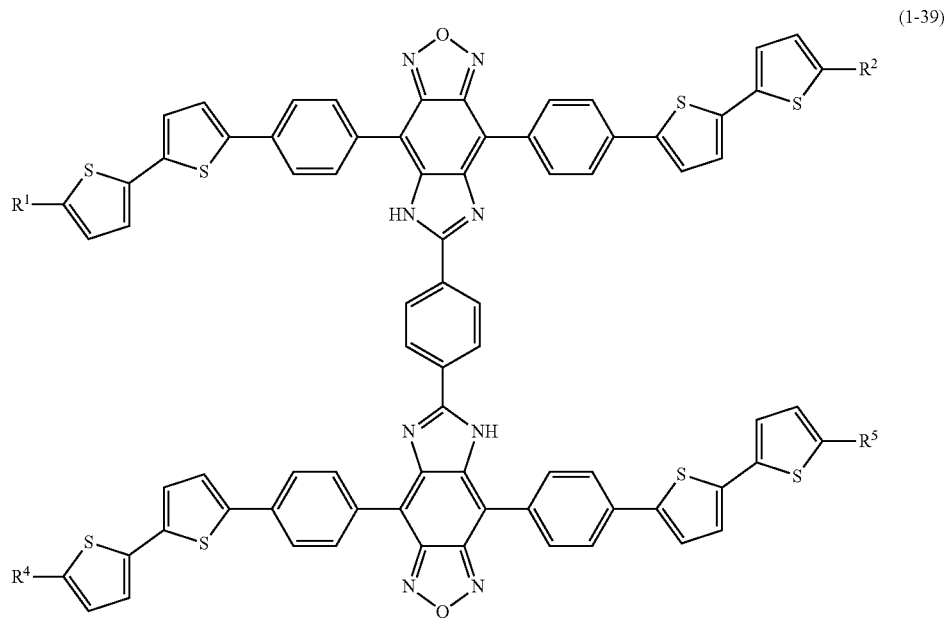
(1-39)
(In the formulae, $R^1$, $R^2$, $R^4$, and $R^5$ have the same meaning as $R^1$, $R^2$, $R^4$, and $R^5$ in general formula (1).)
[Chem. 16]
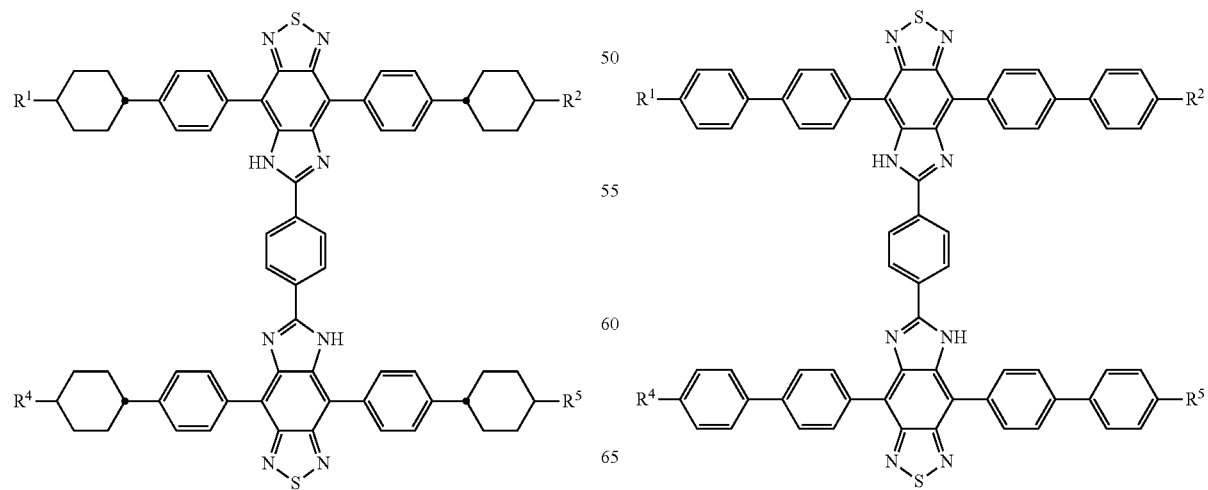
(1-40)  (1-41)

33
-continued
(1-42)
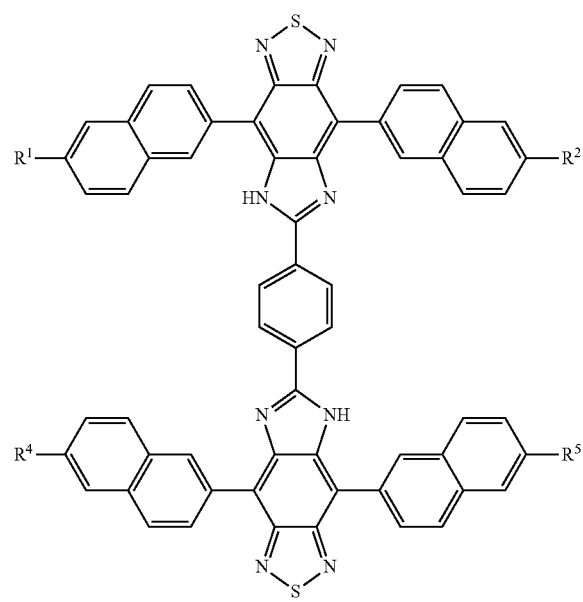
34
-continued
(1-43)
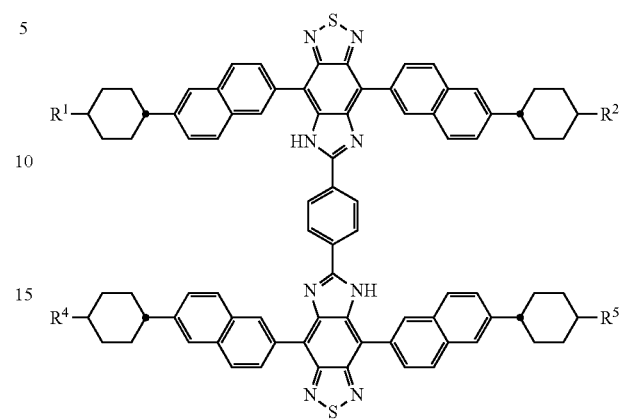
(In the formulae, $R^1$, $R^2$, $R^4$, and $R^5$ have the same meaning as $R^1$, $R^2$, $R^4$, and $R^5$ in general formula (1).)
[Chem. 17]
(1-44)
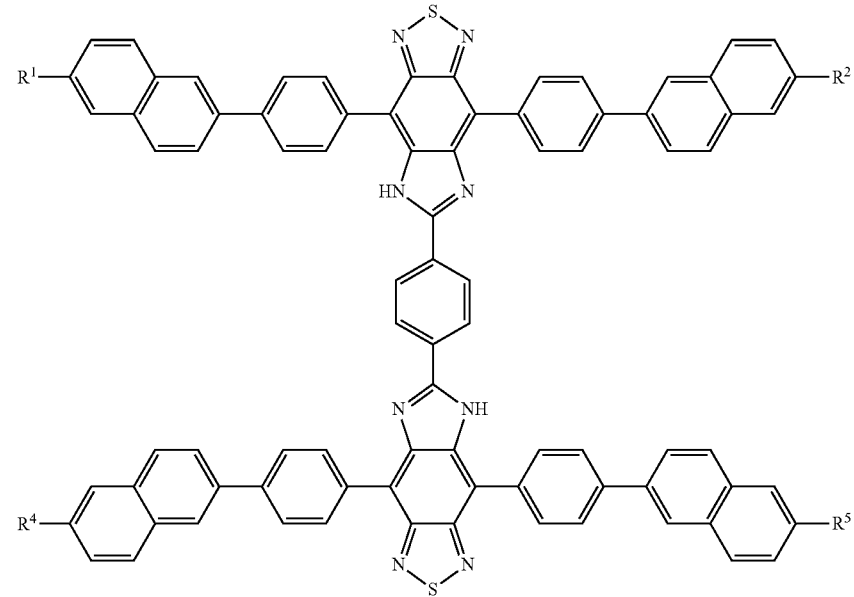

-continued
(1-45)
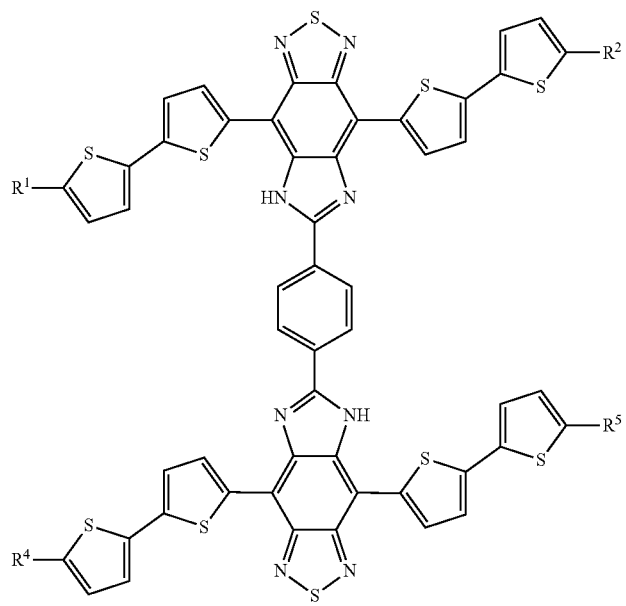
(1-46)
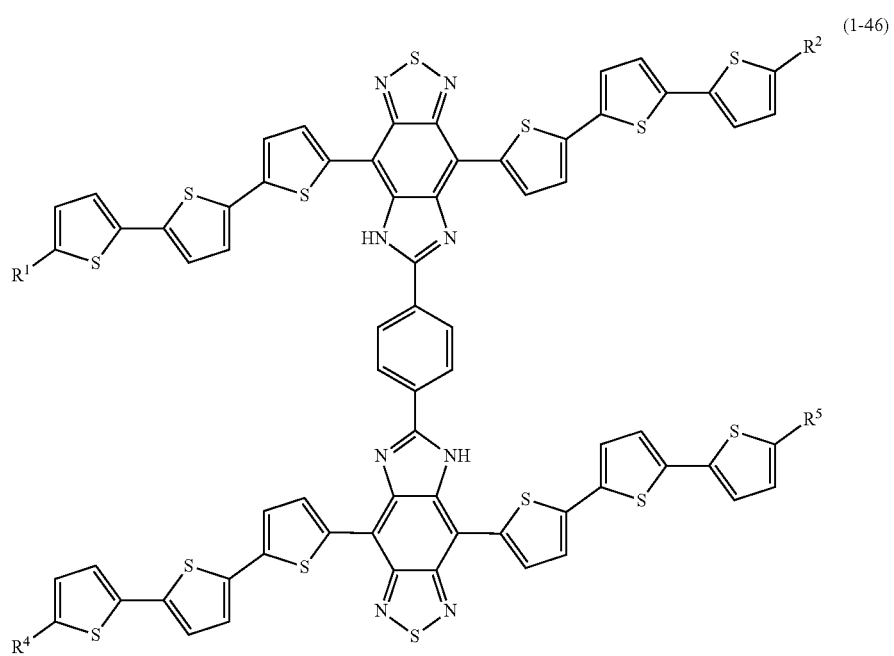

(In the formulae, $R^1$, $R^2$, $R^4$, and $R^5$ have the same meaning as $R^1$, $R^2$, $R^4$, and $R^5$ in general formula (1).)
[Chem. 18]
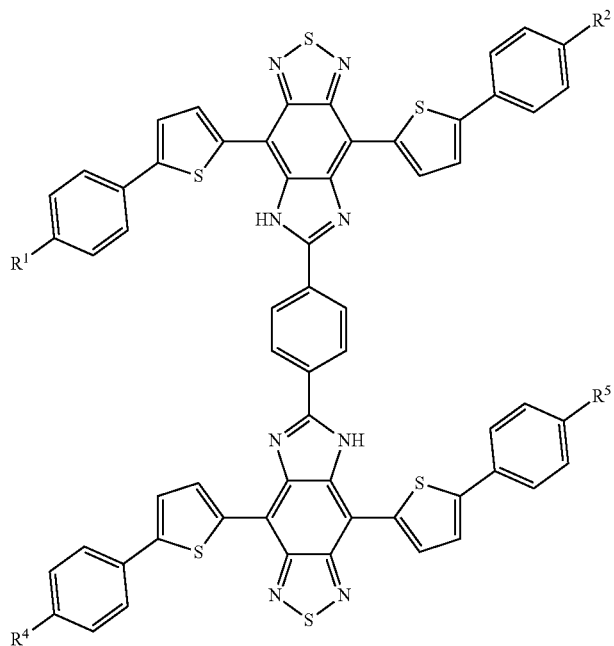
(1-47)
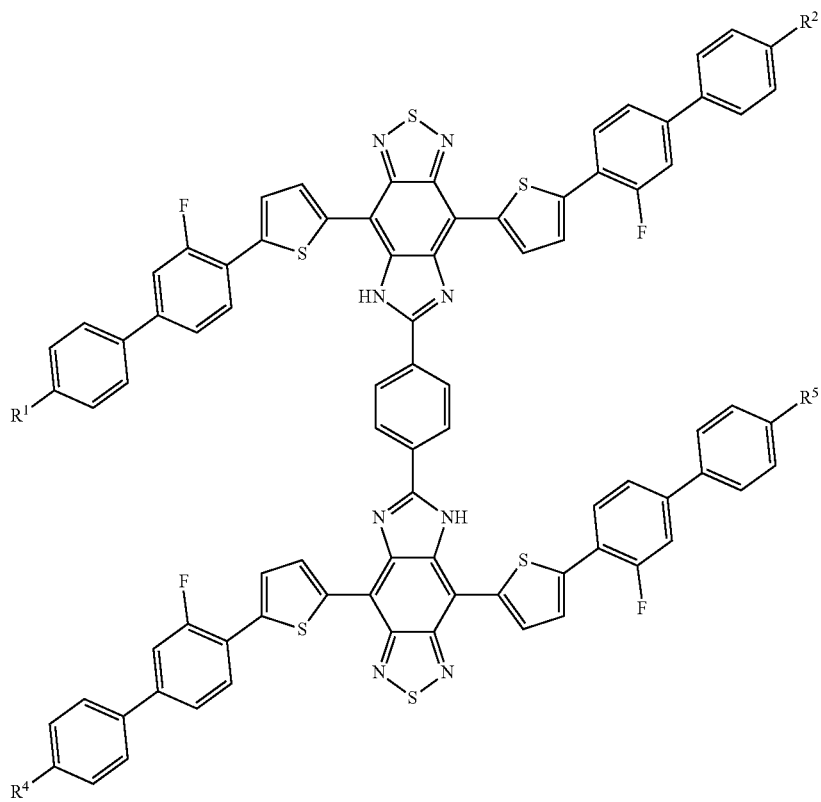
(1-48)

-continued
(1-49)
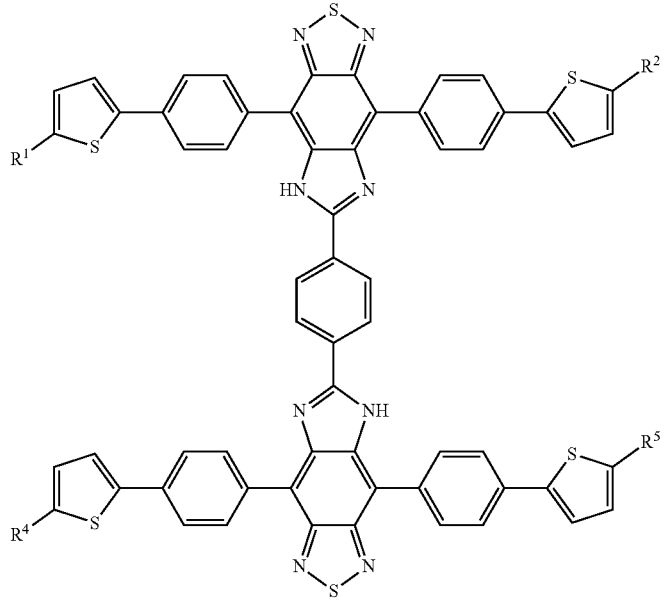
(1-50)
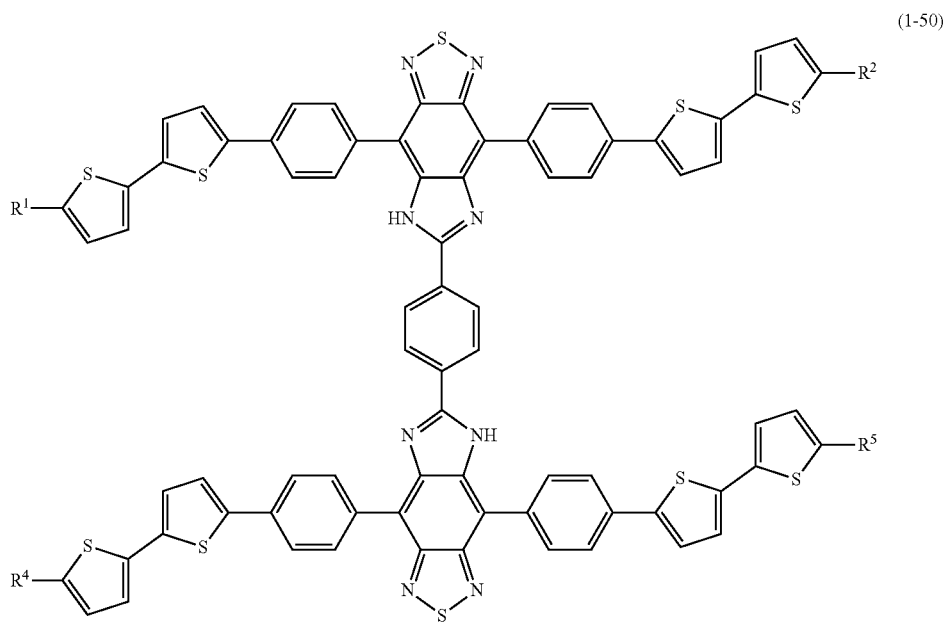
(In the formulae, $R^1$, $R^2$, $R^4$, and $R^5$ have the same meaning as $R^1$, $R^2$, $R^4$, and $R^5$ in general formula (1).)
[Chem. 19]
(1-51)
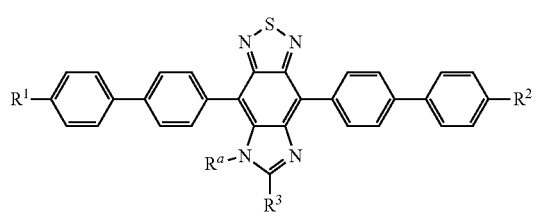
(1-52)
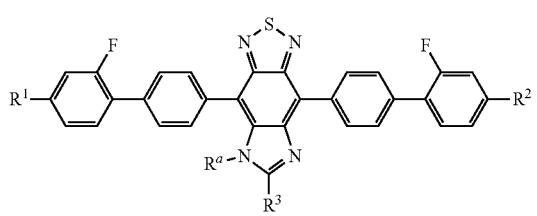

(1-53)
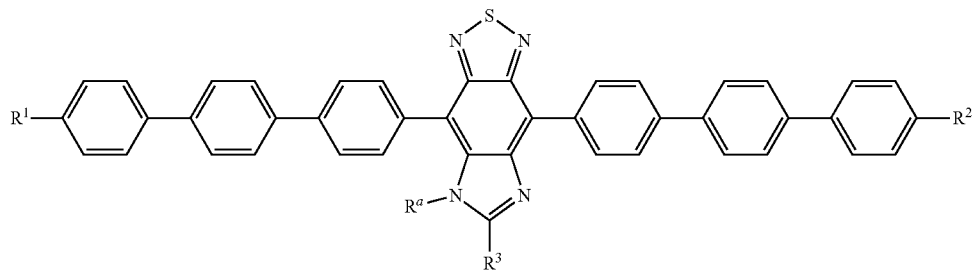
(1-54)
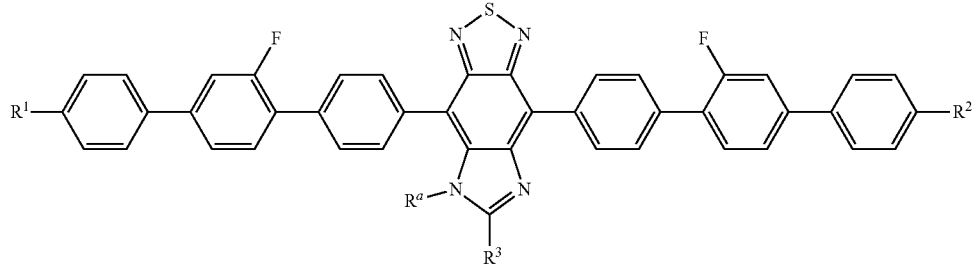
(1-55)
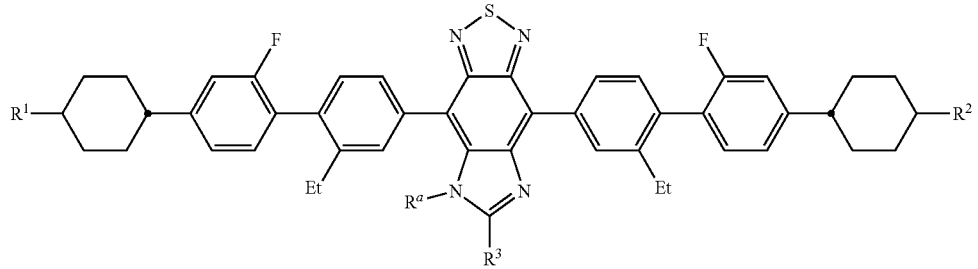
(1-56)
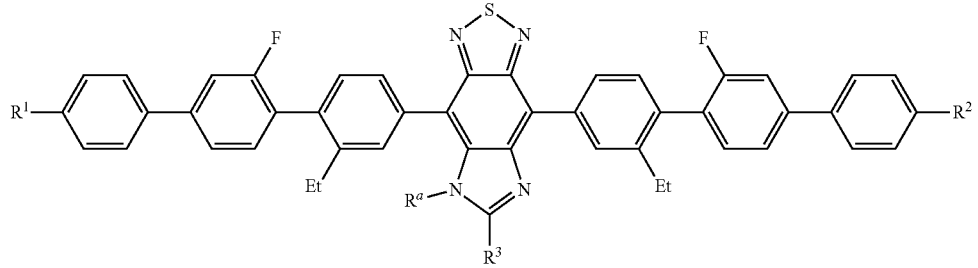
(1-57)
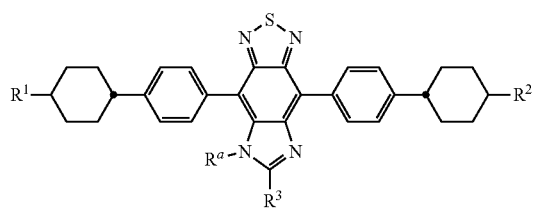
(1-58)
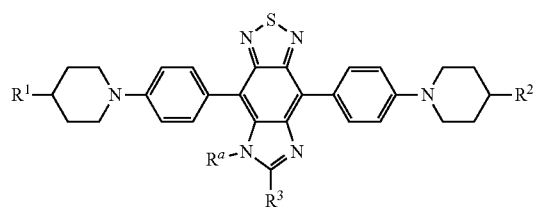
(1-59)
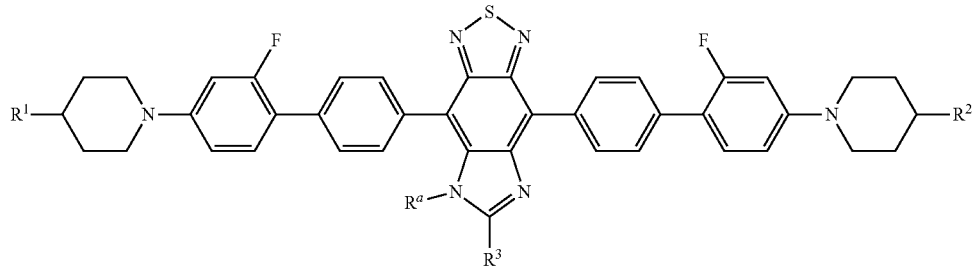

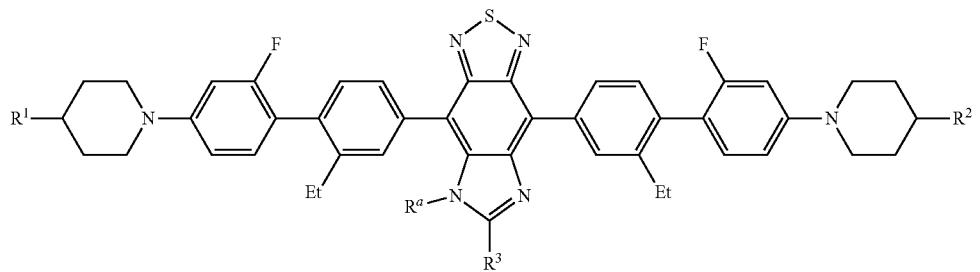
(1-60)
(In the formulae, $R^1$, $R^2$, $R^3$, and $R^a$ have the same meaning as $R^1$, $R^2$, $R^3$, and $R^a$ in general formula (1).)
[Chem. 20]
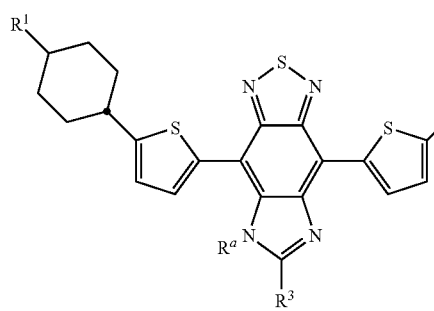
(1-61)
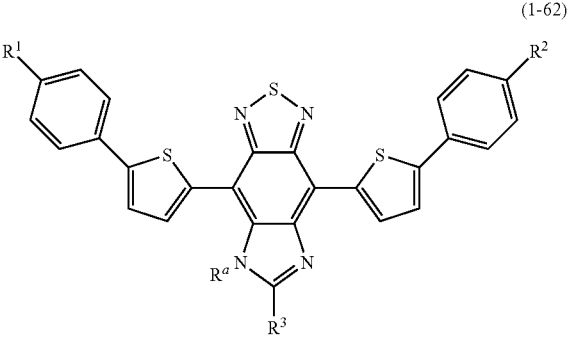
(1-62)
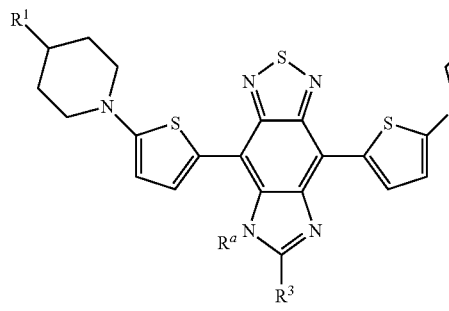
(1-63)
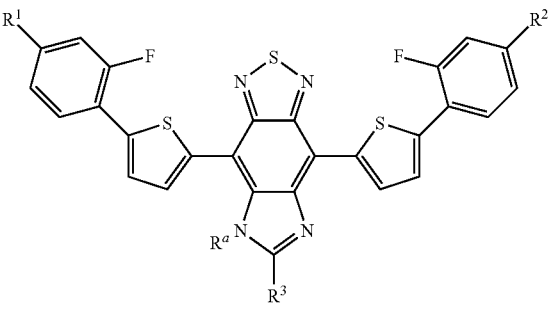
(1-64)
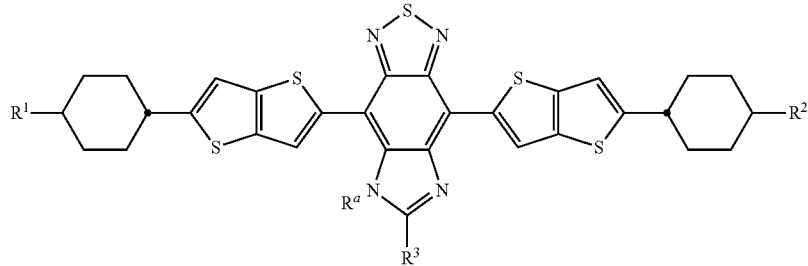
(1-65)
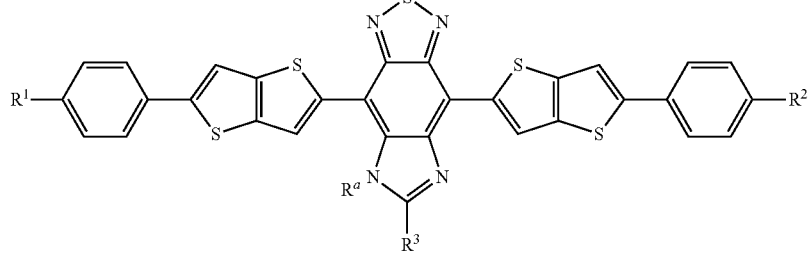
(1-66)

-continued
(1-67)
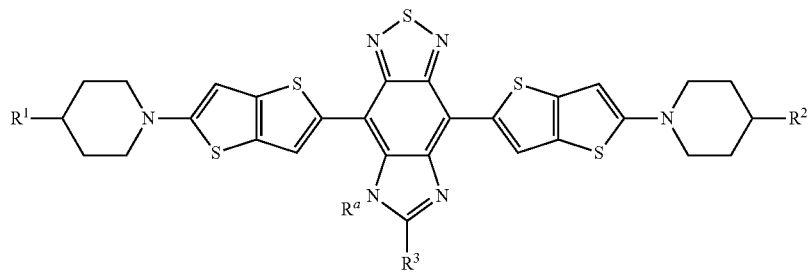
(1-68)
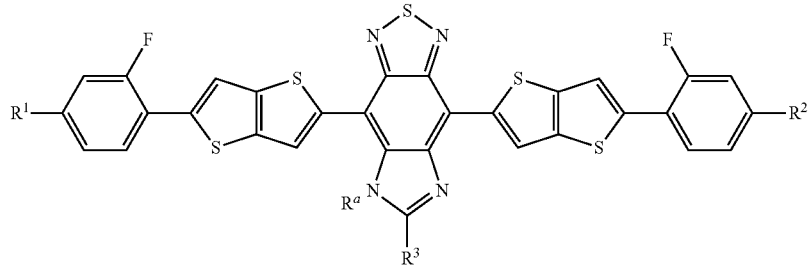
(1-69)
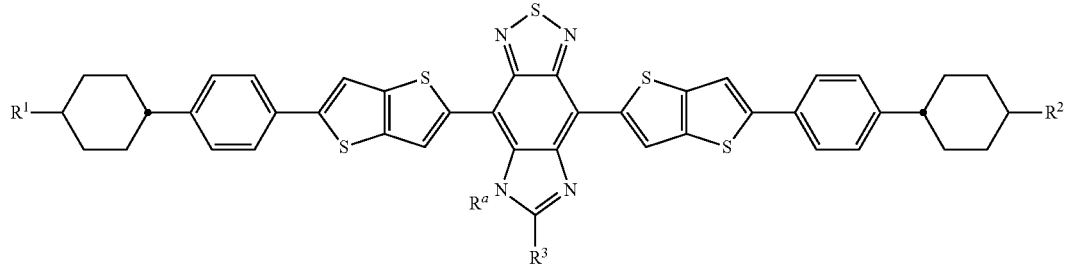
(1-70)
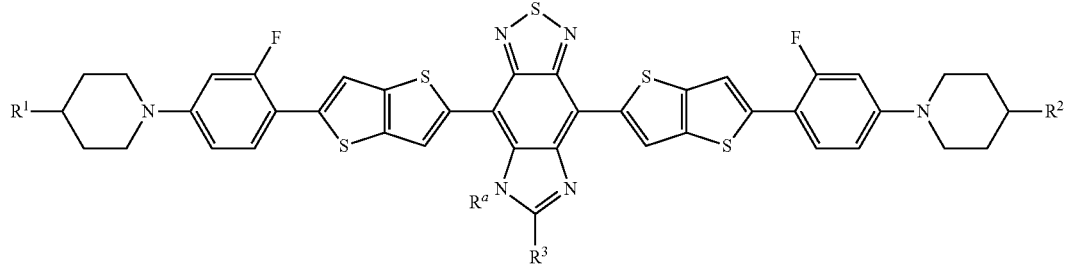
(1-71)
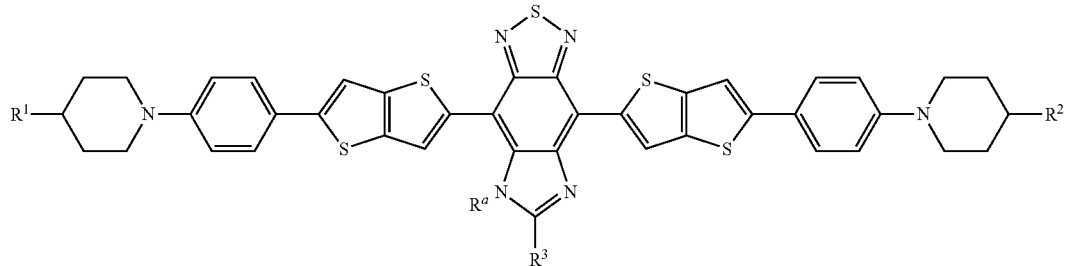

(1-72)
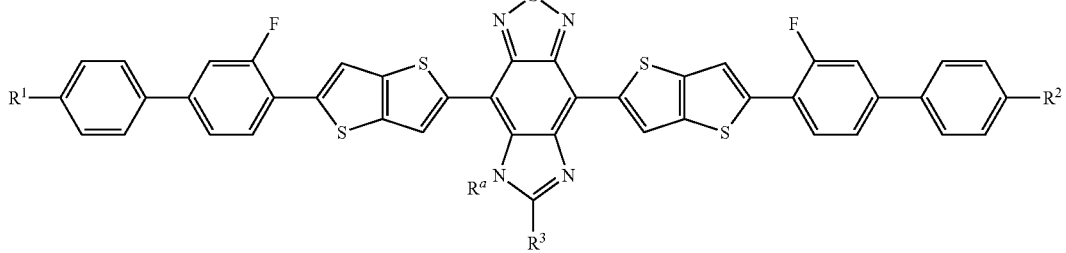
(In the formulae, $R^1$, $R^2$, $R^3$, and $R^a$ have the same meaning as $R^1$, $R^2$, $R^3$, and $R^a$ in general formula (1).)
[Chem. 21]
(1-73)
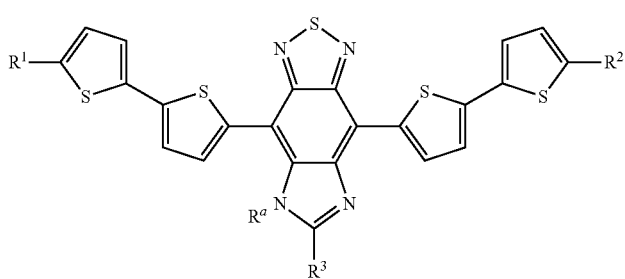
(1-74)
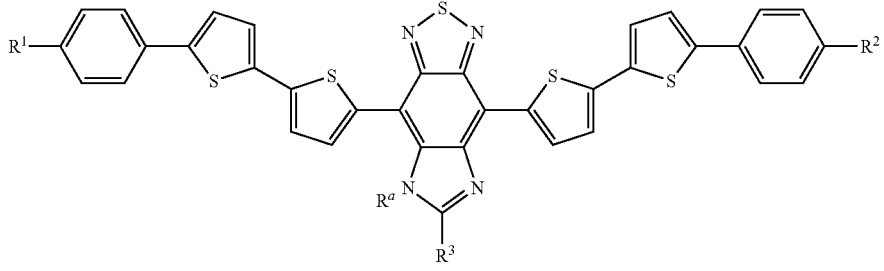
(1-75)
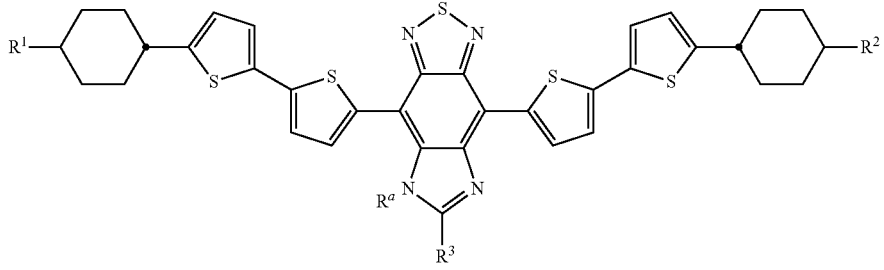
(1-76)
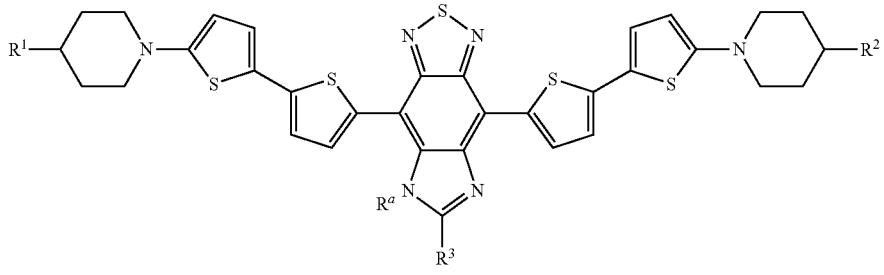

-continued (1-77)
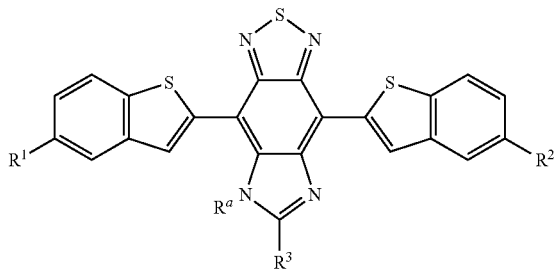

(1-78)
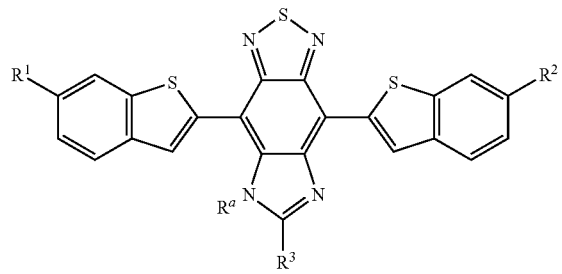

(1-79)
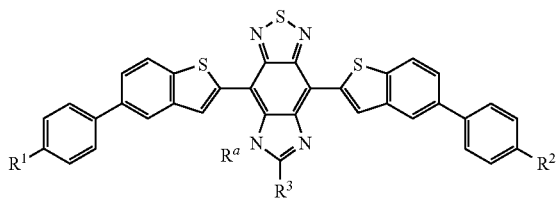

(1-80)
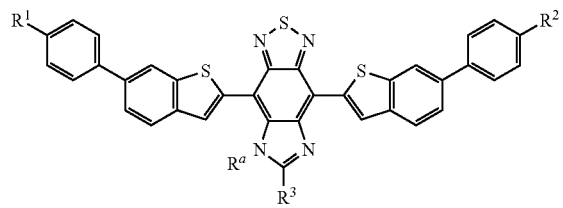

(In the formulae, $R^1$, $R^2$, $R^3$, and $R^a$ have the same meaning as $R^1$, $R^2$, $R^3$, and $R^a$ in general formula (1).)

(Manufacturing Method)

In the present invention, the compound represented by general formula (1) can be produced as follows. It is needless to say that the spirit and the applicable range of the present invention are not limited by these production examples.

The compound represented by general formula (1-a)

[Chem. 22]

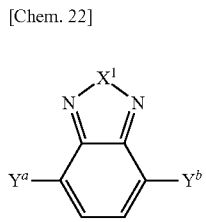

(1-a)

(wherein Xi has the same meaning as $X^a$, $X^b$, and $X^c$ in general formula (2) or (3), and $Y^a$ and $Y^b$ each independently represent a chlorine atom, a bromine atom, an iodine atom, or a trifluoromethanesulfonyloxy group) is allowed to react with fuming nitric acid and acid to yield a compound represented by general formula (1-b)

[Chem. 23]

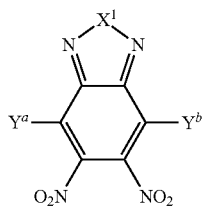

(1-b)

(wherein Xi has the same meaning as $X^a$, $X^b$, and $X^c$ in general formula (2) or (3), and $Y^a$ and $Y^b$ each independently represent a chlorine atom, a bromine atom, an iodine atom, or a trifluoromethanesulfonyloxy group).

Any acid that allows the reaction to proceed suitably can be used. Examples thereof include inorganic and organic acids, and among those, concentrated hydrochloric acid, concentrated sulfuric acid, phosphoric acid, trifluoroacetic acid, methanesulfonic acid, paratoluenesulfonic acid, and trifluoromethanesulfonic acid are preferred, and concentrated sulfuric acid and trifluoromethanesulfonic acid are even more preferred.

The reaction temperature can be any temperature that allows the reaction to proceed suitably, but temperatures from −20° C. to 80° C. are preferred.

The reaction may be carried out without a solvent, but chlorinated solvents such as dichloromethane, chloroform, carbon tetrachloride, 1,2-dichloroethane, and 1,1,2,2-tetrachloroethane may be used if necessary.

Subsequently, the compound represented by general formula (1-b) is allowed to react with the compound represented by general formula (1-c) in the presence of a base and a transition metal catalyst

[Chem. 24]

(1-c)

(wherein $R^{1a}$ has the same meaning as $R^1$, $R^2$, $R^4$, and $R^5$ in general formula (1) or (3), $A^{1a}$ has the same meaning as $A^1$, $A^2$, $A^4$, and $A^5$ in general formula (1) or (3), $Z^{1a}$ has the same meaning as $Z^1$, $Z^2$, $Z^4$, and $Z^5$ in general formula (1) or (3), n has the same meaning as i, j, c, and d in general formula (1) or (3), and W1 represents general formula (B-1) or (B-2)

[Chem. 25]

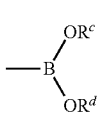

(B-1)

-continued

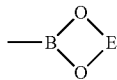
(B-2)

(wherein $R^c$ and $R^d$ each independently represent an optionally linear or branched alkyl group having 1 to 5 carbon atoms or a hydrogen atom, and E represents —$(CH_2)_s$—, wherein one or more hydrogen atoms in the group are each independently optionally substituted with a methyl group), a plurality of $A^{1a}$s, if present, may be the same or different $A^{1a}$s, and a plurality of $Z^{1a}$s, if present, may be the same or different $Z^{1a}$s) to produce a compound represented by general formula (1-d)

[Chem. 26]

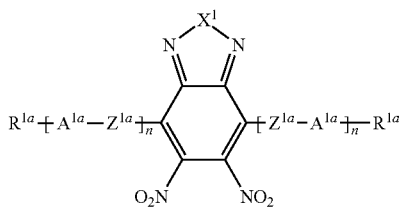
(1-d)

(wherein $R^{1a}$ has the same meaning as $R^1$, $R^2$, $R^4$, and $R^5$ in general formula (1) or (3), $A^{1a}$ has the same meaning as $A^1$, $A^2$, $A^4$, and $A^5$ in general formula (1) or (3), $Z^{1a}$ has the same meaning as $Z^1$, $Z^2$, $Z^4$, and $Z^5$ in general formula (1) or (3), and n has the same meaning as i, j, c, and d in general formula (1) or (3)).

Any solvent that allows the reaction to proceed suitably may be used, but ether-based solvents such as THF, diethyl ether, and diisopropyl ether, aromatic solvents such as benzene, toluene, and xylene, amide solvents such as DMF, N,N-dimethylacetamide, and N-methylpyrrolidone are preferred. THF, DMF, or toluene is preferred. These solvents may be used alone or mixed together if necessary, and water may be added to allow the reaction to proceed suitably.

The reaction temperature can be any temperature that allows the reaction to proceed suitably. Temperatures from room temperature to solvent reflux are preferred, and temperatures from 40° C. to solvent reflux are even more preferred.

Any base that allows the reaction to proceed suitably may be used. Examples include metal hydrides, metal carbonates, metal phosphates, metal hydroxides, metal carboxylates, metal amides, and metals. Among those, alkali metal hydrides, alkali metal phosphates, alkali metal carbonates, alkali metal hydroxides, alkali metal amides, and alkali metals are preferred, and alkali metal phosphates, alkali metal hydrides, and alkali metal carbonates are even more preferred. Preferable examples of the alkali metal hydrides include lithium hydride, sodium hydride, and potassium hydride. Preferable examples of the alkali metal phosphates include tripotassium phosphate. Preferable examples of the alkali metal carbonates include sodium carbonate, sodium bicarbonate, cesium carbonate, potassium carbonate, and potassium bicarbonate.

Any transition metal catalyst that allows the reaction to proceed suitably can be used. Palladium-based transition metal catalysts or nickel-based transition metal catalysts, such as tetrakis(triphenylphosphine)palladium(0), palladium(II) acetate, bis(triphenylphosphine)palladium(II) dichloride, [1,1'-bis(diphenylphosphino)ferrocene]palladium(II) dichloride, and bis(di-tert-butyl(4-dimethylaminophenyl) phosphine]palladium(II) dichloride are preferred, and tetrakis(triphenylphosphine)palladium(0), palladium(II) acetate, bis[di-tert-butyl(4-dimethylaminophenyl)phosphine]palladium(II) dichloride, or [1,1'-bis(diphenylphosphino)ferrocene]palladium(II) dichloride are even more preferred. A phosphine ligand may also be added if necessary to accelerate the progress of the reaction.

Subsequently, the compound represented by general formula (1-d) is allowed to react with metal powder and acid to produce a compound represented by general formula (1-e)

[Chem. 27]

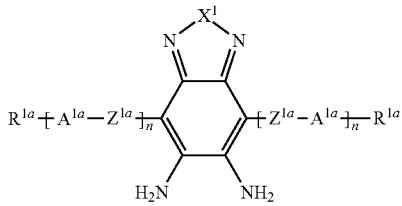
(1-e)

(wherein $R^{1a}$ has the same meaning as $R^1$, $R^2$, $R^4$, and $R^5$ in general formula (1) or (3), $A^{1a}$ has the same meaning as $A^1$, $A^2$, $A^4$, and $A^5$ in general formula (1) or (3), $Z^{1a}$ has the same meaning as $Z^1$, $Z^2$, $Z^4$, and Z in general formula (1) or (3), and n has the same meaning as i, j, c, and d in general formula (1) or (3)).

Any acid that allows the reaction to proceed suitably can be used. Hydrochloric acid, sulfuric acid, nitric acid, phosphoric acid, acetic acid, and trifluoroacetic acid are preferred, and hydrochloric acid and acetic acid are even more preferred.

The reaction temperature can be any temperature that allows the reaction to proceed suitably. Temperatures from room temperature to solvent reflux are preferred, and temperatures from 40° C. to 100° C. are even more preferred.

Any metal powder that allows the reaction to proceed suitably can be used. Zinc powder, iron powder, aluminum powder, and nickel powder are preferred, and zinc powder and iron powder are even more preferred.

The reaction may be carried out without a solvent, but chlorinated solvents such as dichloromethane, chloroform, carbon tetrachloride, 1,2-dichloroethane, and 1,1,2,2-tetrachloroethane may be used if necessary.

Subsequently, the compound represented by general formula (1-e) is allowed to react with general formula (1-f) or (1-g) in the presence of a reducing agent

[Chem. 28]

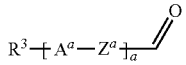
(1-f)

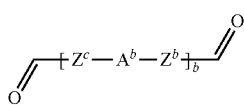
(1-g)

(wherein $R^3$, $A^a$, $Z^a$, and a each independently have the same meaning as $R^3$, $A^a$, $Z^a$, and a in general formula (2), and $A^b$, $Z^b$, $Z^c$, and b each independently have the same meaning as $A^b$, $Z^b$, $Z^c$, and b in general formula (3)) to produce the compound of interest represented by general formula (1).

Any reducing agent that allows the reaction to proceed suitably can be used. Examples include metal sulfites, and among those, alkali metal sulfites are preferred. Preferable examples of the alkali metal sulfites include sodium sulfite, potassium sulfite, sodium hydrogen sulfite, potassium hydrogen sulfite, sodium disulfite, and potassium disulfite.

The reaction temperature can be any temperature that allows the reaction to proceed suitably. Temperatures from room temperature to solvent reflux are preferred, and temperatures from 50° C. to solvent reflux are even more preferred.

Any solvent that allows the reaction to proceed suitably may be used, but ether-based solvents such as THF, diethyl ether, and diisopropyl ether, aromatic solvents such as benzene, toluene, and xylene, amide solvents such as DMF, N,N-dimethylacetamide, and N-methylpyrrolidone are preferred. DMF and N,N-dimethylacetamide are even more preferred. These solvents may be used alone or mixed together if necessary.

In the liquid crystal composition of the present invention, if the amount of the compound represented by general formula (1) is small, the effect will not be apparent. Therefore, the lower limit of the amount of the compound in the composition is preferably 1% or more by mass (hereinafter % in the composition represents % by mass), preferably 2% or more, and more preferably 3% or more. A large amount of the compound causes, for example, precipitation. Therefore, the upper limit of the amount of the compound is preferably 7% or less, and more preferably 6% or less. The compound represented by general formula (1) can be used alone, or two or more compounds may be used simultaneously.

As preferable typical examples of the compounds that can be mixed with the compound represented by general formula (1), the composition provided by the present invention, which contains at least one compound represented by general formula (1) as a first component, preferably contains at least one of the following second to fourth components as other components.

That is, the second component is a p-type liquid crystal compound with positive dielectric constant anisotropy, and examples include the compounds represented by the following general formula (LC1) and general formula (LC2).

[Chem. 29]

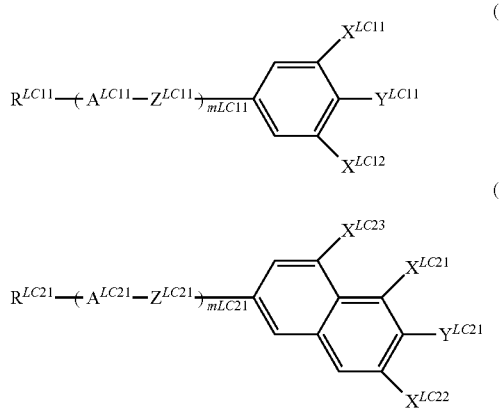

(In the formulae, $R^{LC11}$ and $R^{LC21}$ each independently represent an alkyl group having 1 to 15 carbon atoms, one or two or more —$CH_2$—'s in the alkyl group are optionally substituted with —O—, —CH=CH—, —CO—, —OCO—, —COO—, or —C≡C— such that oxygen atoms are not directly adjacent to each other, one or two or more hydrogen atoms in the alkyl group are optionally substituted with a halogen atom, $A^{LC11}$ and $A^{LC21}$ each independently represent any of the following structures

[Chem. 30]

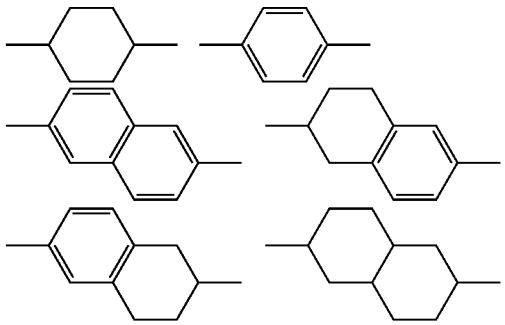

(wherein one or two or more —$CH_2$—'s in the cyclohexylene group are optionally substituted with an oxygen atom, one or two or more —CH—'s in the 1,4-phenylene group are optionally substituted with a nitrogen atom, and one or two or more hydrogen atoms in the structures are optionally substituted with a fluorine atom, a chlorine atom, —$CF_3$, or —$OCF_3$), $X^{LC11}$, $X^{LC12}$, and $X^{LC21}$ to $X^{LC23}$ each independently represent a hydrogen atom, a fluorine atom, a chlorine atom, —$CF_3$, or —$OCF_3$, $Y^{LC11}$ and $Y^{LC21}$ each independently represent a hydrogen atom, a fluorine atom, a chlorine atom, a cyano group, —$CF_3$, —$OCH_2F$, —$OCHF_2$, or —$OCF_3$, $Z^{LC11}$ and $Z^{LC21}$ each independently represent a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—, $m^{LC11}$ and $m^{LC21}$ each independently represent an integer of 1 to 4, and pluralities of $A^{LC11}$s, $A^{LC21}$s, $Z^{LC11}$s, and $Z^{LC21}$s, if present, may be the same or different.)

$R^{LC11}$ and $R^{LC221}$ are preferably each independently an alkyl group having 1 to 7 carbon atoms, an alkoxy group having 1 to 7 carbon atoms, or an alkenyl group having 2 to 7 carbon atoms, more preferably an alkyl group having 1 to 5 carbon atoms, an alkoxy group having 1 to 5 carbon atoms, or an alkenyl group having 2 to 5 carbon atoms, and even more preferably linear. The most preferred alkenyl group has the following structure.

[Chem. 31]

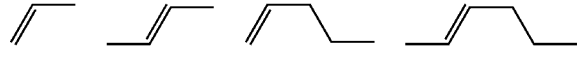

(In the formula, the rightmost end is bonded to the ring structure.)

$A^{LC11}$ and $A^{LC21}$ are preferably each independently the following structure.

[Chem. 32]

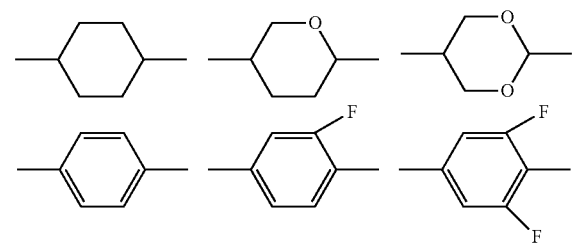

$Y^{LC11}$ and $Y^{LC21}$ are preferably each independently a fluorine atom, a cyano group, —$CF_3$, or —$OCF_3$, preferably a fluorine atom or —$OCF_3$, particularly preferably a fluorine atom.

$Z^{LC11}$ and $Z^{LC21}$ are preferably a single bond, —$CH_2CH_2$—, —COO—, —OCO—, —OCH—, —$CH_2O$—, —OCF—, or —$CF_2O$—, preferably a single bond, —$CH_2CH_2$—, —$OCH_2$—, —$OCF_2$—, or —$CF_2O$—, and more preferably a single bond, —$OCH_2$—, or —$CF_2O$—.

$m^{LC11}$ and $m^{LC21}$ are preferably 1, 2, or 3, preferably 1 or 2 when storage stability at low temperatures and response speed are important, preferably 2 or 3 in order to improve the upper limit temperature of the nematic phase.

General formula (LC1) is preferably one or two or more compounds selected from the group consisting of compounds represented by the following general formula (LC1-a) to general formula (LC1-c)

[Chem. 33]

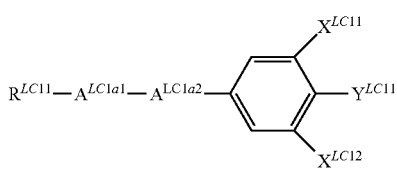

(LC1-a)

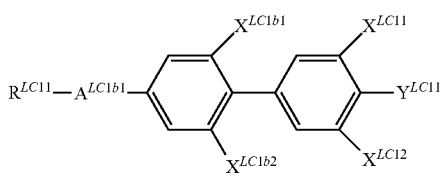

(LC1-b)

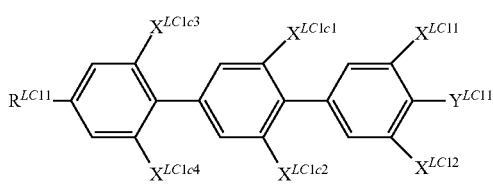

(LC1-c)

(wherein $R^{LC11}$, $Y^{LC11}$, $X^{LC11}$, and $X^{LC12}$ each independently have the same meaning as $R^{LC111}$, $Y^{LC11}$, $X^{LC11}$, and $X^{LC12}$ in the above general formula (LC1), $A^{LC1a1}$, $A^{LC1a2}$, and $A^{LC1b1}$ each independently represent a trans-1,4-cyclohexylene group, a tetrahydropyran-2,5-diyl group, and a 1,3-dioxane-2,5-diyl group, and $X^{LC1b1}$, $X^{LC1b2}$, and $X^{LC1c1}$ to $X^{LC1c4}$ each independently represent a hydrogen atom, a fluorine atom, a chlorine atom, —$CF_3$, or —$OCF_3$).

$R^{LC11}$ is preferably independently an alkyl group having 1 to 7 carbon atoms, an alkoxy group having 1 to 7 carbon atoms, or an alkenyl group having 2 to 7 carbon atoms, and more preferably an alkyl group having 1 to 5 carbon atoms, an alkoxy group having 1 to 5 carbon atoms, or an alkenyl group having 2 to 5 carbon atoms.

$X^{LC11}$ to $X^{LC1c4}$ are preferably each independently a hydrogen atom or a fluorine atom.

$Y^{LC11}$ is preferably independently a fluorine atom, —$CF_3$, or —$OCF_3$.

General formula (LC1) is preferably one or two or more compounds selected from the group consisting of compounds represented by the following general formula (LC1-d) to general formula (LC1-m)

[Chem. 34]

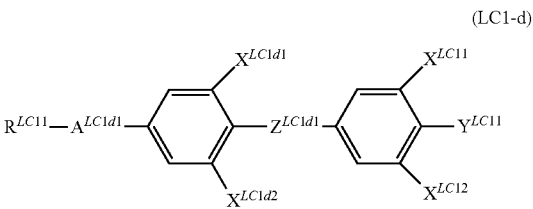

(LC1-d)

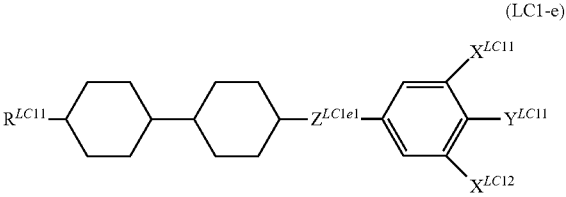

(LC1-e)

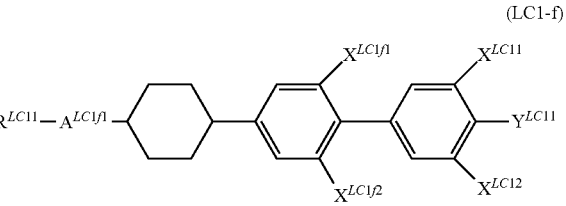

(LC1-f)

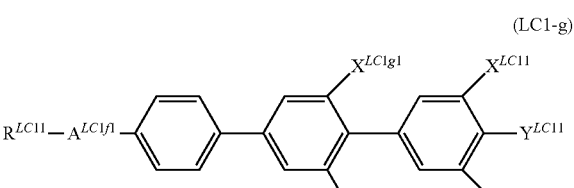

(LC1-g)

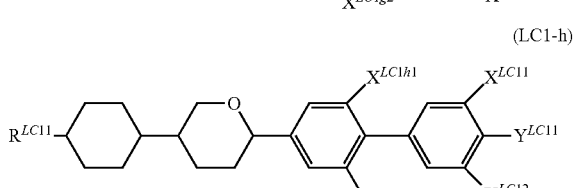

(LC1-h)

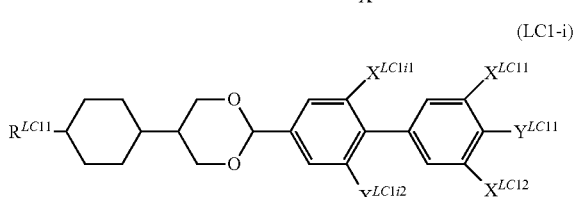

(LC1-i)

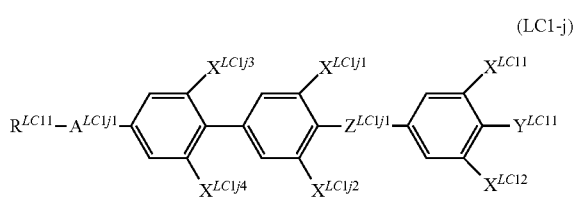

(LC1-j)

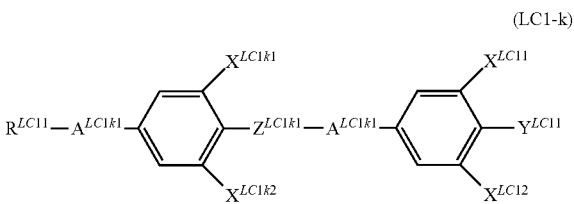

(LC1-k)

-continued (LC1-m)

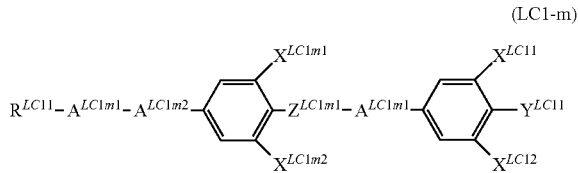

(wherein $R^{LC11}$, $Y^{LC11}$, $X^{LC11}$, and $X^{LC12}$ each independently have the same meaning as $R^{LC11}$, $Y^{LC11}$, $X^{LC11}$, and $X^{LC12}$ in the above general formula (LC1), $A^{LC1d1}$, $A^{LC1f1}$, $A^{LC1g1}$, $A^{LC1j1}$, $A^{LC1k1}$, $A^{LC1k2}$, and $A^{LC1m1}$ to $A^{LC1m3}$ represent a 1,4-phenylene group, a trans-1,4-cyclohexylene group, a tetrahydropyrane-2,5-diyl group, or a 1,3-dioxane-2,5-diyl group, $X^{LC1d1}$, $X^{LC1d2}$, $X^{LC1f1}$, $X^{LC1f2}$, $X^{LC1g1}$, $X^{LC1g2}$, $X^{LC1h1}$, $X^{LC1h2}$, $X^{LC1i1}$, $X^{LC1i2}$, $X^{LC1j1}$ to $X^{LC1j4}$, $X^{LC1k1}$, $X^{LC1k2}$, $X^{LC1m1}$, and $X^{LC1m2}$ each independently represent a hydrogen atom, a fluorine atom, a chlorine atom, —$CF_3$, or —$OCF_3$, $Z^{LC1d1}$, $Z^{LC1e1}$, $Z^{LC1j1}$, $Z^{LC1k1}$, and $Z^{LC1m1}$ each independently represent a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—).

$R^{LC11}$ is preferably independently an alkyl group having 1 to 7 carbon atoms, an alkoxy group having 1 to 7 carbon atoms, or an alkenyl group having 2 to 7 carbon atoms, and more preferably an alkyl group having 1 to 5 carbon atoms, an alkoxy group having 1 to 5 carbon atoms, or an alkenyl group having 2 to 5 carbon atoms.

$X^{LC11}$ to $X^{LC1m2}$ are preferably each independently a hydrogen atom or a fluorine atom.

$Y^{LC11}$ is preferably independently a fluorine atom, —$CF_3$, or —$OCF_3$.

$Z^{LC1d1}$ to $Z^{LC1m1}$ are preferably each independently —$CF_2O$— or —$OCH_2$—.

General formula (LC2) is preferably one or two or more compounds selected from the group consisting of compounds represented by the following general formula (LC2-a) to general formula (LC2-g)

[Chem. 35]

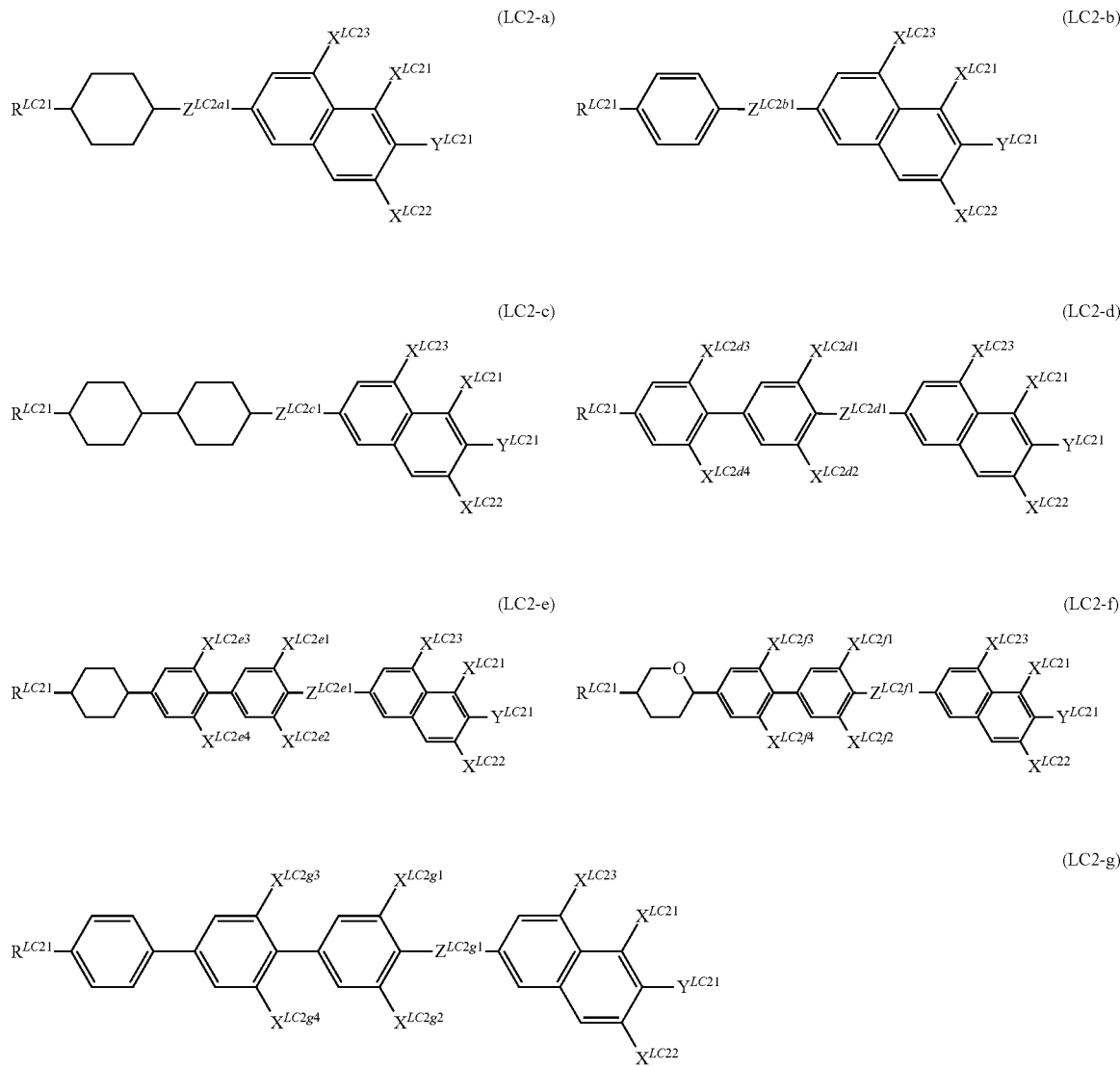

(wherein $R^{LC21}$, $Y^{LC21}$, and $X^{LC21}$ to $X^{LC23}$ each independently have the same meaning as $R^{LC21}$, $Y^{LC21}$, and $X^{LC21}$ to $X^{LC23}$ in the above general formula (LC2), $X^{LC2d1}$ to $X^{LC2d4}$, $X^{LC2e1}$ to $X^{LC2e4}$, $X^{LC2f1}$ to $X^{LC2f4}$, and $X^{LC2g1}$ to $X^{LC2g4}$ each independently represent a hydrogen atom, a fluorine atom, a chlorine atom, —$CF_3$, or —$OCF_3$, and $Z^{LC2a1}$, $Z^{LC2b1}$, $Z^{LC2c1}$, $Z^{LC2d1}$, $Z^{LC2e1}$, $Z^{LC2f1}$, and $Z^{LC2g1}$ each independently represent a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—).

$R^{LC21}$ is preferably independently an alkyl group having 1 to 7 carbon atoms, an alkoxy group having 1 to 7 carbon atoms, or an alkenyl group having 2 to 7 carbon atoms, and more preferably an alkyl group having 1 to 5 carbon atoms, an alkoxy group having 1 to 5 carbon atoms, or an alkenyl group having 2 to 5 carbon atoms.

$X^{LC21}$ to $X^{LC2g4}$ are preferably each independently a hydrogen atom or a fluorine atom, and $Y^{LC21}$ is preferably independently a fluorine atom, —$CF_3$, or —$OCF_3$.

$Z^{LC2a1}$ to $Z^{LC2g4}$ are preferably each independently —$CF_2O$— or —$OCH_2$—.

The third component is an n-type liquid crystal compound with negative dielectric constant anisotropy, and examples include the compounds represented by the following general formula (LC3) to general formula (LC5).

[Chem. 36]

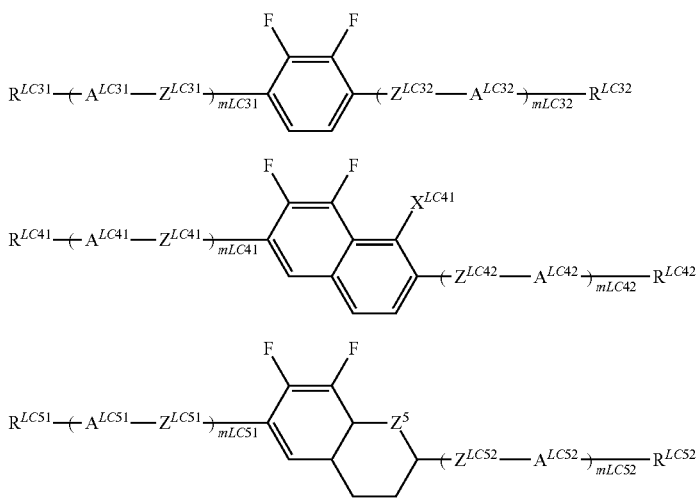

(LC3)

(LC4)

(LC5)

(In the formulae, $R^{LC31}$, $R^{LC32}$, $R^{LC41}$, $R^{LC42}$, $R^{LC51}$, and $R^{LC52}$ each independently represent an alkyl group having 1 to 15 carbon atoms, one or two or more —$CH_2$—'s in the alkyl group are optionally substituted with —O—, —CH=CH—, —CO—, —OCO—, —COO—, or —C≡C— such that oxygen atoms are not adjacent to each other, one or two or more hydrogen atoms in the alkyl group are optionally substituted with a halogen atom, $A^{LC31}$, $A^{LC32}$, $A^{LC41}$, $A^{LC42}$, $A^{LC51}$, and $A^{LC52}$ each independently represent any of the following structures

[Chem. 37]

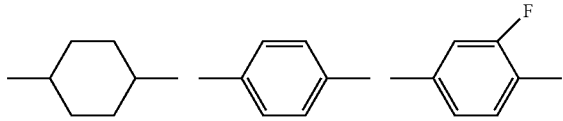

-continued

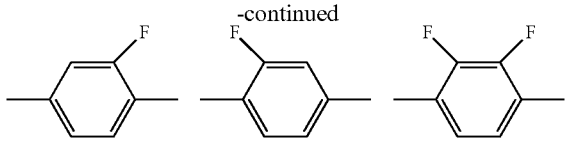

(wherein one or two or more —$CH_2$—'s in the cyclohexylene group are optionally substituted with an oxygen atom, one or two or more —CH—'s in the 1,4-phenylene group are optionally substituted with a nitrogen atom, and one or two or more hydrogen atoms are optionally substituted with a fluorine atom, a chlorine atom, —$CF_3$, or —$OCF_3$), $Z^{LC31}$, $Z^{LC32}$, $Z^{LC41}$, $Z^{LC42}$, $Z^{LC51}$, and $Z^{LC51}$ each independently represent a single bond, —CH=CH—, —C≡C—, —$CH_2CH_2$—, —$(CH_2)_4$—, —COO—, —$OCH_2$—, —$CH_2O$—, —$OCF_2$—, or —$CF_2O$—, $Z^5$ represents —$CH_2$— or an oxygen atom, $X^{LC41}$ represents a hydrogen atom or a fluorine atom, $m^{LC31}$, $m^{LC32}$, $m^{LC41}$, $m^{LC42}$, $m^{LC51}$, and $m^{LC52}$ each independently represent 0 to 3, and $m^{LC31}+m^{LC32}$, $m^{LC41}+m^{LC42}$, and $m^{LC51}+m^{LC52}$ are 1, 2 or 3, and pluralities of $A^{LC31}$s to $A^{LC52}$s and $Z^{LC31}$s to $Z^{LC52}$s, if present, may be the same or different.)

$R^{LC31}$ to $R^{LC52}$ are preferably each independently an alkyl group having 1 to 7 carbon atoms, an alkoxy group having 1 to 7 carbon atoms, or an alkenyl group having 2 to 7 carbon atoms, and it is most preferable that the alkenyl group represents the following structure.

[Chem. 38]

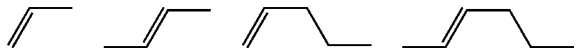

(In the formula, the rightmost end is bonded to the ring structure.)

$A^{LC31}$ to $A^{LC52}$ are preferably each independently the following structure.

[Chem. 39]

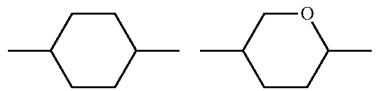

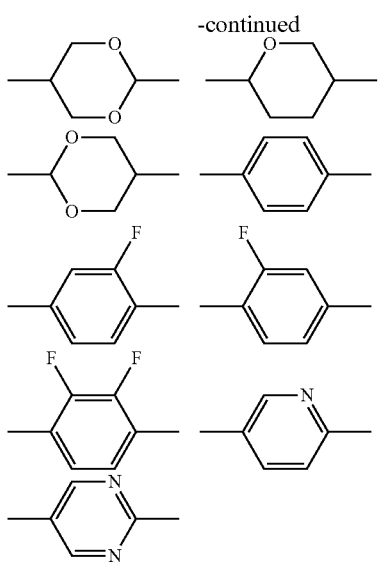

$Z^{LC31}$ to $Z^{LC51}$ are preferably each independently a single bond, —CH$_2$O—, —COO—, —OCO—, —CH$_2$CH$_2$—, —CF$_2$O—, —OCF$_2$—, or —OCH$_2$—.

General formula (LC3) is preferably one or two or more compounds selected from the compound group represented by the following general formula (LC3-a) and general formula

[Chem. 40]

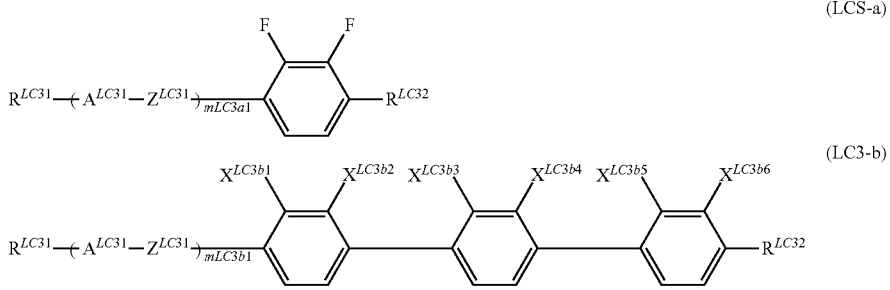

(LCS-a)

(LC3-b)

(In the formula, $R^{LC31}$, $R^{LC32}$, $A^{LC31}$, and $Z^{LC31}$ each independently have the same meaning as $R^{LC31}$, $R^{LC32}$, $A^{LC31}$, and $Z^{LC23}$ in the above general formula (LC3). $X^{LC3b1}$ to $L^{LC3b6}$ represent a hydrogen atom or a fluorine atom, but at least one of the combinations of $X^{LC3b1}$ and $X^{LC3b2}$ or $X^{LC3b3}$ and $X^{LC3b4}$ both represents a fluorine atom, $m^{LC3a1}$ is 1, 2, or 3, and $m^{LC3b1}$ represents 0 or 1. Pluralities of $A^{LC31}$s and $Z^{LC31}$s, if present, may be the same or different. However, in general formula (LC3-a), the compounds selected from the group represented by general formula (LC3-b) are excluded.)

$R^{LC31}$ and $R^{LC32}$ preferably each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.

$A^{LC31}$ preferably represents a 1,4-phenylene group, a trans-1,4-cyclohexylene group, a tetrahydropyrane-2,5-diyl group, or a 1,3-dioxane-2,5-diyl group, and more preferably represents a 1,4-phenylene group or a trans-1,4-cyclohexylene group.

$Z^{LC31}$ preferably represents a single bond, —CH$_2$O—, —COO—, —OCO—, or —CH$_2$CH$_2$—, and more preferably represents a single bond.

General formula (LC3-a) preferably represents the following general formula (LC3-a1) to general formula (LC3-a4).

[Chem. 41]

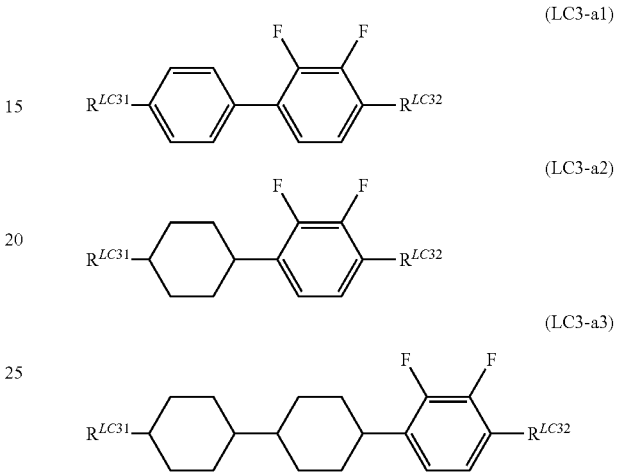

-continued

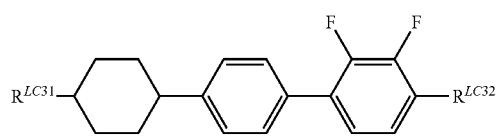

(LC3-a4)

(In the formulae, $R^{LC31}$ and $R^{LC32}$ each independently have the same meaning as $R^{LC31}$ and $R^{LC32}$ in the above general formula (LC3).)

Preferably, $R^{LC31}$ and $R^{LC32}$ each independently represent an alkyl group having 1 to 7 carbon atoms, an alkoxy group having 1 to 7 carbon atoms, or an alkenyl group having 2 to 7 carbon atoms. More preferably, $R^{LC31}$ represents an alkyl group having 1 to 7 carbon atoms and $R^{LC32}$ represents an alkoxy group having 1 to 7 carbon atoms.

General formula (LC3-b) preferably represents the following general formula (LC3-b1) to general formula (LC3-b12), more preferably represents general formula (LC3-b1), general formula (LC3-b6), general formula (LC3-b8), and general formula (LC3-b11), even more preferably represents general formula (LC3-b1) and general formula (LC3-b6), and most preferably represents general formula (LC3-b1).

[Chem. 42]

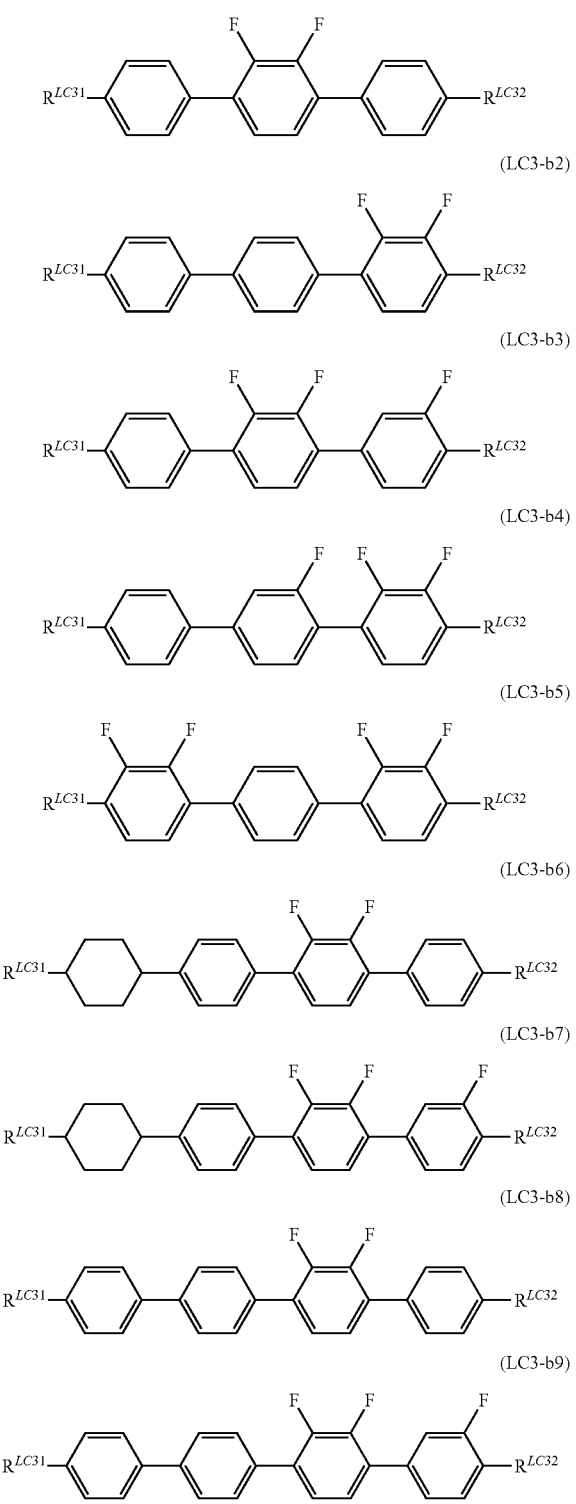

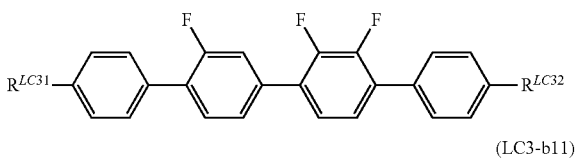

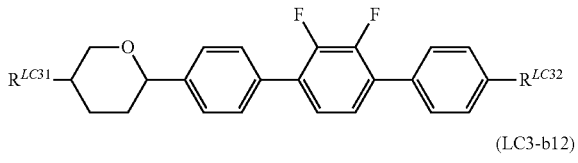

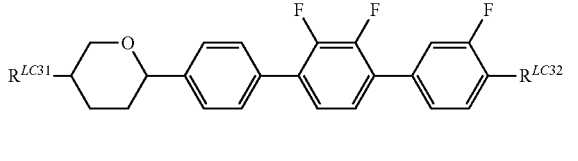

(In the formulae, $R^{LC31}$ and $R^{LC32}$ each independently have the same meaning as $R^{LC31}$ and $R^{LC32}$ in the above general formula (LC3).)

Preferably, $R^{LC31}$ and $R^{LC32}$ each independently represent an alkyl group having 1 to 7 carbon atoms, an alkoxy group having 1 to 7 carbon atoms, or an alkenyl group having 2 to 7 carbon atoms. More preferably, $R^{LC31}$ represents an alkyl group having 2 or 3 carbon atoms and $R^{LC32}$ represents an alkyl group having 2 carbon atoms.

General formula (LC4) is more preferably one or two or more compounds selected from the group consisting of compounds represented by the following general formula (LC4-a) to general formula (LC4-c), and general formula (LC5) is more preferably one or two or more compounds selected from the group consisting of compounds represented by the following general formula (LC5-a) to general formula (LC5-c)

[Chem. 43]

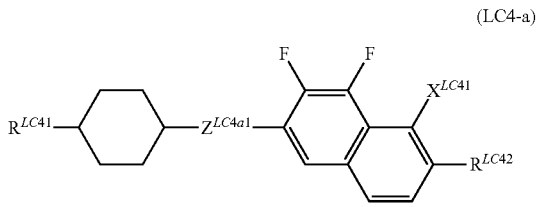

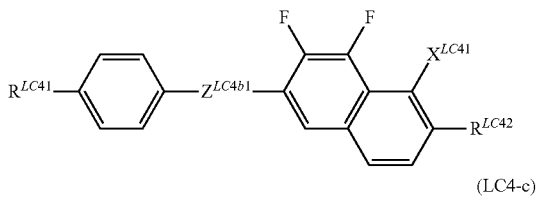

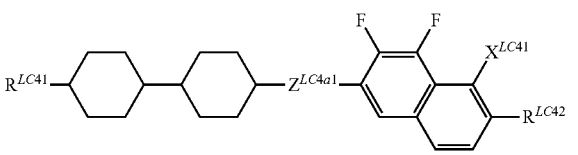

-continued (LC5-a)
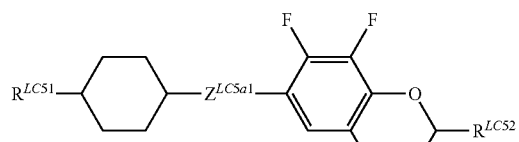

(LC5-b)
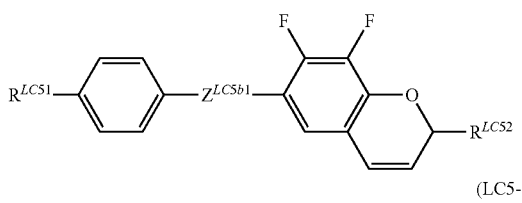

(LC5-c)
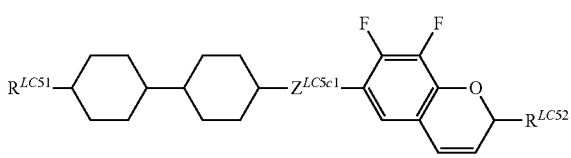

(wherein $R^{LC41}$, $R^{LC42}$, and $X^{LC41}$ each independently have the same meaning as $R^{LC41}$, $R^{LC42}$, and $X^{LC41}$ in the above general formula (LC4), $R^{LC51}$ and $R^{LC52}$ each independently have the same meaning as $R^{LC51}$ and $R^{LC52}$ in the above general formula (LC5), and $Z^{LC4a1}$, $Z^{LC4b1}$, $Z^{LC4c1}$, $Z^{LC5a1}$, $Z^{LC5b1}$, and $Z^{LC5c1}$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—).

$R^{LC41}$, $R^{LC42}$, $R^{LC51}$, and $R^{LC52}$ preferably each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.

$Z^{LC4a1}$ to $Z^{LC5c1}$ preferably each independently represent a single bond, —CH$_2$O—, —COO—, —OCO—, or —CH$_2$CH$_2$—, and more preferably a single bond.

The fourth component is a nonpolar liquid crystal compound with dielectric constant anisotropy of about zero, and examples include the compound represented by the following general formula (LC6).

[Chem. 44]

(LC6)
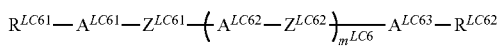

(In the formula, $R^{LC61}$ and $R^{LC62}$ each independently represent an alkyl group having 1 to 15 carbon atoms, one or two or more —CH$_2$—'s in the alkyl group are optionally substituted with —O—, —CH=CH—, —CO—, —OCO—, —COO—, or —C≡C— such that oxygen atoms are not directly adjacent to each other, one or two or more hydrogen atoms in the alkyl group are optionally substituted with halogen, $A^{LC61}$ to $A^{LC63}$ each independently represent one of the following

[Chem. 45]

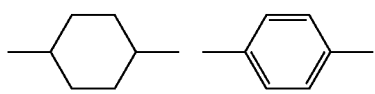

-continued

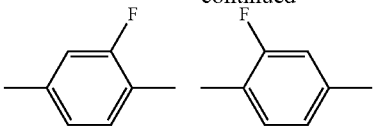

(wherein one or two or more —CH$_2$CH$_2$—'s in the cyclohexylene group are optionally substituted with —CH=CH—, —CF$_2$O—, or —OCF$_2$—, and one or two or more CH groups in the 1,4-phenylene group are optionally substituted with nitrogen), $Z^{LC61}$ and $Z^{LC62}$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—, and $m^{Lc6}$ represents 0 to 3. However, the compounds represented by general formula (LC1) to general formula (LC5) and general formula (i) are excluded.)

$R^{LC61}$ and $R^{LC62}$ are preferably each independently an alkyl group having 1 to 7 carbon atoms, an alkoxy group having 1 to 7 carbon atoms, or an alkenyl group having 2 to 7 carbon atoms, and it is most preferable that the alkenyl group represents the following structure.

[Chem. 46]

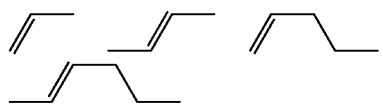

(In the formula, the rightmost end is bonded to the ring structure.)

$A^{LC61}$ to $A^{LC63}$ are preferably each independently the following structure, and

[Chem. 47]

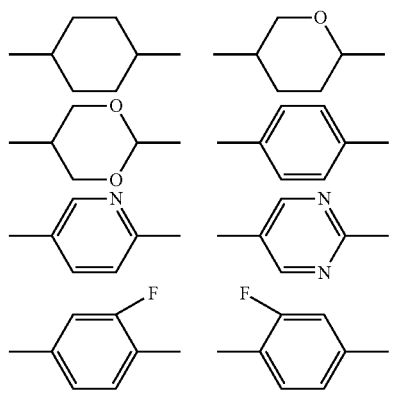

$Z^{LC61}$ and $Z^{LC62}$ are preferably each independently a single bond, —CH$_2$CH$_2$—, —COO—, —OCH$_2$—, —CH$_2$O—, —OCF$_2$—, or —CF$_2$O—.

General formula (LC6) is more preferably one or two or more compounds selected from the group consisting of compounds represented by general formula (LC6-a) to general formula (LC6-m)

[Chem. 48]

(LC6-a)
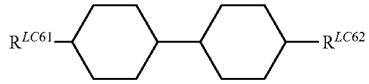

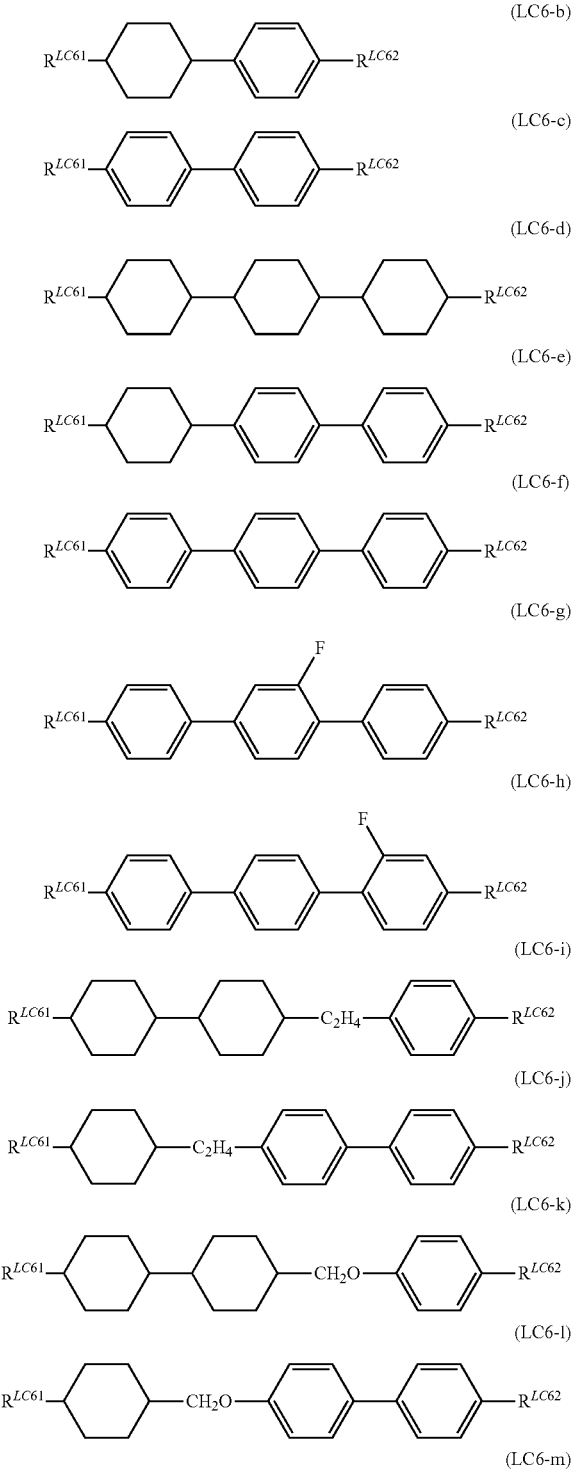

(wherein $R^{LC61}$ and $R^{LC62}$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms).

The liquid crystal compositions containing the compounds of the present invention are used as guest-host (GH) type liquid crystal compositions and are also preferably used as polymer dispersed liquid crystal compositions. These liquid crystal compositions are also suitable for use in passive matrix or active matrix liquid crystal displays.

The GH-type liquid crystal display devices, the polymer-dispersed liquid crystal display devices, or the light control devices using the liquid crystal compositions containing the compounds of the present invention are useful with high contrast and can be used even at low temperatures, and are applicable to devices for outdoor use in addition to indoor use.

EXAMPLES

The present invention is described in further detail with examples below but the present invention is not limited to these examples. "%" in the compositions of the following examples and comparative examples means '% by mass'. The phase transition temperature was measured using a polarizing microscope equipped with a temperature control stage and a differential scanning calorimeter (DSC).

The following abbreviations are used in the description of the compounds.

THF: tetrahydrofuran
amphos: di-tert-butyl(4-dimethylaminophenyl)phosphine

The dichroic ratio evaluation and the light resistance evaluation of the GH-type liquid crystal composition were performed by encapsulating it in a glass test panel. The cell thickness of this test panel was 3.5 μm, and AL1051 was used as the horizontal alignment film.

The dichroic ratio (R) was determined as follows. Linearly polarized light was used as a light source for the transmittance meter. Letting A0 be the transmittance at the maximum absorption wavelength when the orientation direction of the test panel was parallel to the linearly polarized light and A90 be the transmittance at the maximum absorption wavelength when the orientation direction of the test panel rotated was orthogonal to the linearly polarized light, the dichroic ratio (R) was calculated from the formula R=A0/A90.

Light resistance was evaluated by visually comparing the color of the test panel after being exposed to 500 W/m² of light for two weeks in an ATLAS SUNTEST with the color of the unirradiated test panel to see if any change in color was observed.

The solubility of the GH-type liquid crystal composition was evaluated by placing about 1 g of the liquid crystal composition in a vial and visually observing it for one month at room temperature to see if there was any precipitation.

(Example 1) Production of Compound (E-1) (4,8-bis(5-methylthiophen-2-yl)-6-(4-propylphenyl)-5H-imidazo[5,4-f]-2,1,3-benzothiadiazole)

[Chem. 49]

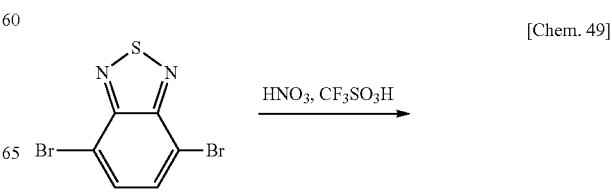

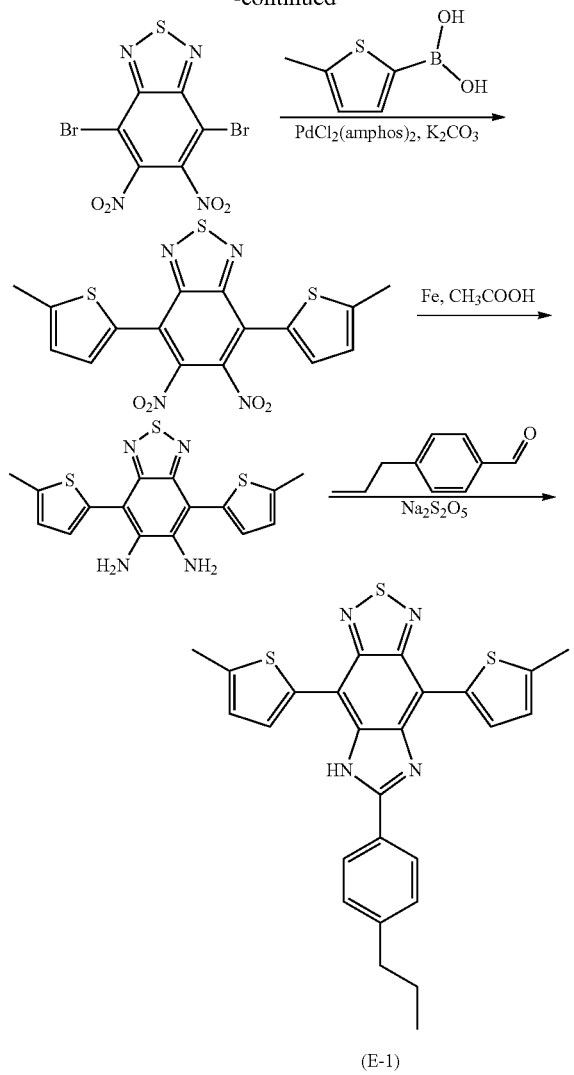

(E-1)

(1-1) Trifluoromethanesulfonic acid (50.0 g) was cooled in ice and subsequently, fuming nitric acid (5.1 g) was added slowly. At room temperature, 4,7-dibromo-2,1,3-benzothiadiazole (8.0 g) was added and stirred at 50° C. for six hours. The reaction solution was poured into ice water and neutralized by adding a 50% sodium hydroxide aqueous solution. The precipitated solid was filtered, washed with water, and dried under reduced pressure to give 4,7-dibromo-5,6-dinitro-2,1,3-benzothiadiazole (9.5 g).

(1-2) Under a dry nitrogen atmosphere, 4,7-dibromo-5,6-dinitro-2,1,3-benzothiadiazole (2.0 g) obtained in step 1-1-, 5-methyl-2-thiopheneboronic acid (1.6 g), bis[di-tert-butyl (4-dimethylaminophenyl)phosphine]palladium(II) dichloride (0.071 g), and THF (65 mL) were mixed and heated to 60° C. Under heating, a solution of potassium carbonate (2.9 g) dissolved in water (10 mL) was slowly added dropwise. After stirring at 60° C. for another six hours, the mixture was cooled to room temperature, and water (100 mL) and ethyl acetate (200 mL) were added to perform liquid separation. The organic layer was washed with saturated brine (100 mL) and dried with anhydrous sodium sulfate. After the organic solvent was distilled off under reduced pressure, 4,7-bis(5-methylthiophen-2-yl)-5,6-dinitro-2,1,3-benzothiadiazole (0.24 g) was obtained by purification by silica gel column chromatography.

(1-3) Under a dry nitrogen atmosphere, 4,7-bis(5-methylthiophen-2-yl)-5,6-dinitro-2,1,3-benzothiadiazole (0.23 g) obtained in step 1-2, iron powder (0.37 g), and acetic acid (20 mL) were mixed and stirred at 60° C. for two hours. After cooling to room temperature, the reaction solution was poured into ice water, and the precipitated solid was filtered. The solid was dissolved in ethyl acetate, iron powder was removed by filtration, and the organic solvent was distilled off under reduced pressure to give 4,7-bis(5-methylthiophen-2-yl)-5,6-diamino-2,1,3-benzothiadiazole (0.11 g).

(1-4) 4,7-Bis(5-methylthiophen-2-yl)-5,6-diamino-2,1,3-benzothiadiazole (0.11 g) obtained in step 1-3, 4-propylbenzaldehyde (0.048 g), sodium disulfite (0.070 g), and N,N-dimethylacetamide (15 mL) were mixed and then stirred at 100° C. for nine hours. After cooling to room temperature, water (80 mL) and ethyl acetate (50 mL) were added to perform liquid separation. The organic layer was washed with saturated brine (50 mL) and dried with anhydrous sodium sulfate. After the organic solvent was distilled off under reduced pressure, the compound (E-1) (4,8-bis(5-methylthiophen-2-yl)-6-(4-propylphenyl)-5H-imidazo[4',5': 4,5])benzo[1,2-c][1,2,5]thiadiazole) (0.019 g) was obtained by purification by silica gel column chromatography.

MS m/z: 486 [M+]

Phase transition temperature (° C.) Cr 237 Iso

UV-Vis (CH$_2$Cl$_2$, $\lambda_{max}$): 546 nm $^1$HNMR (CDCl$_3$, TMS internal standard) δ (ppm)=9.62 (1H, s), 8.78 (1H, d, J=3.6 Hz), 8.05 (2H, d, 8.4 Hz), 7.74 (1H, d, 3.6 Hz), 7.32 (2H, d, 8.4 Hz), 6.91-6.89 (2H, m), 2.64 (2H, t, 7.6 Hz), 2.58 (6H, s), 1.65 (2H, quin, 7.6 Hz), OH, t, 7.6 Hz), 2.58 (6H, s), 1.65 (2H, quin, 7.6 Hz), 0.92 (3H, t, 7.6 Hz)

(Example 2) Production of Compound (E-2) (1,4-bis(4,8-bis(5-(2-ethylhexyl)thiophen-2-yl)-5H-imidazo[5,4-f]-2,1,3-benzothiadiazol-6-yl)benzene)

[Chem. 50]

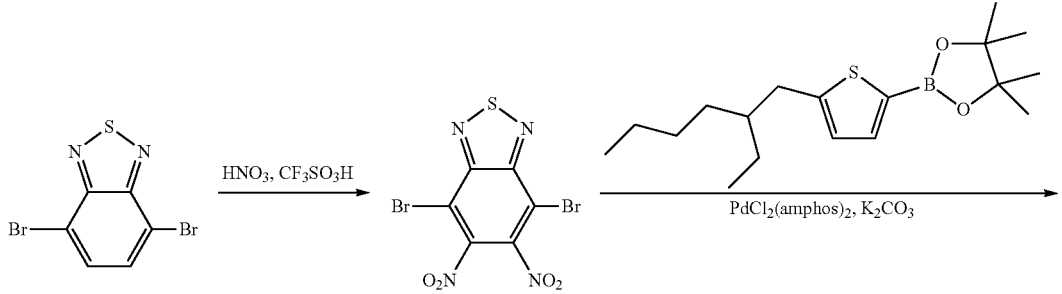

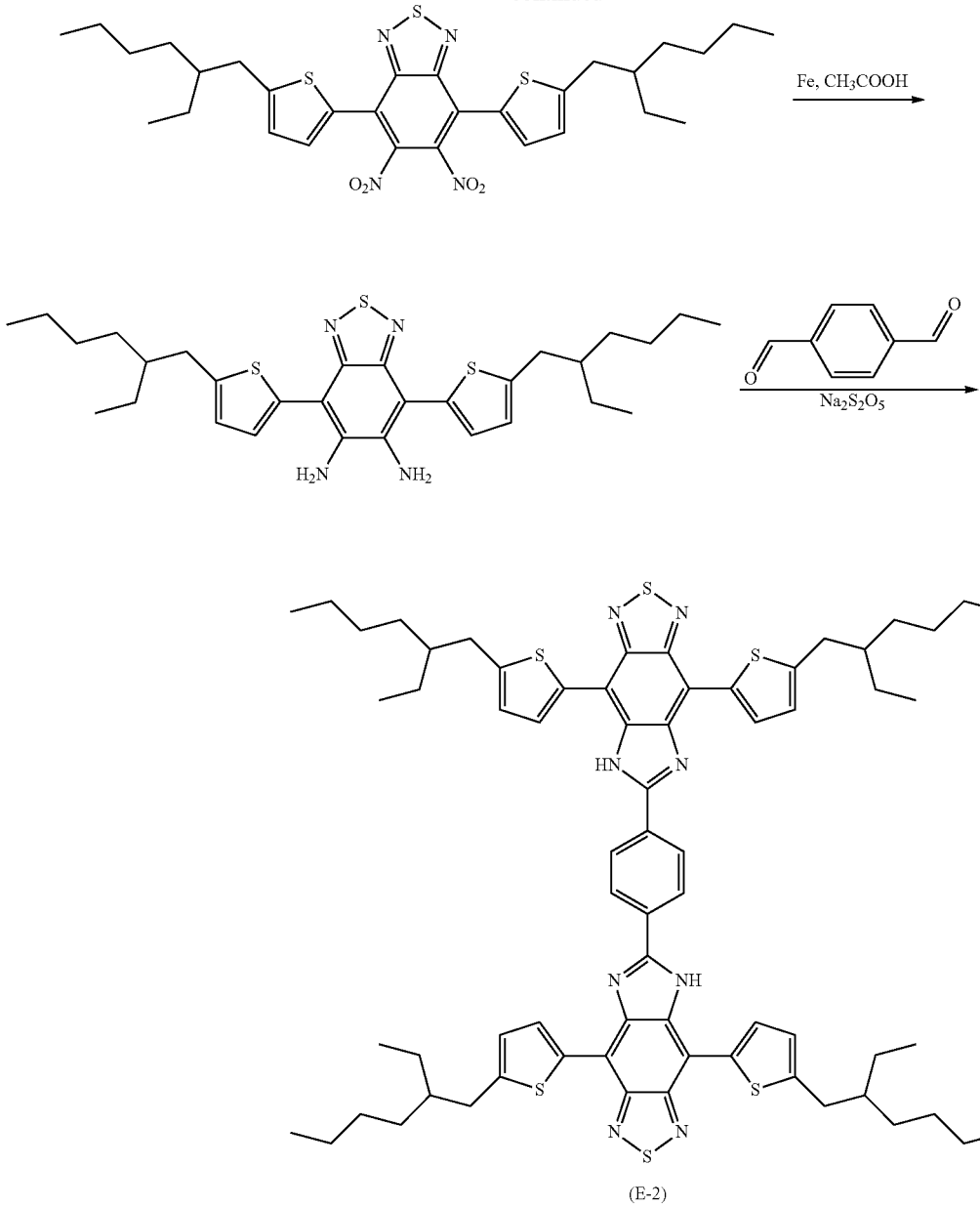

(E-2)

(2-1) Trifluoromethanesulfonic acid (50.0 g) was cooled in ice and subsequently, fuming nitric acid (5.1 g) was added slowly. At room temperature, 4,7-dibromo-2,1,3-benzothiadiazole (8.0 g) was added and stirred at 50° C. for six hours. The reaction solution was poured into ice water and neutralized by adding a 50% sodium hydroxide aqueous solution. The precipitated solid was filtered, washed with water, and dried under reduced pressure to give 4,7-dibromo-5,6-dinitro-2,1,3-benzothiadiazole (9.5 g).

(2-2) Under a dry nitrogen atmosphere, 4,7-dibromo-5,6-dinitro-2,1,3-benzothiadiazole (2.0 g) obtained in step 2-1, 2-(5-(2-ethylhexyl)-2-thienyl)-4,4,5,5-tetramethyl-1,3,2-dioxaborolane (3.7 g), bis[di-tert-butyl(4-dimethylaminophenyl)phosphine]palladium(II) dichloride (0.074 g), and THF (30 mL) were mixed and heated to 60° C. Under heating, a solution of potassium carbonate (2.9 g) dissolved in water (6 mL) was slowly added dropwise. After stirring at 60° C. for another five hours, the mixture was cooled to room temperature, and water (150 mL) and ethyl acetate (200 mL) were added to perform liquid separation. The organic layer was washed with saturated brine (100 mL) and dried with anhydrous sodium sulfate. After the organic solvent was distilled off under reduced pressure, 4,7-bis(5-(2-ethylhexyl)thiophen-2-yl)-5,6-dinitro-2,1,3-benzothiadiazole (0.36 g) was obtained by purification by silica gel column chromatography.

(2-3) Under a dry nitrogen atmosphere, 4,7-bis(5-(2-ethylhexyl)thiophen-2-yl)-5,6-dinitro-2,1,3-benzothiadiazole (0.36 g) obtained in step 2-2, iron powder (0.39 g), and acetic acid (20 mL) were mixed and stirred at 60° C. for three hours. After cooling to room temperature, the reaction solution was poured into ice water, and the precipitated solid was filtered. The solid was dissolved in ethyl acetate, iron powder was removed by filtration, and the organic solvent was distilled off under reduced pressure to give 4,7-bis(5-(2-ethylhexyl)thiophen-2-yl)-5,6-diamino-2,1,3-benzothiadiazole (0.32 g).

(2-4) 4,7-Bis(5-(2-ethylhexyl)thiophen-2-yl)-5,6-diamino-2,1,3-benzothiadiazole (0.28 g), benzene-1,4-dicarboxaldehyde (0.034 g), sodium disulfite (0.12 g), and N,N-dimethylacetamide (12 mL) were mixed and stirred at 100° C. for 22 hours. After cooling to room temperature, water (30 mL) and ethyl acetate (40 mL) were added to perform liquid separation. The organic layer was washed with saturated brine (30 mL) and dried with anhydrous sodium sulfate. After the organic solvent was distilled off under reduced pressure, the compound (E-2) (1,4-bis(4,8-bis(5-(2-ethylhexyl)thiophen-2-yl)-5H-imidazo[5,4-f]-2,1,3-benzothiadiazol-6-yl)benzene) (0.020 g) was obtained by purification by silica gel column chromatography.

MS m/z: 1203 [M$^+$]

UV-Vis (CH$_2$Cl$_2$, $\lambda_{max}$): 542 nm $^1$HNMR (CDCl$_3$, TMS internal standard) δ (ppm)=9.52 (2H, s), 8.79 (2H, d, J=3.6 Hz), 7.96 (4H, s), 7.82 (2H, s, J=4.0 Hz), 6.90 (4H, d, J=3.6 Hz), 2.90-2.87 (8H, m), 1.82-1.70 (4H, m), 1.54-1.32 (32H, m), 1.00-0.93 (24H, m)

Examples 3 to 4

The compound (E-3) of Example 3 and the compound (E-4) of Example 4 were synthesized in the same manner as in Examples 1 and 2.

[Chem. 52]

[Chem. 51]

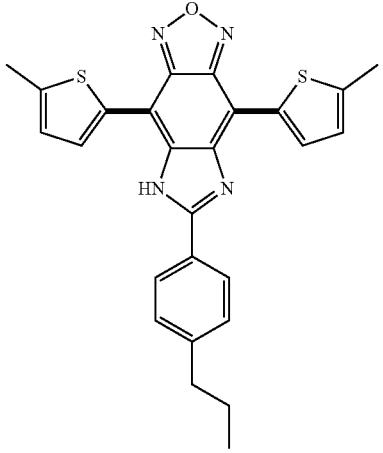

(E-3)

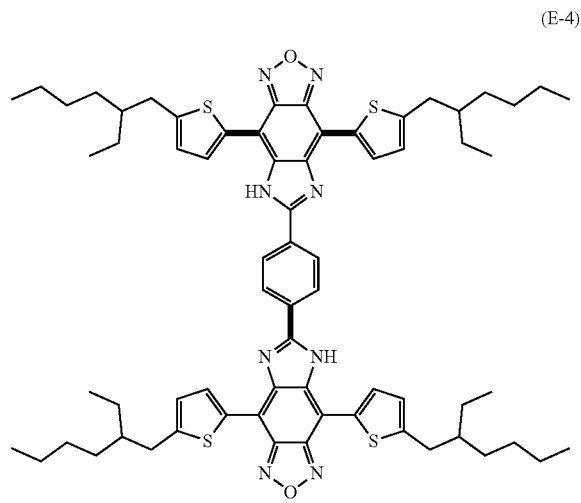

(E-4)

(Example 5) Production of Compound (E-5) (4,8-bis(2'-fluoro-4'-(4-pentylcyclohexyl)-(1,1'-biphenyl)-4-yl)-6-propyl-5H-imidazo[5,4-f]-2,1,3-benzothiadiazole)

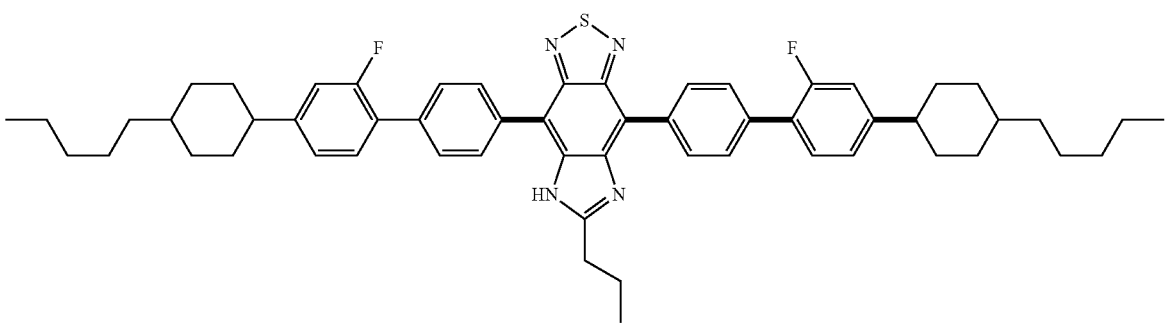

(E-5)

The compound (E-5) (4,8-bis(2'-fluoro-4'-(4-pentylcyclohexyl)-(1,1'-biphenyl)-4-yl)-6-propyl-5H-imidazo[5,4-f]-2,1,3-benzothiadiazole) was obtained in the same manner as in Example 1.

MS m/z: 862 [M$^+$]

Phase transition temperature (° C.) Cr 256 N 265 Iso

UV-Vis (CH$_2$Cl$_2$, λ$_{max}$): 436 nm $^1$HNMR (CDCl$_3$, TMS internal standard) δ (ppm)=9.14 (s, 1H), 8.24 (s, 1H), 8.12 (d, J=19.9 Hz, 1H), 7.84 (s, 1H), 7.73 (d, J=7.8 Hz, 1H), 7.43 (d, J=7.8 Hz, 1H), 7.40 (d, J=8.2 Hz, 1H), 7.23-7.26 (m, 2H), 6.99-7.10 (m, 4H), 2.93 (t, J=7.5 Hz, 2H), 2.68 (q, J=7.5 Hz, 4H), 2.55-2.55 (m, 2H), 1.90-2.01 (m, 6H), 1.50 (q, J=12.7 Hz, 4H), 1.26-1.33 (m, 12H), 1.18 (q, J=7.6 Hz, 6H), 1.05-1.12 (m, 7H), 0.91 (t, J=6.9 Hz, 6H)

(Example 6) Production of Compound (E-6) (4,8-bis(5-(4-methylpiperidin-1-yl)thiophen-2-yl)-6-propyl-5H-imidazo[5,4-f]-2,1,3-benzothiadiazole)

[Chem. 53]

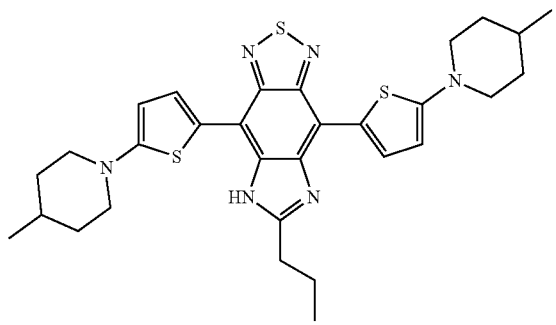

(E-6)

Compound (E-6) (4,8-bis(5-(4-methylpiperidin-1-yl)thiophen-2-yl)-6-propyl-5H-imidazo[5,4-f]-2,1,3-benzothiadiazole) was obtained in the same manner as in Example 1.

MS m/z: 576 [M$^+$]

Phase transition temperature (° C.) Cr 217 Iso

UV-Vis (CH$_2$Cl$_2$, λ$_{max}$): 608 nm $^1$HNMR (DMSO-d$_6$, TMS internal standard) δ (ppm)= 12.03, 8.67, 7.50, 6.30, 3.65, 2.92-2.94 (m, 6H), 1.90 (td, J=14.9, 7.3 Hz, 2H), 1.74 (d, J=12.3 Hz, 4H), 1.55-1.57 (m, 2H), 1.32 (dd, J=20.8, 11.2 Hz, 4H), 1.06 (t, J=7.3 Hz, 3H), 0.97 (d, J=6.4 Hz, 6H)

The results of NMR measurement suggest that the product may be a radical species.

(Example 7) Production of Compound (E-7) (4,8-bis(5-(4-heptylpiperidin-1-yl)thieno[3,2-b]thiophen-2-yl)-6-propyl-5H-imidazo[5,4-f]-2,1,3-benzothiadiazole)

[Chem. 54]

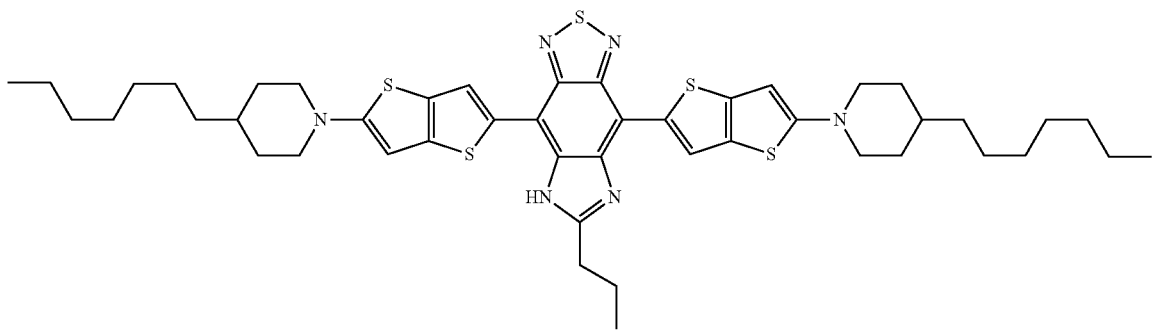

(E-7)

The compound (E-7) (4,8-bis(5-(4-heptylpiperidin-1-yl)thieno[3,2-b]thiophen-2-yl)-6-propyl-5H-imidazo[5,4-f]-2,1,3-benzothiadiazole) was obtained in the same manner as in Example 1.

MS m/z: 956 [M$^+$]

Phase transition temperature (° C.) Cr 119 Iso

UV-Vis (CH$_2$Cl$_2$, λ$_{max}$): 610 nm $^1$HNMR (Acetone-d$_6$, TMS internal standard) δ (ppm)= 11.41, 9.17, 7.98, 6.45 (s, 2H), 3.65 (d, J=11.4 Hz, 4H), 3.04 (t, J=6.8 Hz, 2H), 2.77-2.99 (m, 6H), 1.86 (d, J=10.5 Hz, 4H), 1.29-1.42 (m, 28H), 1.13 (t, J=7.6 Hz, 3H), 0.86-0.93 (m, 6H)

The results of NMR measurement suggest that the product may be a radical species.

(Example 8) Production of Compound (E-8) (4,8-bis(2-ethyl-2'-fluoro-4'-(4-pentylcyclohexyl)-(1,1'-biphenyl)-4-yl)-6-(trifluoromethyl)-5H-imidazo[5,4-f]-2,1,3-benzothiadiazole)

[Chem. 55]

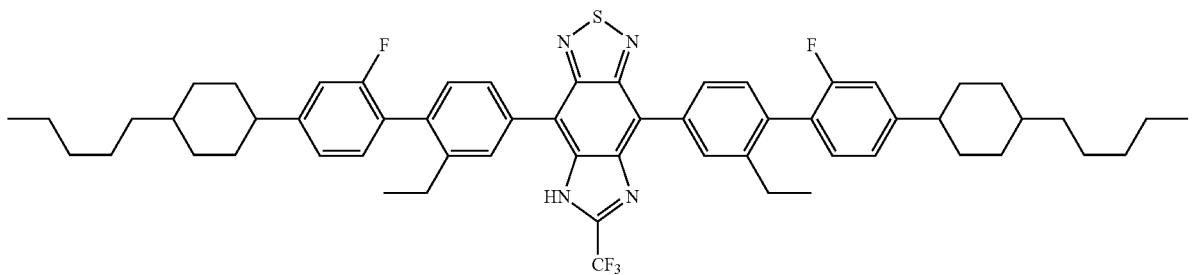

(E-8)

The compound (E-8) (4,8-bis(2-ethyl-2'-fluoro-4'-(4-pentylcyclohexyl)-(1,1'-biphenyl)-4-yl)-6-(trifluoromethyl)-5H-imidazo[5,4-f]-2,1,3-benzothiadiazole) was obtained in the same manner as in Example 1.

MS m/z: 944 [M$^+$]
Phase transition temperature (° C.) Cr 268 N 284 Iso
UV-Vis (CH$_2$Cl$_2$, λ$_{max}$): 443 nm
$^1$HNMR (CDCl$_3$, TMS internal standard) δ (ppm)=9.74 (s, 1H), 8.25 (d, J=1.8 Hz, 1H), 8.13 (dd, J=8.0, 1.6 Hz, 1H), 7.84 (d, J=1.8 Hz, 1H), 7.73 (dd, J=7.8, 1.4 Hz, 1H), 7.47 (d, J=7.8 Hz, 1H), 7.42 (d, J=7.8 Hz, 1H), 7.25 (td, J=7.6, 2.8 Hz, 2H), 7.00-7.11 (m, 4H), 2.69 (q, J=7.5 Hz, 4H), 2.51-2.58 (m, 2H), 1.99 (d, J=11.9 Hz, 4H), 1.92 (d, J=12.8 Hz, 4H), 1.50 (q, J=12.4 Hz, 4H), 1.24-1.34 (m, 18H), 1.20 (t, J=7.6 Hz, 3H), 1.17 (t, J=7.6 Hz, 3H), 1.09 (q, J=12.3 Hz, 4H), 0.91 (t, J=6.9 Hz, 6H)

(Example 9) Production of Compound (E-9) (4,8-bis(5-(2-fluoro-4-propylphenyl)thieno)[3,2-b]thiophen-2-yl)-6-propyl-5H-imidazo[5,4-f]-2,1,3-benzothiadiazole)

[Chem. 56]

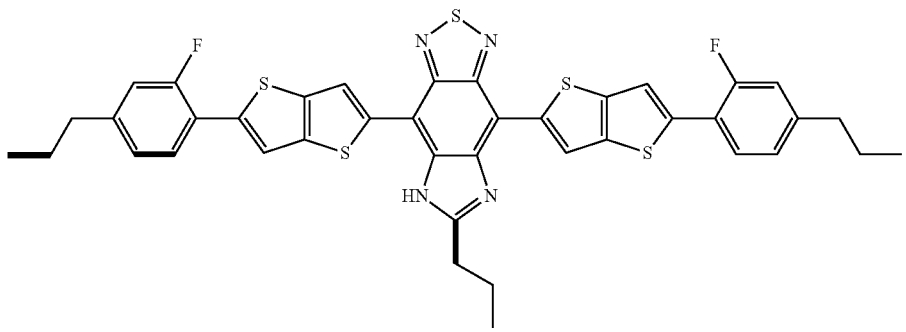

(E-9)

The compound (E-9) (4,8-bis(5-(2-fluoro-4-propylphenyl)thieno)[3,2-b]thiophen-2-yl)-6-propyl-5H-imidazo[5,4-f]-2,1,3-benzothiadiazole) was obtained in the same manner as in Example 1.

MS m/z: 766 [M$^+$]
Phase transition temperature (° C.) Cr 270 Iso
UV-Vis (CH$_2$Cl$_2$, λ$_{max}$): 552 nm $^1$HNMR (CDCl$_3$, TMS internal standard) δ (ppm)=9.47 (s, 1H), 9.29 (s, 1H), 8.25 (s, 1H), 7.72 (s, 1H), 7.71 (s, 1H), 7.56-7.62 (m, 2H), 6.99-7.04 (m, 4H), 3.07 (t, J=7.5 Hz, 2H), 2.63 (t, J=7.2 Hz, 2H), 2.62 (t, J=7.2 Hz, 2H), 2.09 (sext, J=7.6 Hz, 2H), 1.66-1.77 (m, 4H), 1.20 (t, J=7.3 Hz, 3H), 0.97 (t, J=7.3 Hz, 3H), 0.98 (t, J=7.3 Hz, 3H)

(Example 10) Production of Compound (E-10) (4,8-bis(2-ethyl-2'-fluoro-4'-(4-pentylcyclohexyl)-(1,1'-biphenyl)-4-yl)-6-methyl-5H-imidazo[5,4-f]-2,1,3-benzothiadiazole)

[Chem. 57]

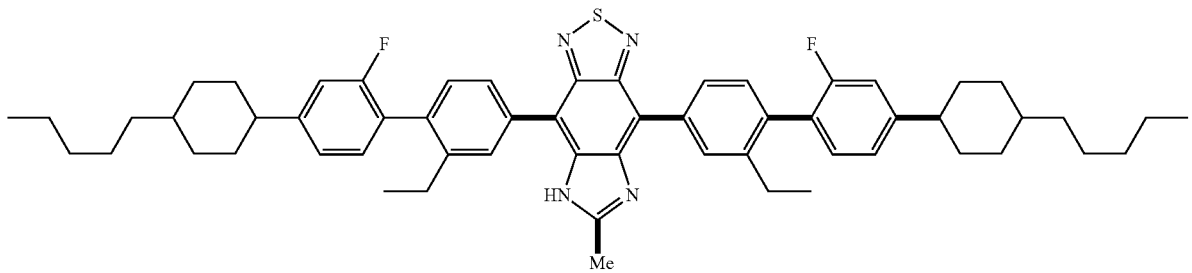

(E-10)

The compound (E-10) (4,8-bis(2-ethyl-2'-fluoro-4'-(4-pentylcyclohexyl)-(1,1'-biphenyl)-4-yl)-6-methyl-5H-imidazo[5,4-f]-2,1,3-benzothiadiazole) was obtained in the same manner as in Example 1.

MS m/z: 891 [M$^+$]
Phase transition temperature (° C.) Cr 248 N 280 Iso
UV-Vis (CH$_2$Cl$_2$, $\lambda_{max}$): 435 nm
$^1$HNMR (CDCl$_3$, TMS internal standard) δ (ppm)=9.46 (s, 1H), 8.14 (s, 1H), 8.04 (d, J=8.2 Hz, 1H), 7.83 (s, 1H), 7.70 (d, J=9.6 Hz, 1H), 7.39 (t, J=7.3 Hz, 2H), 7.22 (td, J=7.8, 4.6 Hz, 2H), 6.98-7.09 (m, 4H), 2.63-2.69 (m, 4H), 2.62 (s, 3H), 2.50-2.54 (m, 2H), 1.98 (d, J=12.3 Hz, 4H), 1.91 (d, J=12.8 Hz, 4H), 1.49 (q, J=12.5 Hz, 4H), 1.24-1.34 (m, 18H), 1.04-1.18 (m, 10H), 0.91 (t, J=6.9 Hz, 6H)

(Example 11) Production of Compound (E-11) (4,8-bis(2-ethyl-2'-fluoro-4'-(4-pentylcyclohexyl)-(1,1'-biphenyl)-4-yl)-5.6-methyl-5H-imidazo[5,4-f]-2,1,3-benzothiadiazole)

[Chem. 58]

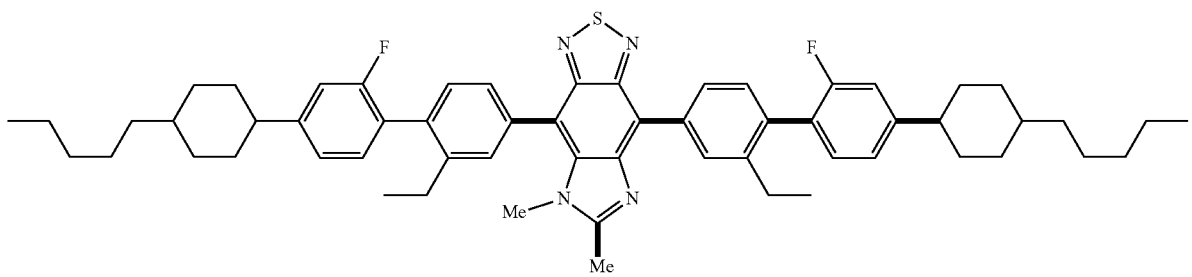

(E-11)

(11-1) 4,8-Bis(2-ethyl-2'-fluoro-4'-(4-pentylcyclohexyl)-(1,1'-biphenyl)-4-yl)-6-methyl-5H-imidazo[5,4-f]-2,1,3-benzothiadiazole (1.0 g), iodomethane (0.3 g), potassium carbonate (0.5 g), and DMF (10 mL) were mixed and stirred at room temperature for three hours. Water (50 mL) and dichloromethane (50 mL) were added to perform liquid separation. The organic layer was washed with saturated brine (30 mL) and dried with anhydrous sodium sulfate. After the organic solvent was distilled off under reduced pressure, the resulting solid was purified by silica gel column chromatography. Recrystallization from a mixture solvent of toluene and hexane gave 0.75 g of the compound (E-11) (4,8-bis(2-ethyl-2'-fluoro-4'-(4-pentylcyclohexyl)-(1,1'-biphenyl)-4-yl)-5,6-methyl-5H-imidazo[5,4-f]-2,1,3-benzothiadiazole).

Phase transition temperature (° C.) Cr 227 N 229 Iso
UV-Vis (CH$_2$Cl$_2$, $\lambda_{max}$): 434 nm
$^1$HNMR (CDCl$_3$, TMS internal standard) δ (ppm)=8.15 (d, J=1.4 Hz, 1H), 8.04 (dd, J=8.0, 1.6 Hz, 1H), 7.52 (s, 1H), 7.49 (dd, J=7.8, 1.8 Hz, 1H), 7.40 (t, J=7.3 Hz, 2H), 7.29 (t, J=8.0 Hz, 1H), 7.25 (t, J=8.0 Hz, 1H), 6.99-7.10 (m, 4H), 3.37 (s, 3H), 2.62-2.71 (m, 4H), 2.64 (s, 3H), 2.55 (s, 2H), 1.99 (d, J=13.3 Hz, 4H), 1.91 (d, J=13.3 Hz, 4H), 1.50 (q, J=12.7 Hz, 4H), 1.26-1.34 (m, 18H), 1.04-1.20 (m, 10H), 0.91 (t, J=6.9 Hz, 6H)

(Example 12) Production of Compound (E-12) (4,8-bis(5-(4-(3-ethylheptyl)piperidin-1-yl)thiophen-2-yl)-6-propyl-5H-imidazo[5,4-f]-2,1,3-benzothiadiazole)

[Chem. 59]

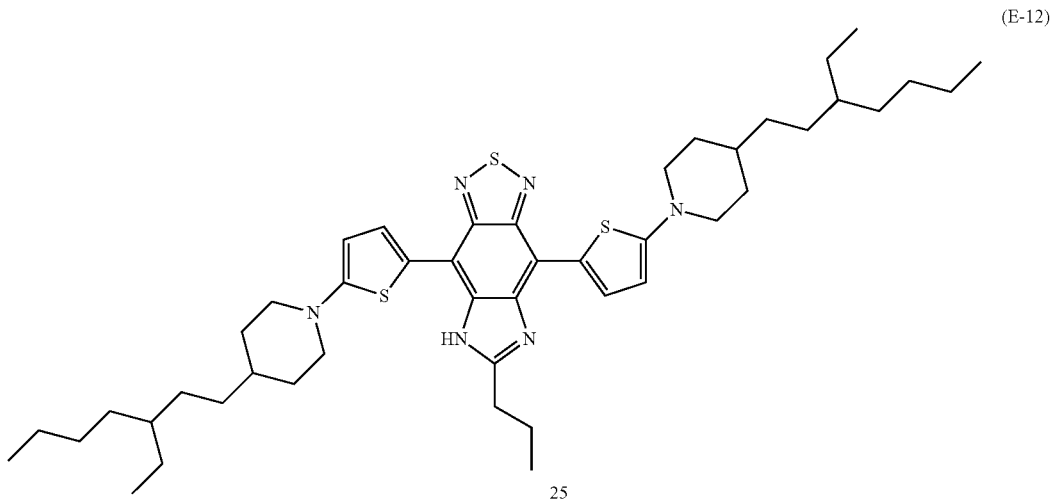

(E-12)

The compound (E-12) (4,8-bis(5-(4-(3-ethylheptyl)piperidin-1-yl)thiophen-2-yl)-6-propyl-5H-imidazo[5,4-f]-2,1,3-benzothiadiazole) was obtained in the same manner as in Example 1.

Phase transition temperature (° C.) Cr 151 Iso

UV-Vis ($CH_2Cl_2$, $\lambda_{max}$): 600 nm $^1$HNMR (Acetone-$d_6$, TMS internal standard) δ (ppm)= 11.17, 8.18, 6.23, 3.75, 2.78-2.98, 1.87 (d, J=11.0 Hz, 4H), 1.29-1.42 (m, 42H), 1.11 (t, J=8.0 Hz, 3H), 0.86-0.92 (m, 15H)

Other compounds used in the present invention can be obtained by a method similar to those of these synthetic examples. Table 1 shows a summary of the evaluation results. In the table, the following symbols are used as abbreviations for substructures. The values of λmax in the table are the results of measurement in dichloromethane.

[Chem. 60]

Me: —CH$_3$   Pr: —CH$_2$CH$_2$CH$_3$

Pent: —CH$_2$CH$_2$CH$_2$CH$_2$CH$_3$

Hep: —CH$_2$CH$_2$CH$_2$CH$_2$CH$_2$CH$_2$CH$_3$

HE: —CH$_2$CH$_2$CHCH$_2$CH$_2$CH$_2$CH$_3$
          |
          CH$_2$CH$_3$

CF3: —CF$_3$   CN: —C≡N

SMe: —S—CH$_3$   Ms: —S(=O)(=O)—CH$_3$

SFM: —S(=O)(=O)—N(CH$_3$)$_2$

Cy: 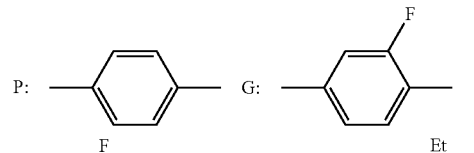   Pi: 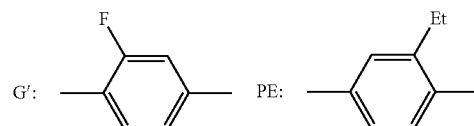

Pi': 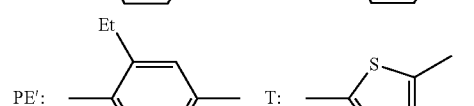

-continued

P: 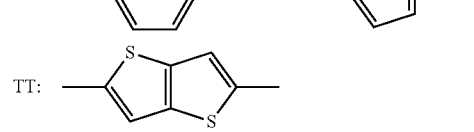   G: (3-fluoro-phenylene)

G': (fluoro-phenylene)   PE: (ethyl-phenylene)

PE': (ethyl-phenylene)   T: 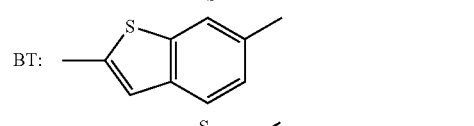

TT: 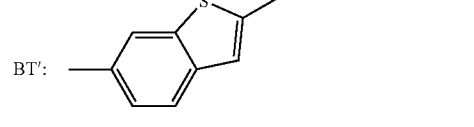

BT: (benzothiophene)

BT': (benzothiophene)

[Chem. 61]

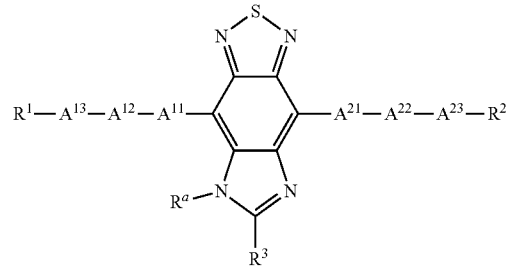

$R^1$—$A^{13}$—$A^{12}$—$A^{11}$— ... —$A^{21}$—$A^{22}$—$A^{23}$—$R^2$ $R^a$, $R^3$

TABLE 11

| Compound | $R^1$ | $R^2$ | $R^3$ | $R^a$ | $A^{11}$ | $A^{12}$ | $A^{13}$ | $A^{21}$ | $A^{22}$ | $A^{23}$ | $\lambda^{max}$ |
|---|---|---|---|---|---|---|---|---|---|---|---|
| E-13 | Pent | Pent | Pr | H | P | P | — | P | P | — | 431 nm |
| E-14 | Pent | Pent | Me | H | P | G | — | P | G' | — | 434 nm |
| E-15 | HE | HE | Pr | H | P | Pi | — | P | Pi' | — | 503 nm |
| E-5 | Pent | Pent | Pr | H | P | G | Cy | P | G' | Cy | 436 nm |
| E-10 | Pent | Pent | Me | H | PE' | G | Cy | PE | G' | Cy | 435 nm |
| E-11 | Pent | Pent | Me | Me | PE' | G | Cy | PE | G' | Cy | 434 nm |
| E-16 | Pent | Pent | Pr | H | PE' | G | Cy | PE | G' | Cy | 435 nm |
| E-9 | Pr | Pr | Pr | H | TT | G | — | TT | G' | — | 552 nm |
| E-17 | Pr | Pr | Pr | H | TT | G | Cy | TT | G' | Cy | 550 nm |
| E-7 | Hep | Hep | Pr | H | TT | Pi | — | TT | Pi' | — | 610 nm |
| E-18 | HE | HE | Pr | H | TT | Pi | — | TT | Pi' | — | 608 nm |
| E-19 | HE | HE | Pr | H | TT | P | Pi | TT | P | Pi | 589 nm |
| E-8 | Pent | Pent | Pr | $CF_3$ | PE' | G | Cy | PE | G' | Cy | 443 nm |
| E-6 | Me | Me | Pr | H | T | Pi | — | T | Pi | — | 608 nm |
| E-12 | HE | HE | Pr | H | T | Pi | — | T | Pi | — | 600 nm |
| E-20 | Pent | Pent | Pr | H | T | G | — | T | G' | — | 544 nm |
| E-21 | Pent | Pent | Pr | H | T | G | P | T | G' | P | 551 nm |
| E-22 | Pent | Pent | Pr | H | T | T | — | T | T | — | 562 nm |
| E-23 | Pent | Pent | Pr | H | T | T | Pi | T | T | Pi' | 624 nm |
| E-24 | Pr | Pr | Pr | H | BT' | — | — | BT | — | — | 533 nm |
| E-25 | Pr | Pr | Pr | H | BT' | P | — | BT | P | — | 546 nm |
| E-26 | Pr | Pr | Pr | H | BT' | G | Cy | BT | G' | Cy | 543 nm |
| E-27 | Hep | Hep | Pr | H | BT' | P | Pi | BT | P | Pi' | 630 nm |
| E-28 | Pent | Pent | Me | H | P | TT | — | P | TT | — | 477 nm |
| E-29 | Pent | Pent | Me | H | P | TT | Pi | P | TT | Pi' | 539 nm |
| E-30 | Pent | Pent | Pr | H | TT | P | Cy | TT | P | Cy | 555 nm |
| E-31 | Pent | Pent | Pr | H | TT | G | Cy | TT | G' | Cy | 551 nm |
| E-32 | Pent | Pent | Pr | H | TT | G | P | TT | G' | P | 558 nm |
| E-33 | HE | HE | SMe | SFM | TT | Pi | — | TT | Pi' | — | 661 nm |
| E-34 | HE | HE | Ms | SFM | TT | Pi | — | TT | Pi' | — | 677 nm |
| E-35 | HE | HE | CF3 | H | T | T | — | T | T | — | 577 nm |
| E-36 | HE | HE | CN | Me | TT | Pi | — | TT | Pi' | — | 592 nm |
| E-37 | HE | HE | SMe | Ms | TT | Pi | — | TT | Pi' | — | 672 nm |

(Example 38) Preparation-1 of Liquid Crystal Composition

A host liquid crystal (H) made of the following composition

[Chem. 62]

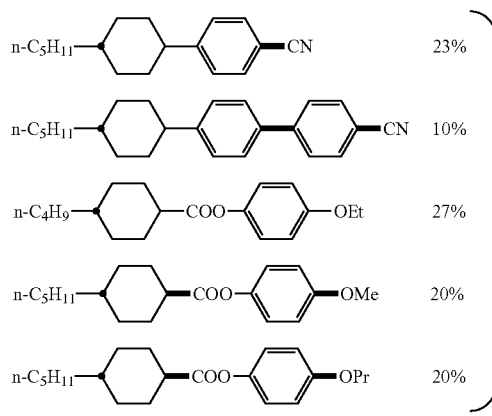

was prepared.

A liquid crystal composition (M-A) containing 98% of the matrix liquid crystal (H) and 2% of the compound (E-1) obtained in Example 1 was prepared. The measured optical properties of this composition (M-A) were as follows.

$\lambda_{max}$: 546 nm

Dichromatic ratio: 3.4

The prepared liquid crystal composition (M-A) maintained a uniform nematic liquid crystal state for one month at room temperature.

Furthermore, a light resistance test was conducted using the liquid crystal composition (M-A) for two weeks, and it was confirmed that the color did not change.

(Example 39) Preparation-2 of Liquid Crystal Composition

A liquid crystal composition (M-B) containing 99% of the matrix liquid crystal (H) and 1% of the compound (E-2) obtained in Example 2 was prepared. The measured optical properties of this composition (M-B) were as follows.

$\lambda_{max}$: 545 nm

Dichromatic ratio: 6.4

The prepared liquid crystal composition (M-B) maintained a uniform nematic liquid crystal state for more than one month at room temperature.

Furthermore, a light resistance test was conducted using the liquid crystal composition (M-B), and it was confirmed that the color did not change for two weeks.

(Comparative Example 1) Preparation-3 of Liquid Crystal Composition

A liquid crystal composition (M-C) containing 99% of the matrix liquid crystal (H) and 1% of a compound (R-1) (4,9-bis-(5-methylthiophen-2-yl)-6,7-dimethyl-2-thia-1,3,5, 8-tetraaza-cyclopenta[b]naphthalene) with thiadiazoloquinoxaline skeleton was prepared.

[Chem. 63]

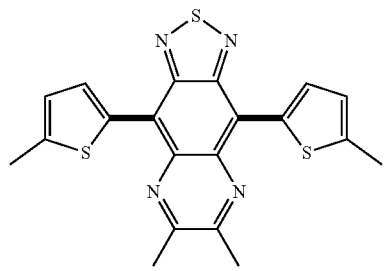

(R-1)

The measured optical properties of this composition (M-C) were as follows.

$\lambda_{max}$: 647 nm

Dichromatic ratio: 4.6

In the prepared liquid crystal composition (M-C), dye precipitation was observed after three days at room temperature.

Furthermore, a light resistance test was conducted using the liquid crystal composition (M-C), and change in color was observed after 10 days.

The comparison of dichroic ratios, solubilities, and light resistances of Example 38 and Comparative Example 1 shows that the compound of the present application has a larger dichroic ratio, higher solubility, and higher light resistance than the compound of Comparative Example 1. Furthermore, it can be seen that Example 39 exhibits an even larger dichroic ratio while maintaining high solubility. This clearly shows that the compound of the present application is characterized by both a large dichroic ratio and high solubility.

Table 2 shows the evaluation results in liquid crystals of each compound.

The above results show that the compounds of the present application exhibit a larger dichroic ratio than the compound of Comparative Example 1, while exhibiting high solubility in the host liquid crystal. In addition, it is clear that the compounds of the present application have high light resistance and are extremely useful compounds for industrial applications.

What is claimed is:

1. A compound represented by general formula (1)

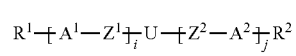

(1)

wherein U is represented by general formula (2)

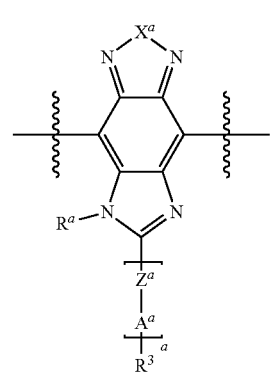

(2)

wherein $R^1$, $R^2$, and $R^3$ each independently represent a cyano group, an alkyl group having 1 to 20 carbon atoms, one —$CH_2$— or two or more nonadjacent —$CH_2$—'s present in these groups are optionally replaced with —$NR^6$—, —S—, —CS—, —S—CO SO$_2$—, and a hydrogen atom present in the alkyl group is optionally replaced with a fluorine atom, wherein $R^6$ represents a hydrogen atom or an alkyl group having 1 to 20 carbon atoms,

TABLE 2

| Example | Compound | λmax | Dichroic ratio | Presence of precipitation from liquid crystal with 1% dye | Light resistance test result |
|---|---|---|---|---|---|
| 40 | E-5 | 458 nm | 17.9 | None for 1 month | No change for 3 months |
| 41 | E-10 | 460 nm | 19.4 | None for 2 weeks | Discoloration after 2 months |
| 42 | E-11 | 457 nm | 16.8 | None for 1 month | Discoloration after 2 months |
| 43 | E-16 | 458 nm | 17.2 | None for 1 month | No change for 3 months |
| 44 | E-17 | 577 nm | 15.4 | Precipitation after 3 weeks | Discoloration after 1 month |
| 45 | E-7 | 626 nm | 12.1 | None for 1 month | Discoloration after 1 month |
| 46 | E-18 | 625 nm | 11.1 | None for 1 month | Discoloration after 1 month |
| 47 | E-19 | 600 nm | 13.3 | Precipitation after 3 weeks | Discoloration after 1 month |
| 48 | E-8 | 458 nm | 10.9 | None for 1 month | Discoloration after 1 month |
| 49 | E-6 | 621 nm | 5.9 | None for 1 month | Discoloration after 1 month |
| 50 | E-22 | 589 nm | 8.9 | Precipitation after 2 weeks | Discoloration after 2 months |
| 51 | E-25 | 562 nm | 6 | None for 1 month | Discoloration after 1 month |
| 52 | E-28 | 497 nm | 15.9 | Precipitation after 3 weeks | No change for 3 months |
| 53 | E-31 | 570 nm | 17.1 | None for 1 month | No change for 3 months |
| 54 | E-33 | 677 nm | 10.9 | None for 1 month | No change for 3 months |
| 55 | E-34 | 692 nm | 9.9 | None for 1 month | No change for 3 months |
| 56 | E-35 | 619 nm | 11.8 | Precipitation after 3 weeks | No change for 3 months |
| 57 | E-36 | 604 nm | 9.5 | None for 1 month | No change for 3 months |
| 58 | E-37 | 695 nm | 9.1 | Precipitation after 3 weeks | No change for 3 months |

$R^a$ represents a hydrogen atom, or an alkyl group having 1 to 20 carbon atoms, one —CH$_2$— or two or more nonadjacent —CH$_2$—'s present in these groups are optionally replaced with —NR$^7$—, —SO$_2$—, and a hydrogen atom present in these groups is optionally replaced with a fluorine atom, wherein $R^7$ represents a hydrogen atom or an alkyl group having 1 to 20 carbon atoms, $X^a$ represents —S—, $A^1$, $A^2$ and $A^a$ each represent an optionally substituted hydrocarbon ring or heterocyclic ring having 3 to 16 carbon atoms, $Z^1$, $Z^2$ and $Z^a$ each represent a single bond, i, and j each represent an integer of 2 to 4, a represent an integer of 0, pluralities of $A^1$s and $A^2$s may be the same or different.

2. The compound according to claim 1, wherein in general formula (1), $A^1$, and $A^2$ each independently represent a group selected from the group consisting of
   (a) a 1,4-cyclohexylene group in which one —CH$_2$— or two or more nonadjacent —CH$_2$—'s are optionally replaced with —O— or —S—, and one CH or two or more nonadjacent CHs are optionally replaced with N,
   (b) a 1,4-phenylene group in which one —CH= or two or more nonadjacent —CH='s are optionally replaced with —N=,
   (c) a 1,4-cyclohexenylene group, a naphthalene-2,6-diyl group, a naphthalene-1,4-diyl group, in which a hydrogen atom is optionally replaced with a fluorine or chlorine atom, and
   (d) a thiophene-2,5-diyl group, a benzothiophene-2,6-diyl group, a thieno[3,2-b]thiophene-2,5-diyl group, and
   these groups are unsubstituted or optionally substituted with one or more substituents $L^2$s, wherein $L^2$s each independently represent a hydrogen atom, a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear alkyl group having 1 to 20 carbon atoms or a branched or cyclic alkyl group having 3 to 20 carbon atoms, in which one —CH$_2$— or two or more —CH$_2$—'s are each independently optionally replaced with —O—, —S—, —CO—, —CS—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or wherein oxygen atoms are not directly bonded to each other and any hydrogen atom in the alkyl group is optionally replaced with a fluorine atom.

3. The compound according to claim 1, wherein in general formula (1), i, and j each independently represent an integer of 2 or 3.

4. The compound according to claim 1, wherein in general formula (1), $R^1$, $R^2$, and $R^3$ each independently represent an alkyl group having 2 to 20 carbon atoms.

5. A composition comprising one or two or more compounds according to claim 1.

6. A guest-host (GH) liquid crystal composition or a polymer-dispersed liquid crystal composition comprising one or two or more compounds according to claim 1.

7. A liquid crystal display device or a light control device having the composition according to claim 5.

* * * * *